United States Patent
Urano et al.

(10) Patent No.: US 6,526,511 B1
(45) Date of Patent: Feb. 25, 2003

(54) APPARATUS AND METHOD FOR MODIFYING MICROPROCESSOR SYSTEM AT RANDOM AND MAINTAINING EQUIVALENT FUNCTIONALITY IN SPITE OF MODIFICATION, AND THE SAME MICROPROCESSOR SYSTEM

(75) Inventors: Masami Urano, Tokyo (JP); Tomoo Fukazawa, Tokyo (JP); Ken Takeya, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/219,953

(22) Filed: Dec. 23, 1998

(30) Foreign Application Priority Data

| Dec. 25, 1997 | (JP) | ............................................. 9-367296 |
| Feb. 23, 1998 | (JP) | ............................................ 10-040035 |
| Mar. 25, 1998 | (JP) | ............................................ 10-096706 |
| Aug. 6, 1998 | (JP) | ............................................ 10-235034 |
| Aug. 7, 1998 | (JP) | ............................................ 10-236424 |
| Aug. 7, 1998 | (JP) | ............................................ 10-236425 |

(51) Int. Cl.[7] ............................................. G06F 12/14
(52) U.S. Cl. ...................................... 713/190; 713/200
(58) Field of Search .............................. 713/200, 201, 713/202, 190

(56) References Cited

U.S. PATENT DOCUMENTS

| 4,064,558 A | * 12/1977 | Hughes et al. ............... 713/190 |
| 4,633,388 A | * 12/1986 | Chiu ........................... 713/190 |
| 5,008,938 A | * 4/1991 | Freeburg et al. ............. 380/265 |
| 5,095,525 A | * 3/1992 | Almgren et al. ............. 713/190 |
| 5,850,452 A | * 12/1998 | Sourgen et al. ............. 713/190 |

FOREIGN PATENT DOCUMENTS

| JP | 2-187888 | 7/1990 |
| JP | 3-237483 | 10/1991 |
| JP | 4-264922 | 9/1992 |
| JP | 9-238132 | 9/1997 |
| JP | 10-20778 | 1/1998 |

OTHER PUBLICATIONS

Forrest, Stephanie et al., *Building Diverse Computer Systems*, The Sixth Workshop on Hot Topics in Operating Systems, IEEE, May 5–6, 1997.*

* cited by examiner

*Primary Examiner*—Richard L. Ellis
(74) *Attorney, Agent, or Firm*—Kenyon & Kenyon

(57) ABSTRACT

The present invention discloses a method for randomizing a microprocessor system, such as an IC card, in order to prevent the microprocessor system from being tampered with. The method ensures that the randomized microprocessor system realizes a functionality equivalent to that of an original microprocessor system and enables easy modification of a configuration of the microprocessor system. In the context of this disclosure, to randomize a microprocessor system means to randomize a microprocessor and a program included in the microprocessor system while maintaining an equivalence of functionality realized by the microprocessor system regardless of this randomization. According to the present invention, the method for randomizing a microprocessor system performing a given functionality consists in (a) randomizing items stored in a memory in accordance with randomizing information, and (b) randomizing a microprocessor so as to allow the microprocessor to have an access to the randomized items stored in the memory. Thus, a randomized microprocessor system performing a functionality equivalent to the given functionality is generated.

22 Claims, 69 Drawing Sheets

FIG. 7 PRIOR ART

| ADDRESS | OPCODE |
|---|---|
| | |
| 1 1 1 0 | op 15 |
| 1 1 0 1 | op 14 |
| 1 1 0 0 | op 13 |
| 1 0 1 1 | op 12 |
| 1 0 1 0 | op 11 |
| 1 0 0 1 | op 10 |
| 1 0 0 0 | op 9 |
| 0 1 1 1 | op 8 |
| 0 1 1 0 | op 7 |
| 0 1 0 1 | op 6 |
| 0 1 0 0 | 1 0 0 0 |
| 0 0 1 1 | JP |
| 0 0 1 0 | op 3 |
| 0 0 0 1 | op 2 |
| 0 0 0 0 | op 1 |

FIG. 8 PRIOR ART

| ADDRESS | OPCODE |
|---|---|
| | |
| 1 1 1 0 | o p 1 5 |
| 1 1 0 1 | o p 1 4 |
| 1 1 0 0 | 0 0 1 0 |
| 1 0 1 1 | J R |
| 1 0 1 0 | o p 1 1 |
| 1 0 0 1 | o p 1 0 |
| 1 0 0 0 | o p 9 |
| 0 1 1 1 | o p 8 |
| 0 1 1 0 | o p 7 |
| 0 1 0 1 | o p 6 |
| 0 1 0 0 | o p 5 |
| 0 0 1 1 | o p 4 |
| 0 0 1 0 | o p 3 |
| 0 0 0 1 | o p 2 |
| 0 0 0 0 | o p 1 |

| ADDRESS | DATA(BIT 7,6...,0) | INSTRUCTION |
|---|---|---|
| ... | ... | |
| 9 | D5(11010101) | POP BC |
| 8 | C5(11000101) | PUSH BC |
| 7 | 03(00000011) | INC BC |
| 6 | 22(00100010) | |
| 5 | 0E(00001110) | LD C,22 |
| 4 | 11(00010001) | |
| 3 | 06(00000110) | LD B,11 |
| 2 | 7F(01111111) | |
| 1 | FF(11111111) | |
| 0 | 31(00110001) | LD SP,7FFF |

170

⊕ REPRESENTS AN EOR OR ENOR

○ REPRESENTS A PRESENCE/ABSENCE OF A CONNECTION

| KEY | E3 | C3 | E2 | C2 | E1 | C1 | C0 |
|-----|----|----|----|----|----|----|----|
| 160A | 0 | 1 | 0 | 0 | 1 | 0 | 1 |
| 160B | 1 | 1 | 1 | 0 | 0 | 0 | 1 |
| 160C | 0 | 0 | 1 | 0 | 0 | 1 | 1 |

FOR En,"0" REPRESENTS EOR AND "1" REPRESENTS ENOR.

IF Cn="0" THEN DON'T CARE.

FOR Cn,"1" REPRESENTS A PRESENCE OF THE CONNECTION AND "0" REPRESENTS AN ABSENCE OF THE CONNECTION.

C0 IS ALWAYS EQUAL TO "1".

| CLOCK | Q4 | Q3 | Q2 | Q1 |
|---|---|---|---|---|
| CL 1 | 0 | 0 | 0 | 1 |
| CL 2 | 1 | 0 | 0 | 0 |
| CL 3 | 1 | 1 | 0 | 0 |
| CL 4 | 1 | 1 | 1 | 1 |
| CL 5 | 0 | 1 | 1 | 1 |
| CL 6 | 1 | 0 | 1 | 1 |
| CL 7 | 0 | 1 | 0 | 1 |
| CL 8 | 1 | 0 | 1 | 0 |
| CL 9 | 1 | 1 | 0 | 1 |
| CL 10 | 0 | 1 | 1 | 0 |
| CL 11 | 0 | 0 | 1 | 1 |
| CL 12 | 1 | 0 | 0 | 1 |
| CL 13 | 0 | 1 | 0 | 0 |
| CL 14 | 0 | 0 | 1 | 0 |
| CL 15 | 0 | 0 | 0 | 1 |

| CLOCK | Q4 | Q3 | Q2 | Q1 |
|---|---|---|---|---|
| CL 1 | 0 | 0 | 0 | 0 |
| CL 2 | 1 | 0 | 0 | 0 |
| CL 3 | 0 | 1 | 0 | 0 |
| CL 4 | 1 | 0 | 1 | 0 |
| CL 5 | 0 | 1 | 0 | 1 |
| CL 6 | 1 | 0 | 0 | 1 |
| CL 7 | 1 | 1 | 0 | 0 |
| CL 8 | 0 | 1 | 1 | 0 |
| CL 9 | 1 | 0 | 1 | 1 |
| CL 10 | 1 | 1 | 0 | 1 |
| CL 11 | 1 | 1 | 1 | 0 |
| CL 12 | 0 | 1 | 1 | 1 |
| CL 13 | 0 | 0 | 1 | 1 |
| CL 14 | 0 | 0 | 0 | 1 |
| CL 15 | 0 | 0 | 0 | 0 |

170C

| CLOCK | Q4 | Q3 | Q2 | Q1 |
|---|---|---|---|---|
| CL 1 | 0 | 0 | 0 | 1 |
| CL 2 | 1 | 0 | 0 | 0 |
| CL 3 | 0 | 1 | 0 | 0 |
| CL 4 | 0 | 0 | 1 | 0 |
| CL 5 | 1 | 0 | 0 | 1 |
| CL 6 | 1 | 1 | 0 | 0 |
| CL 7 | 0 | 1 | 1 | 0 |
| CL 8 | 1 | 0 | 1 | 1 |
| CL 9 | 0 | 1 | 0 | 1 |
| CL 10 | 1 | 0 | 1 | 0 |
| CL 11 | 1 | 1 | 0 | 1 |
| CL 12 | 1 | 1 | 1 | 0 |
| CL 13 | 1 | 1 | 1 | 1 |
| CL 14 | 0 | 1 | 1 | 1 |
| CL 15 | 0 | 0 | 1 | 1 |

| CLOCK | Q1 | Q2 | Q3 | Q4 | Q1 ⊕ Q4 |
|---|---|---|---|---|---|
| CL 1 | 0 | 0 | 0 | 0 | 1 |
| CL 2 | 1 | 0 | 0 | 0 | 0 |
| CL 3 | 0 | 1 | 0 | 0 | 1 |
| CL 4 | 1 | 0 | 1 | 0 | 0 |
| CL 5 | 0 | 1 | 0 | 1 | 0 |
| CL 6 | 0 | 0 | 1 | 0 | 1 |
| CL 7 | 1 | 0 | 0 | 1 | 1 |
| CL 8 | 1 | 1 | 0 | 0 | 0 |
| CL 9 | 0 | 1 | 1 | 0 | 1 |
| CL 10 | 1 | 0 | 1 | 1 | 1 |
| CL 11 | 1 | 1 | 0 | 1 | 1 |
| CL 12 | 1 | 1 | 1 | 0 | 0 |
| CL 13 | 0 | 1 | 1 | 1 | 0 |
| CL 14 | 0 | 0 | 1 | 1 | 0 |
| CL 15 | 0 | 0 | 0 | 1 | 0 |

| ADDRESS | OPCODE |
|---|---|
| | |
| 1 1 1 0 | op 12 |
| 1 1 0 1 | op 11 |
| 1 1 0 0 | op 8 |
| 1 0 1 1 | op 10 |
| 1 0 1 0 | op 4 |
| 1 0 0 1 | op 7 |
| 1 0 0 0 | op 2 |
| 0 1 1 1 | op 13 |
| 0 1 1 0 | op 9 |
| 0 1 0 1 | op 5 |
| 0 1 0 0 | op 3 |
| 0 0 1 1 | op 14 |
| 0 0 1 0 | op 6 |
| 0 0 0 1 | op 15 |
| 0 0 0 0 | op 1 |

S=0 : Y=A
S=1 : Y=B

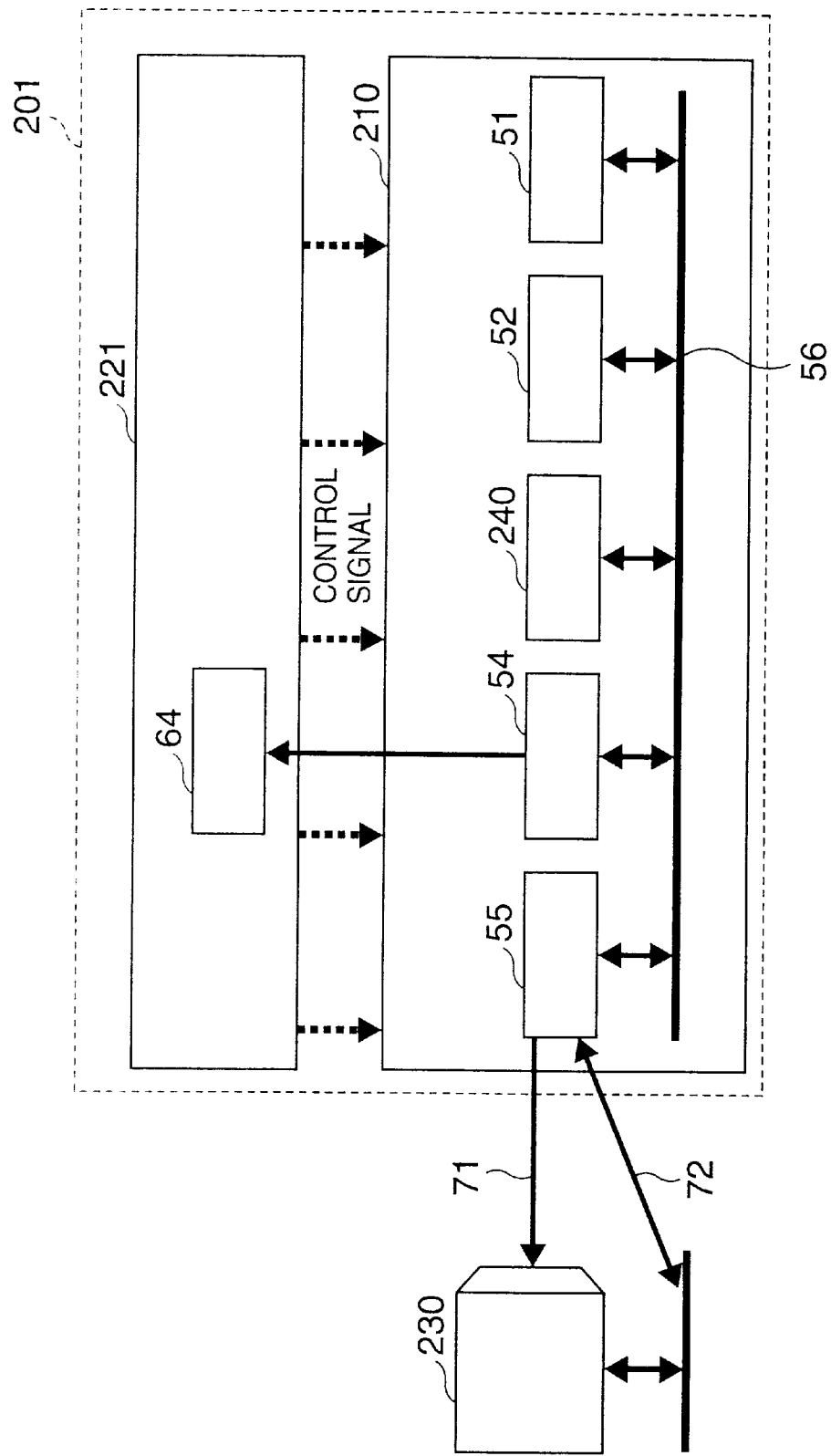

FIG.31

| INPUT ADDRESS | OUTPUT CONVERTED ADDRESS |
|---|---|
| F F F F | |
| ⋮ | |
| 0 0 0 D | |
| 0 0 0 C | |
| 0 0 0 B | |
| 0 0 0 A | ... |
| 0 0 0 9 | ... |
| 0 0 0 8 | A 2 D 1 |
| 0 0 0 7 | 2 1 3 5 |
| 0 0 0 6 | B 3 1 6 |
| 0 0 0 5 | C 3 B 8 |
| 0 0 0 4 | 4 2 1 0 |
| 0 0 0 3 | 7 D E F |
| 0 0 0 2 | 9 5 8 A |
| 0 0 0 1 | E 5 D 7 |
| 0 0 0 0 | 0 0 0 0 |

FIG.32

| ADDRESS | OPCODE |
|---|---|
| FFFF | ⋮ |
| E5D7 | op1 |
|  | ⋮ |
| C3B8 | op5 |
|  | ⋮ |
| B316 | op6 |
|  | ⋮ |
| A2D1 | op8 |
|  | ⋮ |
| 958A | op2 |
|  | ⋮ |
| 7DEF | op3 |
|  | ⋮ |
| 4210 | op4 |
|  | ⋮ |
| 2135 | op7 |
|  | ⋮ |
| 0000 | op0 |

| S1 | S0 | Y |
|---|---|---|
| 0 | 0 | D0 |
| 0 | 1 | D1 |
| 1 | 0 | D2 |
| 0 | 0 | D3 |

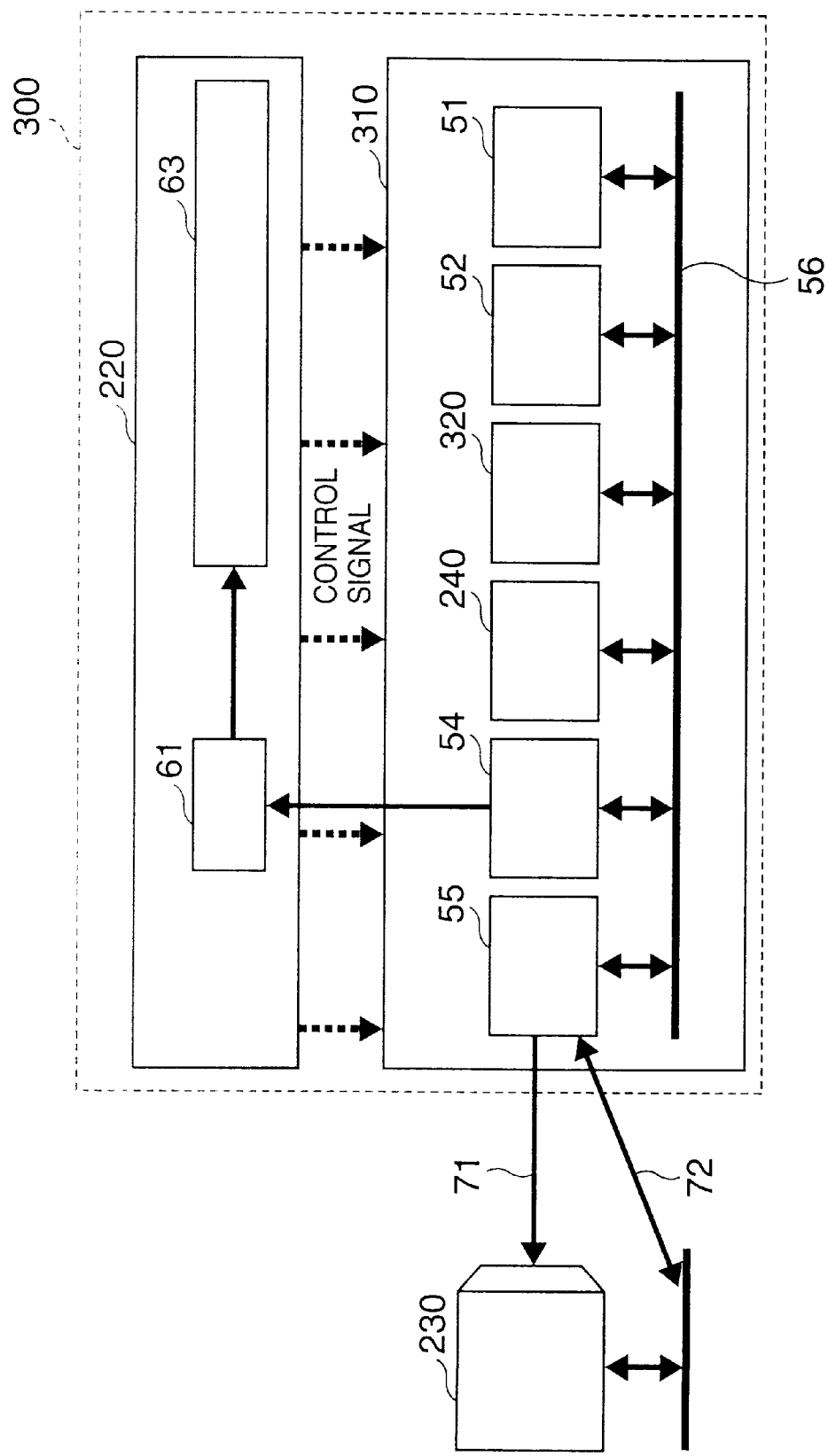

FIG.40

| ADDRESS | OPCODE |
|---|---|
| | |
| 1 1 1 0 | o p 1 2 |
| 1 1 0 1 | o p 1 1 |
| 1 1 0 0 | o p 8 |
| 1 0 1 1 | o p 1 0 |
| 1 0 1 0 | J P |
| 1 0 0 1 | o p 7 |
| 1 0 0 0 | o p 2 |
| 0 1 1 1 | o p 1 3 |
| 0 1 1 0 | o p 9 |
| 0 1 0 1 | 0 1 1 0 |
| 0 1 0 0 | o p 3 |
| 0 0 1 1 | o p 1 4 |
| 0 0 1 0 | o p 6 |
| 0 0 0 1 | o p 1 5 |
| 0 0 0 0 | o p 1 |

FIG.42

| ADDRESS | OPCODE |
|---|---|
| | |
| 1 1 1 0 | J R |
| 1 1 0 1 | op11 |
| 1 1 0 0 | op8 |
| 1 0 1 1 | op10 |
| 1 0 1 0 | op4 |
| 1 0 0 1 | op7 |
| 1 0 0 0 | op2 |
| 0 1 1 1 | 0 0 1 0 |
| 0 1 1 0 | op9 |
| 0 1 0 1 | op5 |
| 0 1 0 0 | op3 |
| 0 0 1 1 | op14 |
| 0 0 1 0 | op6 |
| 0 0 0 1 | op15 |
| 0 0 0 0 | op1 |

FIG.46

| ADDRESS | DATA(BIT7,6...,0) | INSTRUCTION |
|---|---|---|
| ... | ... | |
| 9 | F4(11110100) | POP BC |
| 8 | B4(10110100) | PUSH BC |
| 7 | 88(10001000) | INC BC |
| 6 | 0A(00001010) | |
| 5 | 19(00011001) | LD C,22 |
| 4 | C0(11000000) | |
| 3 | 18(00011000) | LD B,11 |
| 2 | DF(11011111) | |
| 1 | FF(11111111) | |
| 0 | C2(11000010) | LD SP,7FFF |

TO MICROPROCESSOR 410     TO MEMORY 420

FIG.50

| | BIT7 | | | | | | | BIT0 |
|---|---|---|---|---|---|---|---|---|
| 7 | 7-7 | 6-7 | 5-7 | 4-7 | 3-7 | 2-7 | 1-7 | 0-7 |
| 6 | 7-6 | 6-6 | 5-6 | 4-6 | 3-6 | 2-6 | 1-6 | 0-6 |
| 5 | 7-5 | 6-5 | 5-5 | 4-5 | 3-5 | 2-5 | 1-5 | 0-5 |
| 4 | 7-4 | 6-4 | 5-4 | 4-4 | 3-4 | 2-4 | 1-4 | 0-4 |
| 3 | 7-3 | 6-3 | 5-3 | 4-3 | 3-3 | 2-3 | 1-3 | 0-3 |
| 2 | 7-2 | 6-2 | 5-2 | 4-2 | 3-2 | 2-2 | 1-2 | 0-2 |
| 1 | 7-1 | 6-1 | 5-1 | 4-1 | 3-1 | 2-1 | 1-1 | 0-1 |
| 0 | 7-0 | 6-0 | 5-0 | 4-0 | 3-0 | 2-0 | 1-0 | 0-0 |

FIG.51

| | |
|---|---|
| 7 | 00000001 |
| 6 | 00010000 |
| 5 | 10000000 |
| 4 | 00000100 |
| 3 | 00000010 |
| 2 | 01000000 |
| 1 | 00100000 |
| 0 | 00001000 |

TO MICROPROCESSOR CORE DATA BUS TERMINAL

TO MICROPROCESSOR DATA BUS TERMINAL

TO MEMORY DATA BUS TERMINAL

BIT INVERTER BLOCK

| ADDRESS | DATA(BIT 7,6...,0) | INSTRUCTION |
|---|---|---|
| ... | ... | |
| 9 | 49(01001001) | POP BC |
| 8 | 59(01011001) | PUSH BC |
| 7 | 9F(10011111) | INC BC |
| 6 | BE(10111110) | |
| 5 | 92(10010010) | LD C,22 |
| 4 | 8D(10001101) | |
| 3 | 9A(10011010) | LD B,11 |
| 2 | E3(11100011) | |
| 1 | 63(011000111) | |
| 0 | AD(10101101) | LD SP,7FFF |

FIG.76

|  | BIT | | | | | | | |
|---|---|---|---|---|---|---|---|---|
| ADDRESS | 0 | 1 | 2 | 3 | 4 | 5 | 6 | 7 |
| 0 | BIT2 DATA | BIT6 DATA | BIT0 DATA | BIT5 DATA | BIT7 DATA | BIT3 DATA | BIT1 DATA | BIT4 DATA |
| 1 | BIT2 DATA | BIT6 DATA | BIT0 DATA | BIT5 DATA | BIT7 DATA | BIT3 DATA | BIT1 DATA | BIT4 DATA |
| 2 | BIT2 DATA | BIT6 DATA | BIT0 DATA | BIT5 DATA | BIT7 DATA | BIT3 DATA | BIT1 DATA | BIT4 DATA |
| 3 | BIT2 DATA | BIT6 DATA | BIT0 DATA | BIT5 DATA | BIT7 DATA | BIT3 DATA | BIT1 DATA | BIT4 DATA |
| 4 | BIT2 DATA | BIT6 DATA | BIT0 DATA | BIT5 DATA | BIT7 DATA | BIT3 DATA | BIT1 DATA | BIT4 DATA |
| 5 | BIT2 DATA | BIT6 DATA | BIT0 DATA | BIT5 DATA | BIT7 DATA | BIT3 DATA | BIT1 DATA | BIT4 DATA |
| ⋮ | | | | | | | | |

APPARATUS AND METHOD FOR MODIFYING MICROPROCESSOR SYSTEM AT RANDOM AND MAINTAINING EQUIVALENT FUNCTIONALITY IN SPITE OF MODIFICATION, AND THE SAME MICROPROCESSOR SYSTEM

BACKGROUND OF THE INVENTION

1. Field of the Invention

At earlier times IC cards have been used for some considerably specific applications, but recently, IC cards are becoming increasingly wide-spread in a variety of applications and are likely to become commonly used. It is noted that the IC cards primarily have a high degree of security.

However, provided that the IC cards are to be utilized as telephone cards, electronic money and the like, a tamper-proof mechanism is strongly required for making it difficult to forge such cards.

The present invention generally relates to a microprocessor system comprising a microprocessor and a program to be executed by the microprocessor, and, in particular, to a microprocessor system which is used in IC cards and which is randomized so as to achieve a tamper-proof property.

The present invention also relates to a method for randomizing the processor system so as to be provided with the tamper-proof property.

Also the present invention relates to an apparatus for carrying out the method.

2. Description of the Related Art

For conventional IC cards, a microprocessor embedded in the IC cards is connected to a memory such as a RAM (random access memory), ROM (read-only memory), EEPROM (electrically erasable programmable read-only memory), flash memory and the like, via an address bus and a data bus. In this case, the microprocessor is similar to a common microprocessor used in a typical microprocessor system. A program to be executed by the microprocessor is at first described using a programming language such as Fortran or C, and then compiled into executable machine codes described in the microprocessor's machine language, using a compiler. Alternatively, the program may be described using an assembler language and then assembled into the executable machine codes described in the machine language. The executable machine codes are sequentially stored in addressable locations in the memory so as to be sequentially executed in a top-down fashion.

In this case, the machine codes are arranged within the memory in an order so as to be sequentially executed by the microprocessor. Thus, if a specification of the machine language is known, the behavior of the microprocessor can be analyzed by monitoring data stored in the memory or data transmitted on the data bus. Consequently, confidential data such as a secret key, which is used for cryptography, stored in the IC card may be taken and the secret key may be utilized to counterfeit the IC card.

Once the behavior of a microprocessor embedded in an IC card system has been analyzed and understood by outsiders, such as hackers, the outsiders may tamper with the IC card system. One approach for minimizing adverse effects caused by this tampering is to replace the current IC card system with another IC card system employing a different microprocessor from that of the current IC card system. In order to replace the current microprocessor used in the IC card system with the different microprocessor with respect to a processor type, it is required that the machine codes suited for the current microprocessor be converted into machine codes suited for the different microprocessor. Furthermore, functions realized by the current IC card system should be reproduced by the new different IC card system. That is to say, the program executed by the current microprocessor must be converted into a new program executed by the different microprocessor such that the functions realized by the current microprocessor and the current program equal those realized by the new different microprocessor and the new converted program. It has been discovered that such a new converted program cannot be easily designed in a short time interval and that, in particular, a verification of equivalence of the functions between the current microprocessor system and the different microprocessor system cannot be achieved rapidly.

FIG. 1 shows a conventional method for designing a system 10 comprising a microprocessor 20. A process for designing LSI logic such as the microprocessor will be explained with reference to FIG. 1.

First, in step 101, function designing for the LSI circuit to be designed, in this case, the microprocessor 20, is carried out in accordance with a specification of the microprocessor 20. Subsequently, function description is accomplished in step 102 and logic designing is performed in step 103. Recently, the function designing has been carried out by functionally describing the behavior of the LSI circuit with a HDL (Hardware Description Language) and verifying whether the specification requirements for the LSI circuit are satisfied by means of a function simulator.

Then, in step 104, a net list representative of gate levels is created by means of a logic combination tool on the basis of the function description for the microprocessor 20. The term "net list" is such that it describes a connectivity relation among cells which have a simple logical operation, such as NAND or NOR gates or a flip-flop, and which are included in a cell library. Once the net list has been created, a logic simulation for the microprocessor 20 is performed with the net list and a library for delay elements, and the behavior of the microprocessor 20 is verified. Thereafter, in step 105, layout designing for the microprocessor 20 is carried out using an place and route tool on the basis of the net list, and a mask pattern for the microprocessor 20 is created in step 106. Finally, in step 107, a mask is made in accordance with data derived from the mask pattern and the microprocessor 20 is produced.

The microprocessor system 10 comprising the microprocessor 20 further includes a program 40 to be executed by the microprocessor 20. In step 111, a source program is described with a high-level language such as Fortran or C. In step 112, the described source program is compiled or assembled into a sequence of machine codes, hereinafter also referred to as a "machine code program 40," which can be executed by the microprocessor 20. The microprocessor system 10 further includes a memory for storing the machine code program therein.

Thus, the microprocessor system 10 has the microprocessor 20 and the machine code program 40 being developed and manufactured according to the above-mentioned steps. In general, the microprocessor 20 and the memory 30 are connected via data and address buses. The machine code program 40 is downloaded into the memory 30 by a loader program and the like, or previously is written into the memory 30. The microprocessor 20 has an access to the memory 30 so as to execute instructions from the machine code program 40 and achieve the functions of the microprocessor system 10 appropriately.

For each type of the microprocessors, it is noted that there is a single set of the function description, the net list and the mask pattern. Also, the compilation of the source program written with the single high-level language will result in a unique machine code program.

An example of such a microprocessor system is an IC card system that has recently come into common use. In the case of the IC card system, a plurality of IC cards of the same type are issued as a group and each IC card belonging to the same group has the same functionality. Each IC card includes an equivalent microprocessor 20 and an equivalent machine code program 40. It is assumed that one of the IC cards from the group is analyzed by the outsiders with respect to a logical architecture of the microprocessor 20 as well as the machine code program 40 in the memory 30. As a result, the other IC cards belonging to the same group as said analyzed IC card are subject to a high risk of being tampered with by the outsiders.

Once it is discovered that the logical architecture of the microprocessor 20 and the machine code program 40 stored in the memory 30 have been analyzed by the outsiders, measures should be taken in order to prevent the IC card system from being tampered with by the outsiders. To do this, the current microprocessor system 10 including the current microprocessor 20 may be replaced with a new microprocessor system including a different microprocessor from that of the current system. In this case, a new source program corresponding to the new microprocessor must be developed. This new source program is edited and compiled in accordance with requirements such that the resultant new machine code program from the source program serves the same functionality as that for the original microprocessor. However, as previously stated, a long time is required to design and develop such a new source program satisfying the requirements. Furthermore, the newly designed and developed program may include some bugs. Thus, it has been discovered that it is considerably difficult to develop the new program in order to protect the IC card system from being tampered with by the outsiders.

In the above-mentioned microprocessor system such as the IC card system comprising the microprocessor and the program capable of being executed by the microprocessor, the known method for protecting the system from being tampered with by the outsiders consists of replacing the current system with the newly developed system. However, this approach has a first disadvantage in that it is difficult to rapidly modify the microprocessor architecture and the program to be executed by the modified microprocessor while ensuring that an equivalence of the functionality is maintained between the current system and the modified system.

Now, a conventional microprocessor unit MPU will be explained with reference to FIG. 2. The MPU 20 comprises a data path 50 and a control unit 60. Such a type of MPU is described, for example, in "ULSI Design Technology," page 114, FIG. 5.2, The Institute Of Electronics, Information and Communication Engineers, edited by Shoji Horiguchi.

The data path 50 includes an arithmetic logical unit (ALU) 51, a general purpose register 52, a program counter 53, an instruction register 54 and a bus interface 55. The control unit 60 includes an instruction decoder 61 and a micro-program control circuit 62. The MPU 20 is connected to an external memory 30, such as a RAM or ROM, via the bus interface 55, an external address bus 71 and an external data bus 72.

FIG. 3 illustrates, as an example, a program stored in the memory 30 of the MPU 20 within the conventional microprocessor system. The memory 30 has opcodes op1, op2, . . . , op8 stored therein at corresponding addresses 0000, 0001, . . . , 0111, respectively. In this case, for the clearness of the drawing, addresses more than 0111 have not been depicted, but opcodes are also stored in the memory 30 at addresses over 0111. In other words, each of the predetermined opcodes is stored in the memory 30 at the corresponding assigned address. It should be noted that an order of the opcodes stored in the memory 30 corresponds to an order for executing instructions corresponding to the opcodes. For example, the opcodes stored in the memory 30 are sequentially executed as the address at which the opcode is stored increases.

In the conventional MPU 20, a value set in the program counter 53 is supplied to the external bus address 71. The memory 30 provides a content at the address specified by the external address bus 71 to the external data bus 72. The content from the memory 30 is transferred to an internal bus 56 of the MPU 20 via the bus interface 55, and then is latched into the instruction register 54. The content, i.e., opcodes, latched into the instruction register 54 is decoded in the instruction decoder 61, which passes the decoded opcodes to the micro-program control circuit 62 in the control unit 60. The micro-program control circuit 62 generates various signals and executes the instructions in accordance with the opcodes.

Supposed that an instruction stored in the memory 30 at the address corresponding to the value set in the program counter 53 is executed. If the executed instruction is a normal instruction excluding a jump instruction, then the value of the program counter 53 is incremented. Subsequently, the content of the memory 30 at the address corresponding to the value of the program counter 53 is read from the memory 30 and the process for executing the instruction is repeated.

FIG. 4 shows a diagram of the program counter 53. The program counter comprises a register 81 and an increment unit 82 for increasing an output value from the register 81 by +1. In response to a predetermined clock, the register 81 has a given value. The increment unit 82 increments the value in the register 81 and generates the incremented value. At a next clock following the predetermined clock, the register 81 is set to the incremented value by the increment unit 82. This process is continued in response to the following clocks.

In this case, it is assumed that the program counter 53 has been initially set to 0. Then, the opcode "op1" is read from the memory 30 at the address "0000," which address corresponds to the value set in the program counter 53. The opcode "op1" is executed as earlier described. The content of the program counter 53 is further incremented and the incremented value is provided to the memory 30 as the address specifying a location where the opcode to be read is stored. Thus, the opcode "op2" stored in the memory 30 at the address "0001" is read from the memory and executed. Then, the opcodes op3, op4, . . . , op8 are sequentially read from the memory and executed.

FIG. 5 shows a diagram of the micro-program control circuit 62 in the MPU 20 as shown in FIG. 2. The micro-program control circuit 62 comprises a μ-program (micro-program) counter 91, a μ-program memory 92 and a μ-instruction decoder 93. The content set in the instruction register 54 (FIG. 2) is decoded in the instruction decoder 61 of the control unit 60, and thereafter the decoded content is set to the μ-program counter 91 as a μ-instruction stored address. A μ-instruction is retrieved from the μ-program memory 92 at the address represented by the μ-program counter 91, and then decoded in the μ-program instruction decoder 93. As a result, control signals are transferred from the control unit 60 to the data path 50 so as to execute the instruction.

After executing the instruction, the content of the μ-program counter 91 is incremented. Then the μ-instruction is again retrieved from the μ-program memory 92 at the address represented by the μ-program counter 91, decoded in the μ-program instruction decoder 93 and executed by transferring the control signals from the control unit 60 to the data path 50.

In the above-mentioned conventional MPU 20, the content of the program counter is incremented by +1. Since the output value from the program counter 53 is used to address the location where the opcode in the program to be executed is retrieved, the opcode in the program should be sequentially stored in the memory 30 in the same order as the opcode is executed.

As can be understood from the above description, the conventional approach has a second disadvantage as follows. When each opcode in the program 40 is sequentially stored in the memory 30 in the same order as the opcode is executed, the program 40 stored in the memory 30 may be analyzed by sequentially retrieving the data stored in a memory cell of the memory 30.

In addition, the program 40 stored in the memory 30 is transferred from the memory 30 to the MPU 20 via the data bus 72. This allows for outsiders to recognize the program 40 stored in the memory 30 by monitoring the data transmitted on the data bus 72 rather than by directly retrieving the data from the memory 30. This causes a third disadvantage of the known approach in that the outsiders may easily analyze the behavior of the MPU 20.

The above-mentioned conventional method has the disadvantage that the opcodes in the program 40 stored in the memory 30 are sequentially executed. On the contrary, a jump instruction according to the prior art is not always executed sequentially. FIG. 6 shows a diagram of a conventional program counter 53a adapted to the jump instruction. As shown in FIG. 6, the program counter 53a comprises the register 81, the increment unit 82 for increasing the content of the register 81 by 1 and a selector 83. The selector 83 is provided for changing between an output signal from the increment unit 82 and an address output from the control unit 60 as the address to be jumped to for the next instruction.

When the MPU 20 is operative for a normal instruction rather than the jump instruction, in response to the predetermined clock, the register 81 in the program counter 53a is set to 0000. The increment unit 82 adds 1 to the content of the register 81 and outputs the summed value to the selector 83. The selector 83 receives the output signal from the increment unit 82 at a first input thereof and, in this case, selects the output signal from the increment unit 82 as the value to be set to the register 81 at the next clock. Thus, as the value of the address to be set to the program counter 53a is increased, these steps for advancing the program counter 53a are repeated.

Here is the operation of the program counter 53a when the jump instruction is given. The jump instruction is the instruction that changes the order of the opcode to be executed.

In the following description, the instruction "JP" indicates an opcode for an unconditional jump instruction whose operand directly specifies an address to be jumped to. For example, the instruction "JP1000" indicates that the opcode is equal to "JP" and the operand is equal to "1000." On one hand, since the instruction "JP1000" states that the value of the program counter 53a is set to be equal to "1000," the content stored in the memory 30 at the address 1000 is retrieved from the memory 30 and the content representing an instruction is executed. On the other hand, in terms of the memory 30, the operand "1000" is stored at the address directly succeeding the address where the opcode "JP" is stored.

It will be easily understood by those skilled in the art that the above-mentioned jump instruction "JP" generally represents the unconditional jump instruction but is not intended to be executed by only a particular microprocessor. Therefore, the unconditional jump instruction of interest is not limited to the particular "JP" instruction defined beforehand and may be principally expanded to various jump instructions which can be defined for the different existing microprocessors commercially available in the market.

FIG. 7 shows an example of the program 40 contained in the memory 30, which program 40 includes the unconditional jump instruction. The operation of the conventional MPU 20 that is provided with the program counter 53a when the MPU 20 runs the program including the unconditional jump instructions will now be explained.

At first, the register 81 of the program counter 53a is initially set to "0000." This allows the MPU 20 to read the opcode "op1" stored in the memory 30 at the address "0000" and execute the opcode "op1." Then, the increment unit 82 increments the address stored in the register 81 of the program counter 53a by 1. As the program counter 53a is incremented, the opcodes "op2" and "op3" stored in the memory 30 are sequentially read out from the memory 30 at the respective incremented addresses. Thereafter, the register 81 of the program counter 53a is set to the value equal to "0011," and the MPU 20 retrieves the opcode "JP" from the memory 30 at the address of "0011." After the jump instruction "JP" has been taken, the MPU 20 generates the address "0100," which corresponds to the next address to be retrieved, to the address bus 71. In this manner, the content having the value of "1000" in the memory 30 at the address "0100" is retrieved from the memory 30. Since this value "1000" contained in the memory 30 corresponds to the address to be jumped to for the jump instruction, the selector 83 of the program counter 53a selects another input for receiving the jump address "1000."

The MPU 20 provides the value "1000" set in the register 81 to the address bus 71, retrieves the instruction "op9" stored in the memory 30 at the address "1000" and executes the instruction "op9." At the same time, the increment unit 82 of the program counter 53a generates a sum of the content of the register 81 and the value "1." The resultant sum calculated by adding "1" to the content "1000" is equal to "1001." The control unit 60 determines that the present instruction "op9" is not the jump instruction. Then the selector 83 selects the first input receiving the output "1001" from the increment unit 82 and sets this value to the register 81. Until the instruction to be executed is equal to the jump instruction, the selector 83 continues to receive the output signal from the increment unit 82 at the first input and set the value corresponding to the received signal from the increment unit 82 to the register 81.

The addresses generated by the program counter 53a are "0000," "0001," "0010," "0011," "1000," "1001," "1010," "1011," "1100," "1101" and "1110," as shown in FIG. 6. It should be noted that the jump instruction included in the program causes the address "0011" to be followed by the address "1000."

In addition to the unconditional jump instruction "JP," a relative jump instruction "JR," which is another type of the jump instruction, will be explained. The relative jump instruction "JR" is defined as a jump instruction that adds a certain value to the current value of the program counter 53a and takes the resultant value as the address to be jumped to. The relative jump instruction comprises the opcode "JR" and the operand representative of said certain value to be added to the current value of the program counter 53a. The operand, for example, corresponds to the difference between the top address of the "JR" instruction and the address to be jumped to. In particular, as an example, the address to be jumped to (it is also called "jump address" hereinafter) is written as follows:

JUMP ADDRESS=ADDRESS OF OPCODE "JR"+ASSOCIATED OPERAND+1

The operand for the relative jump instruction is stored in the memory 30 at the address next to that of the location where the opcode "JR" for the relative jump instruction is stored. For example, the instruction "JR0011" indicates that the relative jump is to be made to the jump address equal to the value of the current program counter 53a value +the operand "0011"+1.

It will be easily understood by those skilled in the art that the above-mentioned relative jump instruction "JR" generally represents the relative jump instruction but is not intended to be executed only by a particular microprocessor. Therefore, the relative jump instruction of interest is not limited to the particular "JR" instruction defined beforehand and may be principally expanded to various jump instructions which can be defined for the different existing microprocessors commercially available in the market.

FIG. 8 shows an example of the program 40 contained in the memory 30, which program 40 includes the relative jump instruction. The operation of the conventional MPU 20 that is provided with the program counter 53a when the MPU 20 runs the program including the relative jump instructions will now be explained.

The MPU 20 loads the contents stored in the memory 30 thereto starting from the address "0000" of the memory 30 and executes the instructions corresponding to the contents loaded from the memory 30. It is assumed that the opcode "JR" stored in the memory 30 at the address of "1011," as shown in FIG. 8, is reached and loaded into the MPU 20. Then the MPU 20 decodes the opcode "JR" and reads the content of the memory at the address next to the address "1011" where the opcode "JR" is stored. That is to say, the value "0010" stored in the memory 30 at the address "1100" is read from the memory. Then the jump address is calculated according to the above-mentioned formulation, such that:

The jump address=address "1011"+0010+1=1110

The resultant jump address is set via the selector 83 of the program counter 53a to the register 81 as the address where the next instruction to be executed is stored.

Subsequently, the MPU 20 provides the address "1110" held in the register 81 to the address bus 71, retrieves the instruction from the memory 30 at the address "1110" and executes the retrieved instruction. Thus, in this case, the program counter 53a generates the addresses, which specify the locations in the memory 30 where the instruction are to be read from and executed, in a sequence of "0000," "0001," "0010," "0011," "0100," "0101," "0110," "0111," "1000," "1001," "1010," "1011" and "1110." It should be noted that the relative jump instruction "JR" causes the address "1110" to occur following the address "1011."

As described above, in the conventional microprocessor system, if the instruction to be executed is an instruction other than the jump instruction, then the program counter 53a value is incremented by +1 and the opcode stored in the memory 30 is sequentially taken and executed. However, if the instruction to be executed is the jump instruction, the operand following the jump opcode is taken as a further address specifying the location of the memory 30 from which the content should be read. In the case of the unconditional jump, the content read from the memory 30 is directly taken as the instruction to be executed and then is executed by the MPU 20. In the case of the relative jump, the content is taken as a further address representing the above-mentioned difference between the jump address and the current address and is used to calculate the jump address.

In the above-mentioned conventional microprocessor, since each code of the program is sequentially ordered in the memory, a particular mechanism is provided for appropriate execution of the jump instructions. The inventors have discovered that it would be effective to randomize the order of the codes of the program arranged in the memory in order to make the understanding of the program difficult, even if the program has been read by outsiders. However, the conventional microprocessor system has a fourth disadvantage in that the jump instruction cannot be appropriately executed when the order of the program codes stored in the memory is randomized. Thus, a new mechanism for executing the jump instruction is required when the order of the program codes stored in the memory is randomized.

FIG. 9 shows a schematic diagram of a conventional microprocessor system. For convenience of the description, an 8-bit type of microprocessor, i.e., a Z-80 microprocessor, is assumed as an example of a microprocessor used in the conventional microprocessor system. Of course, the following description applies to various microprocessors having a bus width more than 8 bits.

The microprocessor system 10 comprises the microprocessor 20 and the memory 30, as shown in FIG. 9. An address bus terminal 73 of the microprocessor 20 is connected to an address bus terminal 75 of the memory 30 via an address bus 71. Also, a data bus terminal 74 of the microprocessor 20 is also connected to a data bus terminal 76 of the memory 30 via a data bus 72.

FIG. 10 shows a connection between the data bus terminal 74 of the microprocessor 20 and the data bus terminal 76 of the memory 30 in the microprocessor system 10 as shown in FIG. 9. A line D7 for a MSB (most significant bit) of the data bus 72 at the microprocessor 20 is connected to a further line D7 for the MSB of the data bus 72 at the memory 30. Also lines D6, D5, . . . , D1 and D0 at the microprocessor 20 are connected to lines D6, D5, . . . , D1 and D0 at the memory 30, respectively. In this case, concerning an order of assigned bit numbers, the lines D7, D6, . . . , D1 and D0 at the microprocessor 20 correspond to the lines D7, D6, . . . , D1 and D0 at the memory 30, respectively.

FIG. 11 shows an example of a structure of the memory 30 in which the program to be executed by the microprocessor 20 is stored. In this case, the program codes applicable to the Z-80 microprocessor are illustrated, but the same explanation can be applied to any type of microprocessor other than the Z-80 microprocessor. The memory 30 contains codes of 31(H) (in hexadecimal notation) or 00110001(B) (in binary notation) at the address 0, FF(H) at the address 1, 7F(H) at the address 2, 06(H) at the address 3, and so on, in sequence. These codes are represented in a machine language for the Z-80 microprocessor as follows:
LD SP, 7FFF; load 7FFF into SP
LD B, 11; load 11 into register B When the microprocessor 20 is reset by a reset signal and then is released from a reset status, the microprocessor 20 delivers the signal representing the address 0 to the address bus 71. The content value of 31(H) from the memory 30 at the address 0 specified by the address bus 71 is transferred to the MPU 20. Then the MPU 20 decodes the transferred value and takes "LD" as an opcode for the instruction. The MPU 20 attempts to take the operand/operands for the decoded instruction. In this case, since the opcode "LD" is provided with two operands, the MPU 20 delivers the address 1 and the subsequent address 2 to the address bus 71 in order to retrieve two operands from the memory 30 at the designated addresses. As a result, the contents FF(H) and 7F(H) from the memory 30 at the addresses 1 and 2, respectively, are delivered to the MPU 20.

Thus, the MPU 20 can translate the contents sequentially read from the memory 30 to the appropriate instruction "LD SP, 7FFF," which causes the MPU 20 to load a value of 7FFF into a stack pointer SP. After the execution of this instruction "LD SP, 7FFF," the MPU 20 delivers the value representing the address 3 to the address bus 71 in order to read the content from the memory 30 at the address 3. As a result, the MPU 20 can read the content "06" from the memory at the address 3. Thereafter, the MPU 20 sequentially delivers the subsequent address to the memory 30 via the address bus 71, reads the content from the memory 30 at the delivered address via the data bus 72, decodes the content and executes the decoded content representing a respective instruction.

As previously mentioned, in the conventional microprocessor system 10, the microprocessor 20 sequentially reads the content from the memory 30 at the respective specified address, decodes and interprets the content, and executes the instruction corresponding to the content. The machine codes of the program stored in the memory 30 are arranged in an order to be executed by the microprocessor 20. The memory 30 contains an opcode for each step of the program at the address corresponding to the order to be executed. It should also be noted that each bit of the opcode is assigned directly, i.e., without exchanging a bit position, to the same bit in the memory 30 at the corresponding address. Thus, a MSB of the opcode corresponds to a MSB in the memory 30, a bit 6 of the opcode corresponds to a bit 6 in the memory 30, and so on. That is to say, a bit x (x represents an integer ranging from 0 to 7) of the opcode is stored in the bit x of memory 30 at a corresponding address.

As can be understood from the above description, in the conventional microprocessor system 10, each opcode in the program 40 is sequentially stored in the memory 30 in the same order as the opcode is executed. Furthermore, each bit of the opcode is assigned to the same bit of the memory 30 at the address at which the opcode is stored. This makes it possible for outsiders to easily analyze and understand the program stored in the memory 30 by reading the contents from memory cells in the memory 30. In addition, the program 40 stored in the memory 30 is transferred from the memory 30 to the MPU 20 via the data bus 72. This allows for the outsiders to recognize the program 40 stored in the memory 30 by monitoring the data transmitted on the data bus 72 rather than by directly retrieving the data from the memory 30. This causes a fifth disadvantage of the known approach as follows. The outsiders may easily analyze the behavior of the microprocessor system 10 when the memory 30 stores data into its memory cell while keeping a bit order of the data in the same order as transmitted on the data bus 72.

FIG. 12 shows a diagram of an LSI circuit used in a conventional IC card, the LSI circuit comprising an MPU, an EEPROM, a RAM, and a ROM. In general, these elements are arranged on a single chip and the LSI circuit further includes a bus area, which bus area connects wires between these elements.

FIG. 13 illustrates an example of a layout of buses according to the prior art. As shown in FIG. 13, the layout is provided with a circuit 100, such as a memory, bus lines 101, 102, . . . , 108, bus lines in columns 111, 112, . . . , 118, bus lines in rows 121, 122, . . . , 128, and through holes A and B. In this case, a count of these bus lines corresponds to a count of bits comprising data to be transmitted via these buses. Hereinafter, a set of 8 bus lines is also referred to as a "bus-line group." In the conventional LSI circuit, as shown in FIG. 13, a bus-line group in columns and a bus-line group in rows are formed on separate interconnection layers. For example, it is assumed that a number of the interconnection layers amounts to 4. In this case, the bus-line group in columns, i.e., the bus lines in columns 111, 112, . . . , 118, is divided so as to be assigned to second and fourth interconnection layers, and the bus-line group in rows, i.e., the bus lines 121, 122, . . . , 128, is divided so as to be assigned to first and third interconnection layers. The through holes serve to connect the bus lines in columns and the bus lines in rows between the different interconnect layers. Now, it is assumed that a particular layout achieving an interconnection with a given number of bits is designed. Each bus line assigned to a respective one of the bits is arranged on an interconnection layer such that the bit number corresponding to the bus line is aligned in sequence in order to effectively perform the layout.

As shown in FIG. 13, the bus-line group in columns is arranged on the second interconnection layer and the bus-line group in rows is arranged on the first interconnection layer. On one hand, at a bottom-right part of the drawing, terminals for bits 0, 1, . . . , 8 of a circuit (not shown) are connected to the bus lines 128, 127, . . . , 121, respectively, on the first interconnection layer. The bus lines 128, 127, . . . , 121 are extended in a row direction and reach to the through holes B. The bus lines in rows 128, 127, . . . , 121 are connected to the bus lines in columns 118, 117, . . . , 111 on the second interconnection layer, respectively, via the thorough holes B. On the other hand, terminals bit 7, bit 6, . . . , bit 0 at the circuit 100 are connected to the bus lines in rows 101, 102, . . . , 108, respectively. Furthermore, the bus lines 101, 102 . . . 108 are connected to the bus lines 111, 112, . . . , 118, respectively, via the through holes A.

As a result of the above-mentioned layout, the bus lines in rows 128, 127, . . . , 121 on the first interconnection layer are arranged in sequence such that the bit number increases as the line number decreases. Also, the bus lines in columns 118, 117, . . . , 111 on the second interconnection layer are arranged in sequence such that the bit number increases as the bus line number decreases.

As IC cards are becoming increasingly wide-spread in a variety of applications, it is more important to protect an IC card system from being tampered with. On one hand, signals transmitted on wiring lines within the IC card can be analyzed by means of a fault analysis tool for an LSI circuit. On the other hand, important information, such as a secret key for cryptography, stored in the IC card, is transferred between a microprocessor and various memories via bus lines connecting the microprocessor to the memories. As a result, the important information may be read from the bus lines using the fault analysis system, so that the IC cards may be subject to a risk of being forged. This causes a problem that a level of a security for the IC card system is degraded. Another tool, such as a manual probe unit may be used to read various confidential data from the bus lines.

In the conventional layout of the buses, as shown in FIG. 13, the bus lines are arranged in sequence in terms of the bit number. Therefore, the information transmitted on the bus lines can be easily reconstructed using data picked up from the bus lines bit by bit. Furthermore, if a bus-line group is arranged on a single interconnection layer, the data transmitted on each bus line of the bus-line group can be easily picked up as a whole by directly probing the bus lines. Thus, the conventional layout of the buses has a sixth disadvantage in that the information transmitted on the bus lines may be easily read and determined, so that a behavior of a microprocessor system formed using that layout may be analyzed.

SUMMARY OF THE INVENTION

It is a first object of the present invention to overcome the above-mentioned first disadvantage of the prior art. One aspect of the first object of the present invention relates to a method for randomizing a microprocessor system including a microprocessor and a program executable by the microprocessor, an apparatus for carrying out the method and a randomized microprocessor system. It is assumed that a current microprocessor system comprising a current microprocessor and a current program is provided. The present invention is based on the fact that a further microprocessor system comprising a further microprocessor different from the current microprocessor and a further program different from the current program is generated by randomizing the current microprocessor system while achieving a functionality equivalent to that of the current microprocessor system.

In the context of the present invention, to "randomize" a microprocessor system means to randomize a microprocessor and a program included in the microprocessor system while maintaining an equivalence of functionality realized by the microprocessor system regardless of this randomization.

The above first object of the present invention is achieved by a microprocessor system including a microprocessor and a memory storing items accessible to the microprocessor, the microprocessor system comprising:

means for randomizing the items stored in the memory, and means for randomizing the microprocessor so as to allow the microprocessor to have an access to the randomized items stored in the memory.

In another aspect of the present invention, the above first object is achieved by a method for randomizing a microprocessor system including a microprocessor and a memory storing items accessible to the microprocessor, the microprocessor system performing a given functionality, the method comprising steps of:

(a) randomizing the items stored in the memory in accordance with randomizing information, and (b) randomizing the microprocessor so as to allow the microprocessor to have an access to the randomized items stored in the memory, whereby a randomized microprocessor system performing a functionality equivalent to the given functionality is generated.

The method for randomizing a microprocessor system may further comprise the steps of:

for each randomizing information, repeating the steps (a) and (b), whereby the microprocessor system is separately randomized repeatedly such that separate microprocessor systems realizing an equivalent functionality are generated.

In a further aspect of the present invention, an apparatus for carrying out the above-mentioned method achieves the above first object. According to the present invention, the apparatus for randomizing a microprocessor system including a microprocessor and a memory storing items accessible to the microprocessor, the microprocessor system realizing a given functionality, comprises:

first randomization means for randomizing the items stored in the memory in accordance with randomizing information, and second randomization means for randomizing the microprocessor so as to allow the microprocessor to have an access to the randomized items stored in the memory, whereby a randomized microprocessor system realizing a functionality equivalent to the given functionality is generated.

The apparatus for randomizing a microprocessor system is characterized in that the randomizing information consists of a first key used for randomizing the items in the first randomization means and a second key used for randomizing the microprocessor in the second randomization means, and that the first key and the second key are correspondingly selected such that the randomized microprocessor system is capable of realizing the functionality equivalent to the given functionality. Thus, an appropriate selection of the first key and the second key enables an easy tamper-proof action for prohibiting an unauthorized analysis of the microprocessor system.

As previously mentioned, according to the present invention, in an original microprocessor system including a current microprocessor and a current program executable by the microprocessor, a further microprocessor different from the microprocessor and a further program different from the current program are generated by randomizing the current program and the current program, respectively. The further microprocessor realizes a functionality equivalent to that of the current microprocessor and the further program is executable by the further microprocessor. It is noted that the current microprocessor and the current program are randomized based on the same randomizing rule. Thus, a randomized microprocessor system including the further microprocessor and the further program can realize the same functionality as that of the original microprocessor.

Therefore, the present invention has an advantage that a new system having an equivalent functionality to that of the current system can be generated more rapidly and at a lower cost by modifying the microprocessor and the program in a short time, in spite of differences in hardware and software between the new system and the current system.

It is a second object of the present invention to overcome the above-mentioned second disadvantage of the prior art. One aspect of the second object of the present invention relates to a method for randomizing a microprocessor system including a microprocessor and a memory storing a program executable by the microprocessor, in that the program is stored in the memory such that the program cannot be understood by reading the program from the memory in sequence. Another aspect of the second object of the present invention relates to an apparatus for carrying out the above method. A further aspect of the second object of the present invention relates to a randomized microprocessor system.

The second object of the present invention is achieved by a microprocessor system including a microprocessor and a memory storing a program executable by the microprocessor, the microprocessor system realizing a given functionality, the microprocessor system comprising:

means for randomizing addresses according to randomizing information, codes of the program stored in the memory at the addresses being accessible by the microprocessor, wherein the memory stores the codes of the program at the randomized addresses.

The second object of the present invention is also achieved by a microprocessor system including a microprocessor and a memory storing codes of a program executable by the microprocessor, the microprocessor system realizing a given functionality, the microprocessor system comprising:

a pseudo-random pattern generator for generating a random sequence other than a sequence having numbers sequentially increasing, and program reading means for determining each address at which each code of the program is read from the memory based on the random sequence generated by the pseudo-random pattern generator and for reading the code from the memory at the determined address.

In the microprocessor system according to the present invention, the codes of the program are stored in the memory at the addresses specified by the random sequence. Therefore, the program cannot be appreciated as a correct series of the codes when the codes stored in the memory are read at the addresses in a sequential order. Advantageously, this makes it difficult for outsiders to analyze and understand the program correctly.

It is a third object of the present invention to overcome the above-mentioned third disadvantage of the prior art. One aspect of the third object of the present invention relates to a method for randomizing a microprocessor system including a microprocessor and a memory storing a program executable by the microprocessor. The microprocessor system is randomized such that it is difficult to analyze and understand the program stored in the memory, and, thus, a behavior of the microprocessor. Another aspect of the third object of the present invention relates to an apparatus for carrying out the above method. A further aspect of the third object of the present invention relates to a randomized microprocessor system.

The above third object of the present invention is achieved by a microprocessor system including a microprocessor and a memory storing items accessible to the microprocessor. The microprocessor system comprises:

means for converting a first address generated in the microprocessor into a second address in accordance with a given rule, and means for having an access to the memory at the second address.

In the microprocessor system according to the present invention, each opcode to be executed by the microprocessor is stored in the memory at the second address different from the first address at which the microprocessor considers the opcode is stored. As a result, since the opcodes stored in the memory are arranged in a randomized order, the microprocessor can not appropriately read and execute the opcodes in the memory. Therefore, it is difficult for outsiders to analyze and understand a behavior of the microprocessor system by directly reading the opcodes or contents stored in the memory. Advantageously, this improves a security for the microprocessor system, in particular, an IC card system.

It is a fourth object of the present invention to overcome the above-mentioned fourth disadvantage of the prior art. One aspect of the fourth object of the present invention relates to a microprocessor system whose program counter includes a pseudo-random pattern generator, in particular, such as an LFSR (Linear Feedback Shift Register). The microprocessor system has to be able to generate a correct jump address when a jump instruction is to be executed.

The above fourth object of the present invention is achieved by a microprocessor system including a microprocessor and a memory storing a program executable by the microprocessor. The microprocessor system comprises:

a pseudo-random pattern generator for generating a random sequence other than a sequence having numbers sequentially increasing;

program reading means for randomizing each address of the memory based on the random sequence generated by the pseudo-random pattern generator and for reading each code of the program from the memory at the randomized address;

jump address memory means for storing address information corresponding to a jump address for a jump instruction, the address information being represented by the randomized address, and means having an access to the jump address memory means and retrieving the jump address information from the jump address memory means in response to the code of the program read from the memory being the jump instruction.

In the microprocessor system according to the present invention, it is advantageous that the microprocessor system can generate a correct jump address for a jump instruction while a program counter of a microprocessor comprises a pseudo-random pattern generator such as an LFSR.

It is a fifth object of the present invention to overcome the above-mentioned fifth disadvantage of the prior art. One aspect of the fifth object of the present invention relates to a method for randomizing a microprocessor system including a microprocessor and a memory storing a program executable by the microprocessor. The microprocessor system is randomized by exchanging an order of a bit alignment on a path from the microprocessor to the memory in order to make it difficult to read and analyze the program stored in the memory or transmitted on a bus, and thus preventing a behavior of the microprocessor system from being easily analyzed and understood by reading the program. Another aspect of the fifth object of the present invention relates to a randomized microprocessor system.

The above fifth object of the present invention is achieved by a microprocessor system including a microprocessor and a memory storing items accessed by the microprocessor. The microprocessor system comprises:

means provided between the microprocessor and the memory for differentiating a bit order of a first item processed by the microprocessor from that of a second item corresponding to the first item and stored in the memory.

A further aspect of the fifth object of the present invention relates to a method for randomizing a microprocessor system including a microprocessor and a memory storing a program executable by the microprocessor. The microprocessor system is randomized by inverting some bit values on a path from the microprocessor to the memory in order to make it difficult to read and analyze the program stored in the memory or transmitted on a bus, and thus prevent a behavior of the microprocessor system from being easily analyzed and understood by reading the program. Still a further aspect of the fifth object of the present invention relates to a randomized microprocessor system.

The above fifth object of the present invention is also achieved by a microprocessor system including a microprocessor and a memory storing items accessed by the microprocessor. The microprocessor system comprises:

means provided between the microprocessor and the memory for inverting some bit values of an intermediate item between a first item processed by the microprocessor and a second item corresponding to the first item and stored in the memory.

In the microprocessor system according to the present invention, the bit order is exchanged and/or the bit value is inverted for the intermediate item between the first items processed by the microprocessor and the second items stored in the memory. Therefore, it is difficult for outsiders to analyze and understand a behavior of the microprocessor system by directly reading the opcodes or contents stored in the memory or monitoring the data transmitted on a data bus. Advantageously, this improves a security for the microprocessor system, in particular, an IC card system.

It is a sixth object of the present invention to overcome the above-mentioned sixth disadvantage of the prior art. The sixth object of the present invention relates to the fact that a microprocessor system including bus lines is randomized such that it is difficult to analyze and understand data transmitted on the bus lines when the data is tapped at the bus lines.

The above sixth object of the present invention is achieved by a microprocessor system including a microprocessor, a memory storing items accessed by the microprocessor and a plurality of interconnection layers being connected to, on one hand, the microprocessor and, on the other hand, the memory and forming bus lines in columns and bus lines in rows, the bus lines arranged on the separate interconnection layers being connected to one another via through holes, characterized in that:

the bus lines in columns and the bus lines in rows are aligned in a random bit order with respect to a bit order of digital signals to be processed.

The through holes may be randomly arranged with respect to the bit order of the digital signals to be processed.

Thus, according to the present invention, since the bus lines are randomly aligned to the bit order of the digital signals to be processed and, as a result, the bits of the signals transmitted on the bus lines are not ordered in sequence, it is difficult to analyze the signals by reading the signals from the data bus.

Furthermore, in another aspect of the sixth object of the present invention, it is required that bus lines of a microprocessor system be protected from being directly contacted by some tools such as a manual probing unit.

This object is achieved by distributing at least a set of bus lines in columns or in rows over some interconnection layers. In this case, since all the bus lines of the set of the bus lines in columns or in rows are not always provided on the same interconnection layer, it is difficult to analyze or set the data on the bus lines by directly contacting the bus lines by means of the tool, for example, the manual probing device.

In a further aspect of the sixth object of the present invention, a metallic interconnection layer of a rectangular shape covers at least a portion of a region around the through hole. Thus, patterns formed on the interconnection layers are protected from being analyzed.

BRIEF DESCRIPTION OF THE DRAWINGS

Other objects, features and advantages of the present invention will become more apparent from the following detailed description when read in conjunction with the accompanying drawings, in which:

FIG. 7 shows an example of a program containing an unconditional jump instruction and stored in a memory of the prior art;

FIG. 8 shows an example of a program containing a relative jump instruction and stored in a memory of the prior art;

FIG. 11 shows an example of contents of a memory containing a program of the prior art;

FIG. 24 illustrates an example of a program stored in a memory 230;

FIG. 26 shows a schematic diagram of a first variation of the microprocessor system according to the second embodiment of the present invention;

FIG. 31 shows an example of an input-output relation of an address converter block;

FIG. 32 illustrates a part of a program stored in a memory 230 according to the third embodiment of the present invention;

FIG. 36 shows a schematic diagram of a microprocessor system according to a fourth embodiment of the present invention;

FIG. 40 illustrates an example of a program stored in a memory used in the fifth embodiment of the present invention;

FIG. 42 illustrates an example of a program stored in a memory according to the sixth embodiment of the present invention;

FIG. 46 shows an example of data to be stored in a memory according to the seventh embodiment of the present invention;

FIG. 50 schematically illustrates contents of control signals stored in a memory;

FIG. 51 shows control signals to be supplied to a bit-order exchanging block in order to exchange a bit order as shown in FIG. 45;

FIG. 64 illustrates an example of data to be stored in a memory according to the eighth embodiment of the present invention;

FIG. 76 illustrates a variation of the third example of the bus lines according to the ninth embodiment of the present invention;

An identical numerical reference is used to designate the same or similar elements throughout the drawings.

DETAILED DESCRIPTION OF THE PREFERRED EMBODIMENTS

Figure 14:
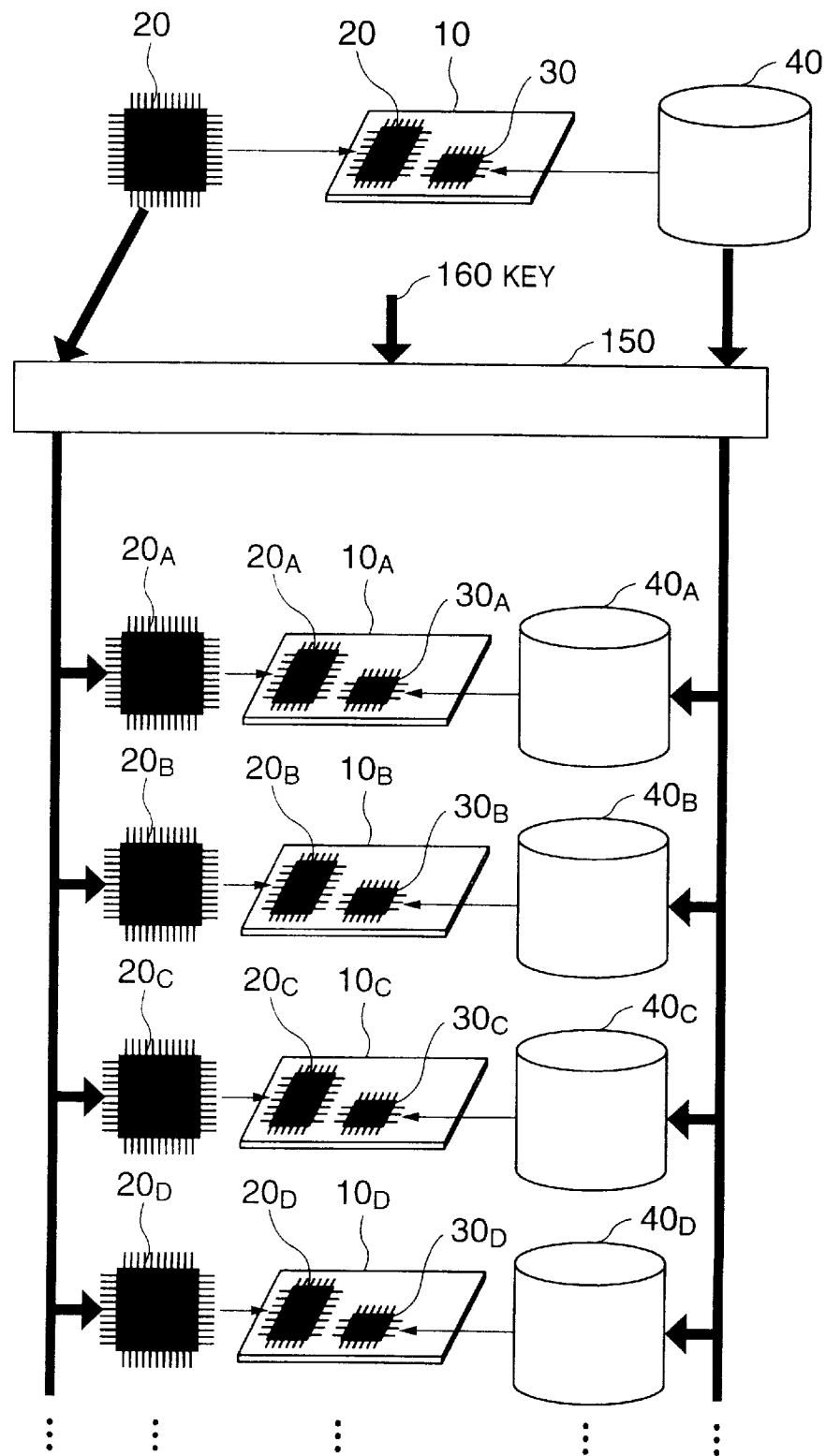
FIG. 14 illustrates how a microprocessor system is randomized according to a first embodiment of the present invention.

FIG. 14 illustrates how a microprocessor system is randomized according to a first embodiment of the present invention. A microprocessor system 10 includes the microprocessor 20 and a memory 30 into which a program 40 executable by the microprocessor 20 is loaded. In particular, a general method for randomizing the microprocessor system 10 by randomizing the microprocessor 20 and the program 40 is represented in FIG. 14.

In this case, an internal logic within the microprocessor 20 is randomized with a predetermined key 160 by a randomizer 150. Also, the program 40 to be stored in the memory 30 is randomized with another or the same predetermined key by the randomizer 150. For example, randomizing the microprocessor 20 with the key 160A by the randomizer 150 yields a randomized microprocessor 20A. Also, randomizing the microprocessor 20 with a key 160B other than the key 160A produces a further randomized microprocessor 20B, and so on.

The randomizer 150 also randomizes the program 40 with the key 160. For example, the randomizer 150 produces randomized programs 40A, 40B, 40C, and so on, by randomizing the program 40 by keys 160A, 160B, 160C, and so on, respectively.

Either the same key or a different key may be used for randomizing the microprocessor and the program based on a structure of the randomizer 150.

As mentioned earlier, to "randomize" a microprocessor system means to randomize a microprocessor and a program included in the microprocessor system with randomizing information while maintaining an equivalence of functionality realized by the microprocessor system regardless of this randomization. Thus, a randomized microprocessor 20A produced by randomizing the microprocessor 20 with predetermined randomizing information and a randomized program 40A produced by randomizing the program 40 form together a randomized microprocessor system 10A. Such a randomized microprocessor system 10A can realize the same functionality as that of the microprocessor system 10. A further randomized microprocessor system 10B produced by randomizing the microprocessor 20 and the program 40 with different randomizing information may realize the same functionality as that of the microprocessor system 10.

With respect to the randomizing information, it can be the that different randomizing information items I1 and I2 produce differently randomized microprocessors M1 and M2, respectively, as well as differently randomized programs P1 and P2, respectively. One of the differently randomized microprocessors M1 and M2 may have a different hardware configuration from the other one. Also, one of the differently randomized programs P1 and P2 may have a different software configuration from the other one. In the context of the present invention the fact that the program has the different software configuration means that, for example, instruction codes included in the program have been arranged in a different order from those of other programs. This discussion may be applied to any randomized microprocessor system 10A, 10B, and so on.

Figures 15, 16:
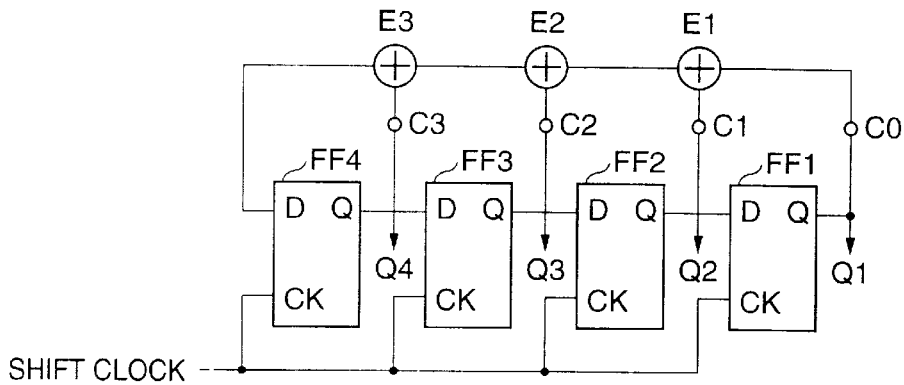
FIG. 15 shows a diagram of a pseudo-random pattern generator in the microprocessor system according to the first embodiment of the present invention.
FIG. 16 shows a table for representing a particular example of a key given to a pseudo-random pattern generator 170.

FIG. 15 shows a diagram of a pseudo-random pattern generator 170 provided in the microprocessor 20. The pseudo-random pattern generator 170 serves as a program counter in the microprocessor 20. As a structure of the pseudo-random pattern generator 170 is modified, a pseudo-random sequence generated by the pseudo-random pattern generator 170 changes. Thus, in the microprocessor 20 whose program counter is formed by the pseudo-random pattern generator 170, it may be the that modifying the structure of the pseudo-random pattern generator 170 randomizes the microprocessor 20. In other words, the microprocessor 20 including the modified pseudo-random pattern generator 170 may be referred to as a randomized microprocessor.

As shown in FIG. 15, the typical pseudo-random pattern generator 170 may comprises an LFSR (Linear Feedback Shift Register). In this case, the LFSR comprises four D type flip-flops FF1, FF2, FF3 and FF4 which are connected in series, three logic gates E1, E2 and E3, and connection points C0, C1, C2 and C3. A given key 160 determines whether the connection points are connected (closed) or not (open) and whether the logic gates are an EXOR (EOR or XOR) gate or an EXNOR (ENOR or XNOR) gate. The D flip-flops FF1, FF2, FF3 and FF4 generate signals Q1, Q2, Q3 and Q4 as output signals. The generated signals Q1, Q2, Q3 and Q4 are combined so as to be a 4-bit address, and which correspond to a pseudo-random number generated by the pseudo-random pattern generator 170.

In FIG. 15, a symbol:

⊕ represents an EOR logic gate or an ENOR logic gate, and a symbol:

o represents the connection point.

FIG. 16 shows a table for representing a particular example of a key given to a pseudo-random pattern generator 170. In FIG. 16, 3 keys 160A, 160B and 160C are shown as individual examples of the key 160. The connection point C0 is always set to "1" and remains connected. Other connection points C1, C2 and C3 are either connected or not connected based on the value of the key, such as the key 160A, 160B or 160C. Also, the value of the key 160A, 160B or 160C specifying the logic gate E1, E2 or E3 determines whether each logic gate E1, E2 or E3 is the EOR gate or the ENOR gate. In other words, if the key is set to "1", the corresponding logic gate is the ENOR gate, and, otherwise, the EOR gate is selected.

Figures 17A, 17B:
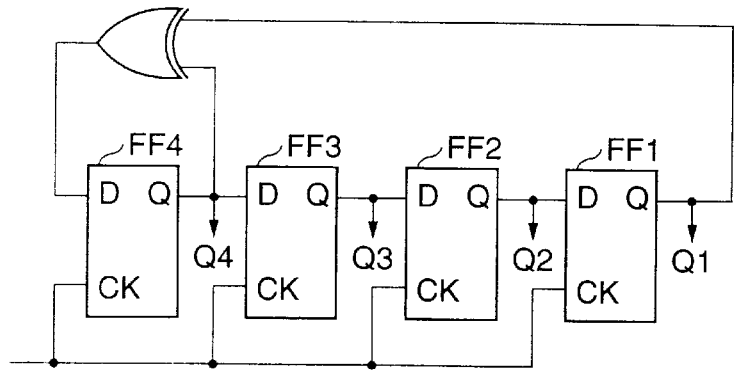
FIG. 17A shows a diagram of a pseudo-random pattern generator 170A in a randomized microprocessor 20A which is created using the key 160A shown in FIG. 16
FIG. 17B represents a table containing addresses generated by the pseudo-random pattern generator 170A according to an embodiment of the present invention.

FIG. 17A shows a diagram of a pseudo-random pattern generator 170A in a randomized microprocessor 20A which is created using the key 160A shown in FIG. 16 and FIG. 17B represents a table containing addresses generated by the pseudo-random pattern generator 170A.

As shown in FIG. 16, the key 160A makes the connection points C0 and C3 be connected (or closed), the logic gate E1 to be the ENOR gate, and the logic gates E2 and E3 to the XOR gate. Since the gates C1 and C2 are not connected (or open), the logic gate E1 set as the ENOR gate and the logic gate E2 set as the XOR gate are shorted. In this case, the pseudo-random pattern generator 170A sequentially generates the addresses "0001," "1000," "1100," . . . , as clocks CL1, CL2, CL3, . . . are generated.

Thus, a net list of the LFSR is created based on the key 160A, as shown in FIG. 16. Next, the net list thereof is provided to a logic simulator (not shown), which produces the same pseudo-random sequence as that generated from the pseudo-random pattern generator. Firstly, the randomized microprocessor 20A based on the key 160A is generated such that the microprocessor includes the pseudo-random pattern generator intended for an address counter, in particular, a program counter. After the key 160A is given to a first randomizer that is provided in the randomizer 150 and is used to randomize the microprocessor 20, the first randomizer is triggered and creates the randomized microprocessors 20A for the key 160A. The same is applied to the microprocessors 20B and 20C for the keys 160B and 160C, respectively.

Secondarily, an order of codes arranged in the program 40 to be executed by the microprocessor 20 is randomized by a second randomizer within the randomizer 150 in accordance with addresses generated by the pseudo-random pattern generator. For example, with reference to FIG. 17B, a combination of the signals Q4, Q3, Q2 and Q1 is utilized for a 4-bit address. In this case, an instruction code OP1 is assigned to the address 0001 generated at a clock CL1, the instruction code OP2 is assigned to the address 1000 at the clock CL2, the instruction code OP3 is assigned to the address 1100 at the clock CL3, and so on.

Thus, since the instruction code is assigned to the particular address which is generated at the particular clock, each instruction code of the codes op1, op2, op3, . . . is generated at the respective clock CL1, CL2, CL3, . . . in the same sequence as the original microprocessor system 10 generates the instruction codes. Therefore, it is ensured that the randomized microprocessor system 10A including the randomized microprocessor 20A and the randomized program 40A can realize the same functionality as that of the original microprocessor system 10.

Figures 18A, 18B:
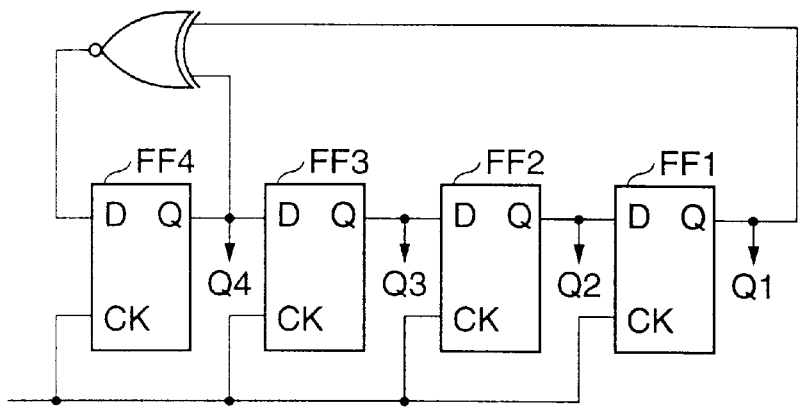
FIG. 18A shows a diagram of a pseudo-random pattern generator 170B in a randomized microprocessor 20B which is created using the key 160B shown in FIG. 16
FIG. 18B represents a table containing addresses generated by the pseudo-random pattern generator 170B according to an embodiment of the present invention.

Also, FIG. 18A shows a diagram of a pseudo-random pattern generator 170B in a randomized microprocessor 20B which is created using the key 160B shown in FIG. 16 and FIG. 18B represents a table containing addresses generated by the pseudo-random pattern generator 170B.

Figures 19A, 19B:
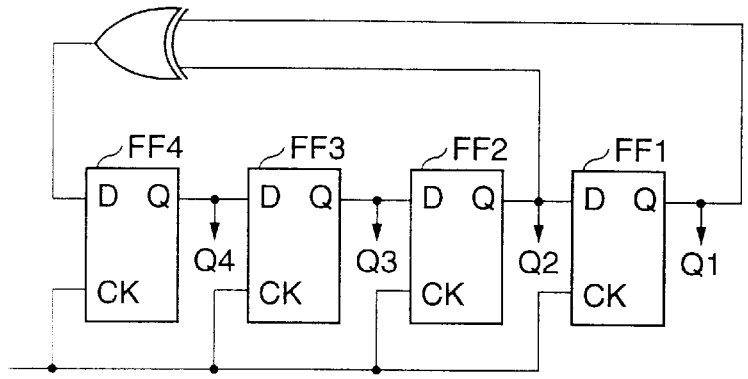
FIG. 19A shows a diagram of a pseudo-random pattern generator 170C in a randomized microprocessor 20C which is created using the key 160C shown in FIG. 16
FIG. 19B represents a table containing addresses generated by the pseudo-random pattern generator 170C according to an embodiment of the present invention.

Furthermore, FIG. 19A shows a diagram of a pseudo-random pattern generator 170C in a randomized microprocessor 20C which is created using the key 160C shown in FIG. 16 and FIG. 19B represents a table containing addresses generated by the pseudo-random pattern generator 170C.

The above-mentioned description for the key 160A and the microprocessor system 10A can be applied to the key 160B and the microprocessor system 10B as well as the key 160C and the microprocessor system 10C.

Briefly speaking, on one hand, the randomizer 150 operates so as to change the addresses generated by the pseudo-random pattern generator 170 corresponding to the program counter by modifying the structure of the LFSR. This results in the net list for the randomized microprocessor.

On the other hand, the randomizer 150 operates so as to allow the instruction codes of the program to be stored in the memory in an order of the addresses generated by the LFSR for each randomized microprocessor. Alternatively, the order of the instruction codes within the program is exchanged such that the instruction codes are stored in the memory in the order of the addresses generated by the LFSR. It is required that the program counter of the microprocessor 20 be formed by the LFSR in accordance with the randomizer 150.

In this embodiment, as shown in FIG. 14, to randomize the microprocessor 20 and the program 40 with the various keys 160A, 160B, 160C and 160D different from one another generates the randomized microprocessors 20A, 20B, 20C and 20D different from one another. Also, the randomized programs 40A, 40B, 40C and 40D different from one another are generated. It should be noted that for each key 160I (I=A, B, C or D), a combination of the randomized microprocessor 20I and the randomized program 40I can produce the randomized microprocessor system 10I that realizes the equivalent functionality to that of the microprocessor system 10.

It is assumed that the randomized microprocessor system 10A with the key 160A is the current microprocessor system in use. Even if a behavior of the current microprocessor system 10A is analyzed and understood by outsiders, the current microprocessor system 10A can be rapidly replaced with the different randomized microprocessor system 10B by randomizing the original microprocessor system 10 with the key 160B different from the key 160A. This replacement may introduce a structural difference in terms of hardware and software within the microprocessor system in use, while an equivalence of functionality in the microprocessor system in use is advantageously maintained. Therefore, it is an advantage according to this embodiment that the current microprocessor system tampered with by the outsiders can be easily replaced with a new microprocessor system without requiring a long term as well as a large amount of an additional cost in designing a new hardware and software. Consequently, a damage caused by an analysis of the microprocessor system, such as an IC card, can be minimized according to the first embodiment of the present invention.

The microprocessor system 10 comprising the microprocessor 20 and the program 40 may be replaced with a new randomized microprocessor system in a considerably shorter period than a time required for analyzing and understanding the microprocessor system 10, regardless of whether an actual tampering occurs or not. This provides an advantage that before the behavior of the microprocessor system is successfully analyzed and understood by the outsiders, the current microprocessor system may already be replaced with the new randomized microprocessor system, such that results of this analysis and understanding are invalid and the current microprocessor system is, thus, tamper-proof.

When the LFSR is utilized as the program counter in the microprocessor, the key 160 serves as a parameter for defining the structure of the LFSR. It is the structure of the LFSR that determines the pseudo-random sequence generated by the LFSR. In an embodiment of the present invention, a method for randomizing the microprocessor system consists of determining the structure of the LFSR based on the given key 160, and, thus, determining the pseudo-random sequence generated by the LFSR. The method further determines an address at which an instruction code of a program to be executed by the microprocessor is stored in the memory 30. The method for randomizing the microprocessor system according to the embodiment of the present invention simulates an operation of the LFSR defined by the key 160. Thereafter, the method rearranges the instruction codes in the memory 30 in accordance with an order of the instruction codes produced by this simulation of the operation of the LFSR.

Figure 20:
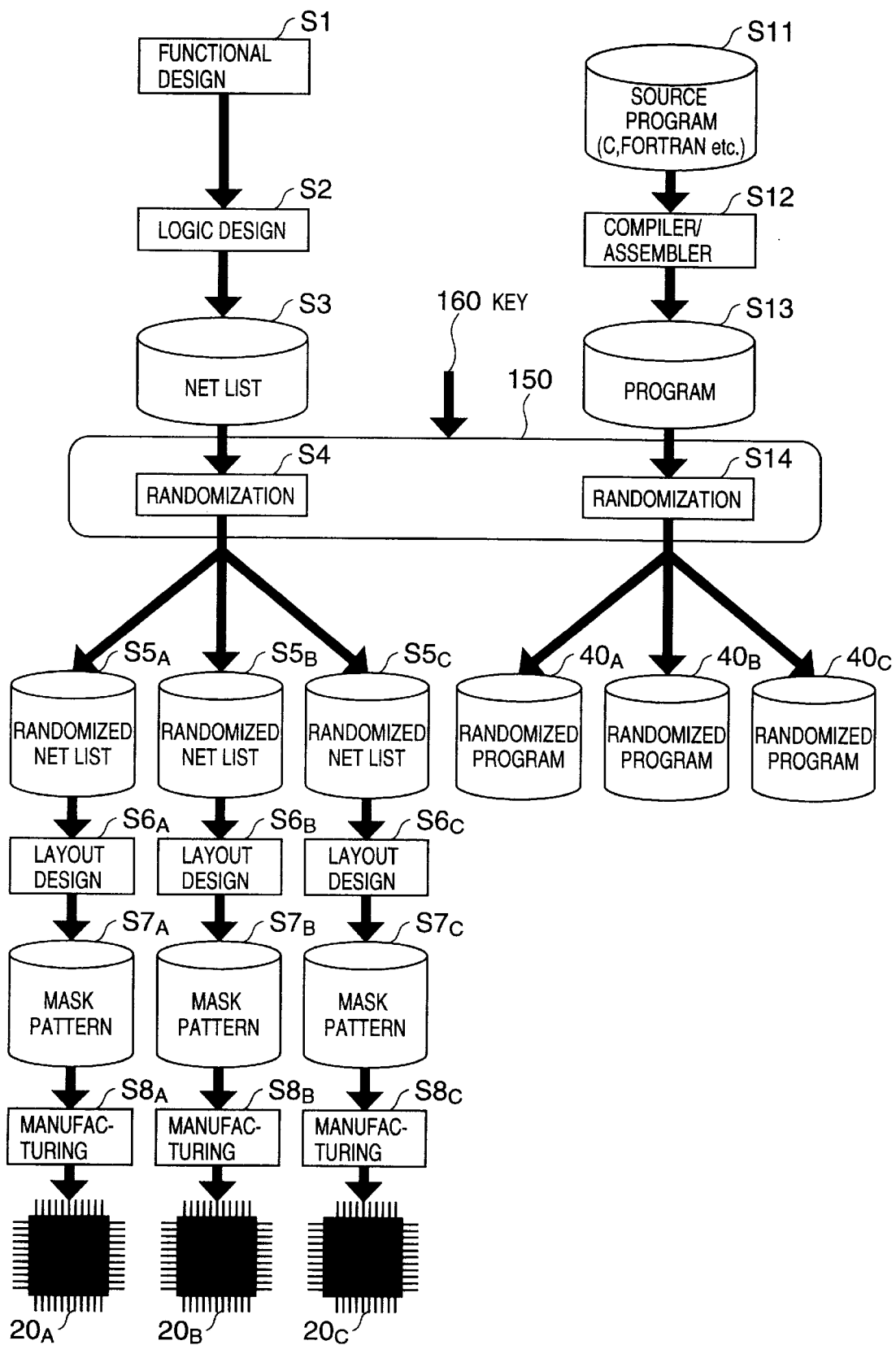
FIG. 20 is a flowchart for representing a method for randomizing a microprocessor system in detail according to the embodiment of the present invention.

In FIG. 20, a flowchart of a microprocessor development process for explaining the method for randomizing the microprocessor system in detail is shown.

On one hand, in step 1, the microprocessor development starts with functional design. Next, logic design is performed in step 2, and, in step 3, a net list is generated from the logic design. Thereafter, the resultant net list is randomized in step 4, and various randomized net lists may be generated in step 5A, 5B or 5C. A layout designing for each net list is performed in step 6A, 6B or 6C, a mask pattern for each net list is created in step 7A, 7B or 7C, and then a randomized microprocessor for each net list is manufactured in step 8A, 8B or 8C.

On the other hand, the program development starts with describing a source program with a high-level language such as Fortran or C in step 11. Next, the source program is compiled or assembled into a sequence of machine codes in step 12 and the sequence of the machine codes are stored in a memory as an executable program in step 13. The program is randomized in the randomizer 150 in step 14 and the randomized program is produced in step 40A, 40B or 40C.

In this example, the microprocessor is randomized based on the net list. However, it is not intended to restrict the randomization in this case, but a functional description of the microprocessor provided by the functional design may be directly randomized and thus result in a randomized functional description RFDA, RFDB or RFDC. Then, logical designing and layout of each randomized functional description RFDA, RFDB or RFDC may be carried out in order to generate the randomized microprocessor.

Figure 21:
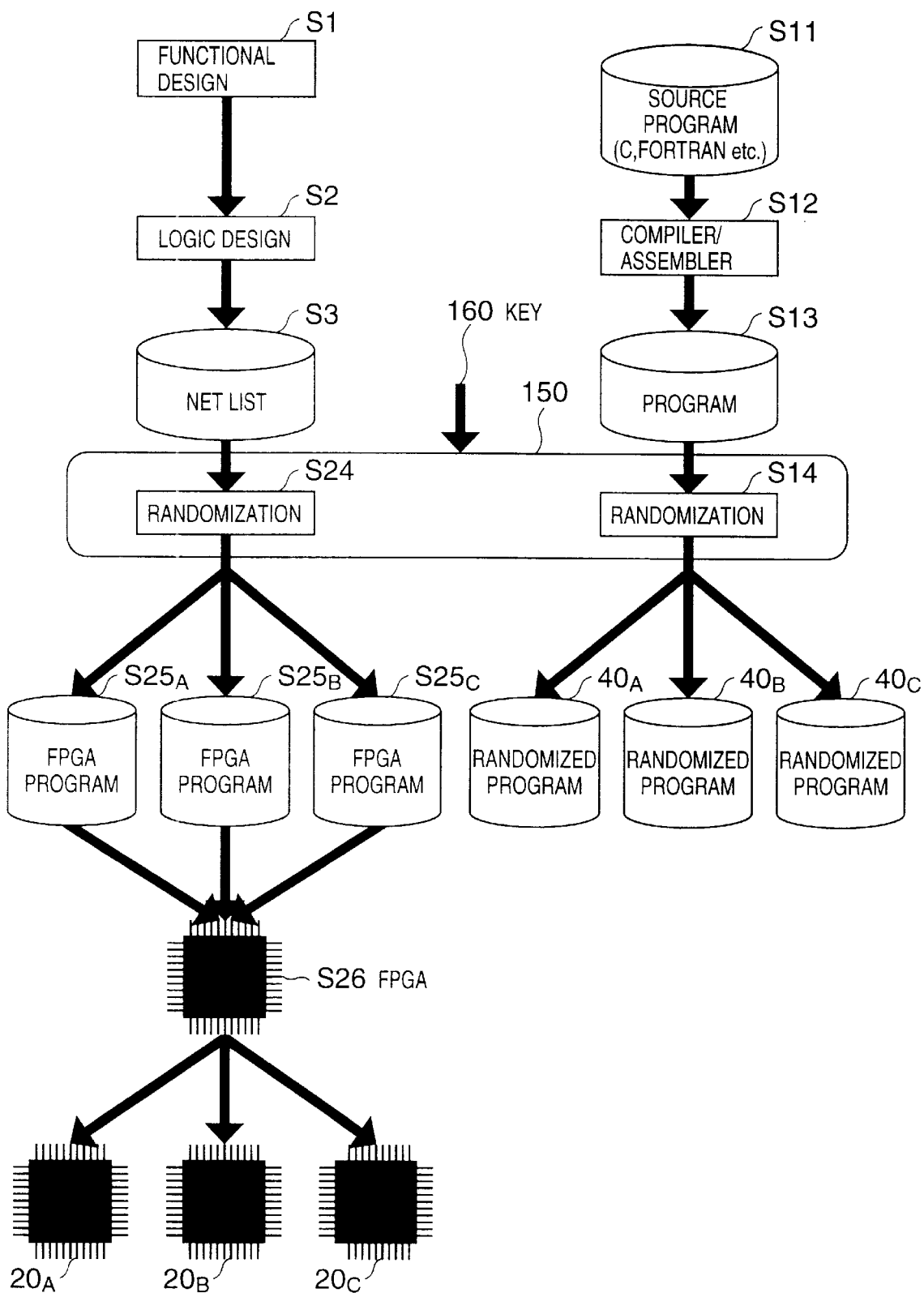
FIG. 21 is a flowchart for representing a method for randomizing a microprocessor system according to another embodiment of the present invention.

FIG. 21 is a flowchart for representing a method for randomizing a microprocessor system according to another embodiment of the present invention. In this case, since the program is randomized in the same manner as described with reference to FIG. 20, a further explanation of randomizing the program will not be necessary. Therefore, only the method for randomizing the microprocessor will be explained.

With respect to randomizing the microprocessor, a part of the microprocessor 20, that is a part to be randomized within the microprocessor 20, has been previously formed by a FPGA (Field Programmable Gate Array).

Developing the microprocessor starts with functional designing in step 1. Then, after logic designing is carried out in step 2, a net list of the microprocessor is created in step 3. Only a part of the net list, which representing a part previously formed by the FPGA within the microprocessor, is randomized in step 24 by a randomizer 150. Then, a FPGA program for each randomized part of the microprocessor is created in accordance with a result of this randomization in step 25A, 25B or 25C. Subsequently, the created FPGA program for each microprocessor is loaded into the FPGA part within the microprocessor in step 26. As a result, the randomized microprocessor 20A, 20B or 20C is produced.

As previously described, in randomizing the microprocessor 20, the randomizer 150 modifies the structure of the LFSR serving as the pseudo-random pattern generator. Accordingly, as the addresses generated by the program counter are changed, the net list of the randomized microprocessor may be generated. It is assumed that a feedback path of the LFSR is formed by the FPGA, and the FPGA program to be loaded for that feedback path of the LFSR is generated to randomize the microprocessor.

According to another aspect of the first embodiment of the present invention, an apparatus for carrying out the above method is provided. The apparatus randomizes a microprocessor system including a microprocessor and a memory storing items to be accessed by the microprocessor and realizing a predetermined functionality. The apparatus comprises a first randomizer for randomizing the items stored in the memory in accordance with randomizing information and a second randomizer for randomizing the microprocessor in accordance with the randomizing information such that the randomized microprocessor is able to have an access to the randomized items stored in the memory. As a result, the microprocessor system is randomized such that a combination of the randomized microprocessor and the randomized items achieves a functionality equivalent to the predetermined functionality. The randomizing information may comprise a first key for randomizing the items and a second key for randomizing the microprocessor, and the first and second keys may be correspondingly selected such that the randomized microprocessor system is constructed for realizing the functionality equivalent to the predetermined functionality.

Figure 22:
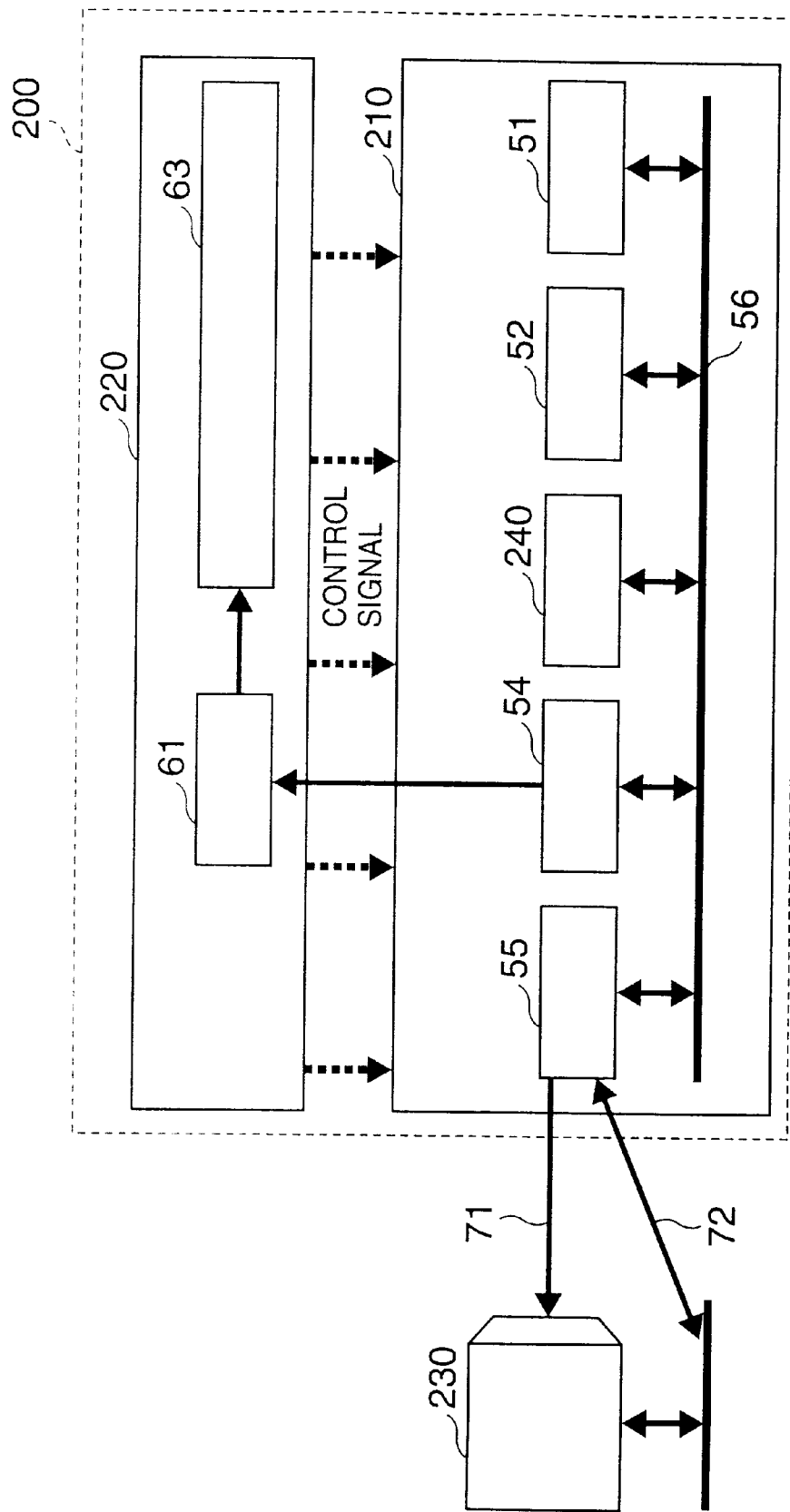
FIG. 22 shows a diagram of a microprocessor system according to a second embodiment of the present invention.

FIG. 22 shows a diagram of a microprocessor system according to a second embodiment of the present invention. The microprocessor system includes a microprocessor or MPU 200 and a memory 230. The microprocessor 200 is provided with a pseudo-random pattern generator 240 for generating a pseudo-random sequence excluding a sequentially incremental sequence. The microprocessor 200 further includes a program reading unit for reading instructions of a program from the memory 230 at an address specified by a value of the pseudo-random sequence generated by the pseudo-random pattern generator 240.

The microprocessor 200 substitutes this pseudo-random pattern generator 240 for a program counter in a conventional microprocessor of the prior art. The pseudo-random pattern generator 240 is an example of a random pattern generator, which generates a sequence other than the sequentially incremental sequence.

As shown in FIG. 22, the microprocessor 200 according to the second embodiment of the present invention includes a data path 210 and a control unit 220.

The data path 210 has an arithmetic logic unit (ALU) 51, a general-purpose register 52, a pseudo-random pattern generator 240, an instruction register 4 and a bus interface 55. The control unit 220 has an instruction decoder 61 and a micro-program control unit 63. The microprocessor 200 is connected to the external memory 230 such as a RAM, ROM, and so on, via an external address bus 71 and a data bus 72.

Figures 23A, 23B:
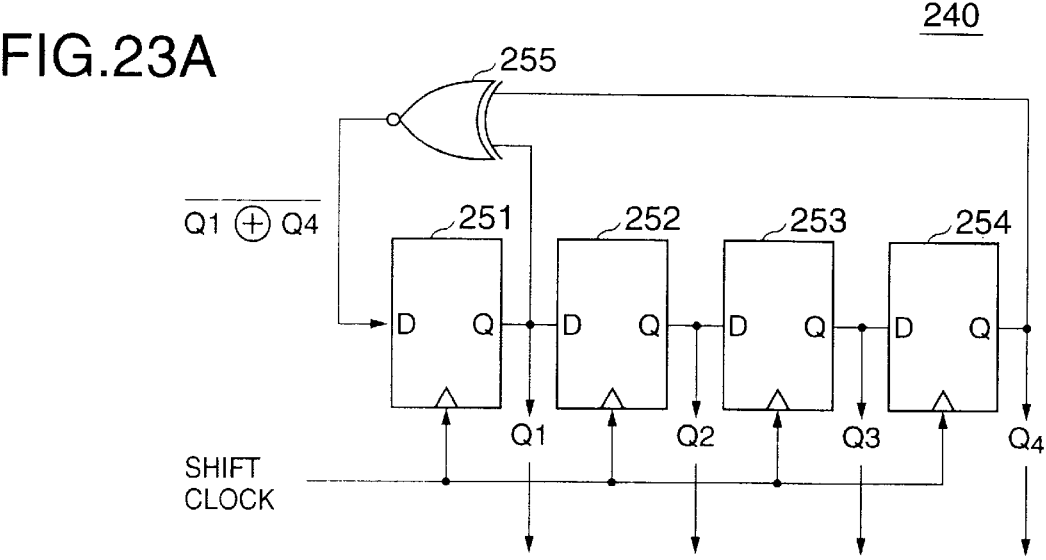
FIG. 23A shows a schematic diagram of a pseudo-random pattern generator 240 and FIG. 23B shows a table containing values generated by the pseudo-random pattern generator 240 according to the second embodiment of the present invention.

FIG. 23A shows a schematic diagram of a pseudo-random pattern generator 240 and FIG. 23B shows a table containing values generated by the pseudo-random pattern generator 240 according to the second embodiment of the present invention. As can be seen from FIG. 23A, the pseudo-random pattern generator 240 comprises D flip-flops 251, 252, 253 and 254, and an ENOR (EXNOR or XNOR) gate 255. The four D flip-flops 251, 252, 253 and 254 are connected in series. Output signals Q1, Q2, Q3 and Q4 from those four D flip-flops 251, 252, 253 and 254, respectively, corresponds to a value generated by the pseudo-random pattern generator 240. The output signals Q1 and Q4 are supplied to the EXNOR gate 255, whose output terminal is connected to a D input terminal of the D flip-flop 251. Here, the output signal from the EXNOR gate 255 can be written as follows.

$$\overline{Q1 \oplus Q4}$$

With reference to FIG. 23B, an operation of the pseudo-random pattern generator 240 will be explained. It is assumed that at a first clock CL1 all the D flip-flops 251, 252, 253 and 254 is set to 0. In this case, the EXNOR gate 255 provides a value of 1 at its output.

At a next clock CL2, the D flip-flop 251 passes an output signal "1" from the EXNOR gate 255 to its terminal Q. At the same clock, the other D flip-flops 252, 253 and 254 provide at their terminal Q a last output signal "0," "0" and "0," respectively, from the preceding D flip-flops 251, 252 and 253. In other words, at the clock CL2, the output signals Q1, Q2, Q3 and Q4 from the pseudo-random pattern generator 240 are combined to form a value of "1000", as shown in FIG. 23B. In this case, the EXNOR gate 255 generates the value of "0".

At a third clock CL3, the D flip-flop 251 passes the output value "0" from the EXNOR gate 255 directly to its terminal Q. At the same time, the other D flip-flops 252, 253 and 254 provide at their terminal Q the last output signal "1", "0" and "0", respectively, from the preceding D flip-flops 251, 252 and 253. In other words, at the clock CL3, the output signals Q1, Q2, Q3 and Q4 from the pseudo-random pattern generator 240 are combined together to form a value of "0100", as shown in FIG. 23B. In this case, the EXNOR gate 255 generates the value of "1".

At a fourth clock CL4, the D flip-flop 251 passes the output value "1" from the EXNOR gate 255 directly to its terminal Q. At the same time, the other D flip-flops 252, 253 and 254 provide at their terminal Q the last output signal "0", "1" and "0", respectively, from the preceding D flip-flops 251, 252 and 253. In other words, at the clock CL4, the output signals Q1, Q2, Q3 and Q4 from the pseudo-random pattern generator 240 are combined together to form a value of "1010", as shown in FIG. 23B. In this case, the EXNOR gate 255 generates the value of "0". At the following clocks CL5, CL6, . . . , the pseudo-random pattern generator 240 operates in the same manner and generates the output signal, as shown in FIG. 23B.

Since the pseudo-random pattern generator 240 continues to generate a sequence of predetermined random numbers in a constant order, it is appreciated that the pseudo-random pattern generator 240 reproduces the same pseudo-random sequence, repeatedly. In this case, the pseudo-random sequence generator sequentially generates the values of 0000, 1000, 0100, 1010, 0101, 0010, 1001, 1100, 0110, 1011, 1101, 1110, 0111, 0011 and 0001.

FIG. 24 illustrates an example of a program stored in the memory 230 according to the second embodiment of the present invention. The microprocessor 200 utilizes the sequence of the pseudo-random number values generated by the pseudo-random pattern generator 240 as the addresses. Each opcode of the opcodes op1, op2, . . . , op15 of the program are stored in the memory 230 at each address specified by the pseudo-random sequence in an order as generated by the pseudo-random pattern generator 240. That is to say, the first opcode op1 is stored in the memory at the address 0000, which corresponds to the first value generated by the pseudo-random pattern generator 240, and the second opcode op2 is stored in the memory at the address 1000, which corresponds to the second value generated by the pseudo-random pattern generator 240. This process is repeated for the succeeding opcodes, such as op3, op4, . . . , as shown in FIG. 24.

An operation of the microprocessor system according to the second embodiment of the present invention will be explained.

At first, an initial value 0000 is set in the pseudo-random pattern generator 240. The microprocessor 200 has an access to the memory 230 at the address 0000 and reads a content from the memory 230 at this address 0000. In this case, since the opcode op1 is contained at the address 0000, the microprocessor 200 executes the opcode op1. After the opcode op1 is executed, the pseudo-random pattern generator 240 generates the address 1000 next to the address 0000 in response to the clock CL1. The microprocessor 200 has the access to the memory at the address 1000, reads the opcode op2 from the memory 230 at the address 1000, and executes the opcode op2. After the opcode op2 is executed, the pseudo-random pattern generator 240 generates the address 0100 next to the address 1000 in response to the clock CL2. The microprocessor 200 has the access to the memory at the address 0100, reads the opcode op3 from the memory 230 at the address 1000, and executes the opcode op3. The following opcodes op4, op5, . . . are executed in the same manner.

In the case the pseudo-random pattern generator substitutes for the program counter in the microprocessor as earlier described with respect to this embodiment and with reference to FIG. 24. Each opcode of the program has been previously stored in the memory 230 at each address specified by the pseudo-random sequence generated from the pseudo-random pattern generator 240. As a result, the microprocessor 200 can read the opcode of the program from the memory 230 in an appropriate order such that the microprocessor 200 can execute the opcode read from the memory 230 in the same order.

It is assumed that outsiders read contents from the memory 230 in order to analyze the contents of the memory 230. When the memory 230 is accessed starting from the address 0000 to the gradually increased address, the contents read from the memory 230 may appear in an order of the opcodes such as op1, op15, op6, op14, and so on. Since this order of the opcodes makes it impossible for the microprocessor 200 to execute the opcodes in sequence, the outsider can not understand a behavior of the microprocessor 200. It should be noted that the values generated from the pseudo-random pattern generator 240 are determined according to the structure of the generator 240. Therefore, it is essential for the outsiders to analyze the structure of the pseudo-random pattern generator 240 in order to analyze correctly the program stored in the memory 230.

Figure 25A:
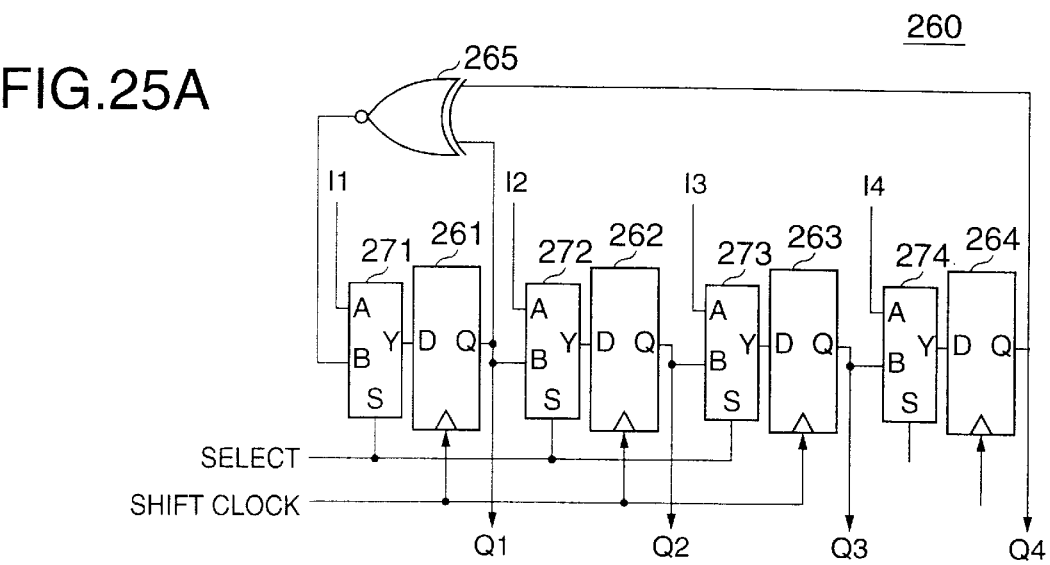
FIG. 25A shows another type of a pseudo-random pattern generator 260 according to the second embodiment of the present invention and FIG. 25B is a sequence chart illustrating an operation of the pseudo-random pattern generator 260.
Figure 25B:
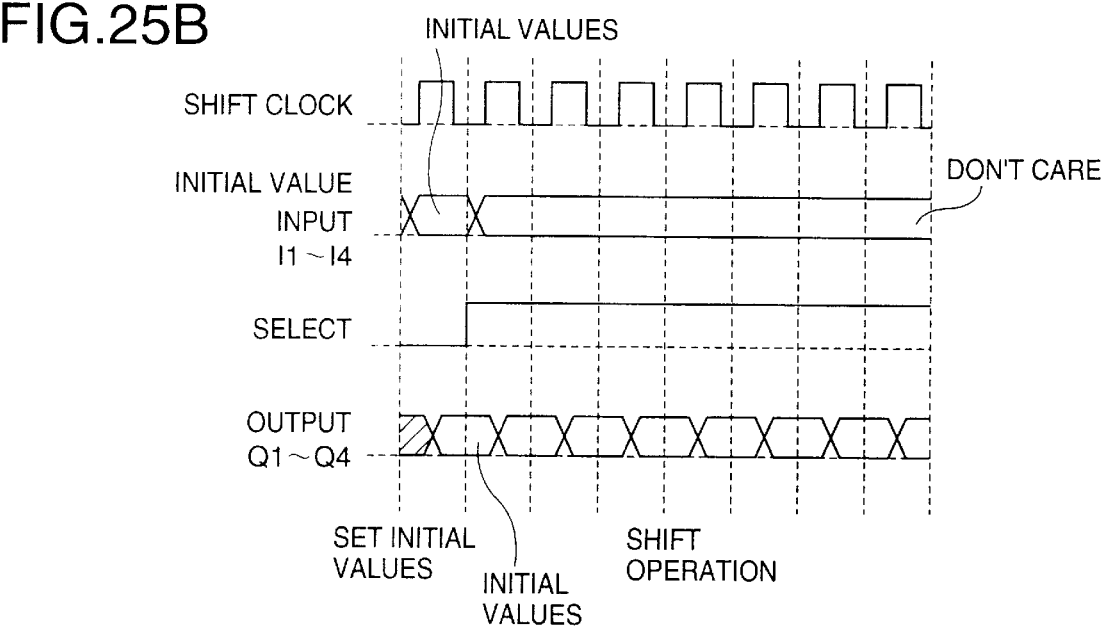

FIG. 25A shows another type of a pseudo-random pattern generator 241 according to the second embodiment of the present invention and FIG. 25B is a sequence chart illustrating an operation of the pseudo-random pattern generator 241. The pseudo-random pattern generator 260 may substitute for the pseudo-random pattern generator 240 and is capable of being initially set to some value.

The pseudo-random pattern generator 260 comprises four D flip-flops 261, 262, 263 and 264, selectors 271, 272, 273 and 274, and an EXNOR (ENOR or XNOR) gate 265. The selector 271, the D flip-flop 261, the selector 272, the D flip-flop 262, the selector 273, the D flip-flop 263, the selector 274 and the D flip-flop 264 are connected in series. The D flip-flops 261, 262, 263 and 264 generate output signals Q1, Q2, Q3 and Q4, respectively, at each terminal Q. The output signals Q1 and Q4 are received at respective inputs of the EXNOR gate 265, whose output terminal is connected to an input terminal B of the selector 271. Input terminals A of the selectors 271, 272, 273 and 274 are connected to initial input terminals I1, I2, I3 and I4, respectively. When a select signal S to each of the selectors is 0, the selector selects the signal present at the input terminal A and when the select signal S to each of the selectors is 1, the selector selects the signal present at the input terminal B. The values of the output signals Q1, Q2, Q3 and Q4 corresponds to the pseudo-random sequence generated by the pseudo-random pattern generator 260.

Initial values of the pseudo-random pattern generator 260 are set as follows. At first, desired initial values are given to the initial input terminals I1, I2, I3 and I4, and the select signal S for each of the selectors 271, 272, 273 and 274 is set to 1 so as to select the signal present at the input terminal A. In response to a shift clock to each selector, each of the selectors outputs the initial value given to each of the initial input terminals I1, I2, I3 and I4. The initial value output from each of the selectors is then applied to the D flip-flop 261, 262, 263 and 264. Thereafter, the select signal S for each of the selectors is switched to 1 and the operation of setting initial values is terminated.

Once the select signal S is set to 1, the selector 271 selects and outputs the output signal from the EXNOR gate 265. The selectors 272, 273 and 274 select and output the signals from the preceding selectors 271, 272 and 273, respectively, connected via the D flip-flops 261, 262 and 263. Thereafter, the select signal S is held at 1. Then, in response to the shift clock the selector 271 selects and outputs the output signal from the EXNOR gate 265 and the selectors 272, 273 and 274 select and output the respective output signal provided at the input terminal B from the preceding selector 271, 272 and 273, respectively.

In the above second embodiment of the present invention, the microprocessor 200 substitutes the pseudo-random pattern generator 240 or 260 for the conventional program counter. The pseudo-random sequence generated by the pseudo-random pattern generator 240 or 260 specifies an address at which the memory 230 containing the program is accessed. This results in instruction codes of the program stored in the memory 230 being aligned in a different order from the order that the microprocessor 200 can sequentially execute. Therefore, it makes it difficult to analyze and understand an operation of the program when the program is read from the memory in a sequential order. Advantageously, this improves a security for the microprocessor system, in particular, an IC card system.

FIG. 26 shows a schematic diagram of a first variation of the microprocessor system according to the second embodiment of the present invention. The microprocessor system comprises a microprocessor 201, which includes a data path 210 and a control unit 221, a memory 230, an address bus 71 and a data bus 72. The control unit 221 is provided with an instruction decoder 64 having a hardware logic unit. In this example, the control unit 221 of the microprocessor 201 does not perform a micro-program control but employs the hardware logic unit. For example, a RISC type microprocessor decodes an instruction code not by means of a micro-program but by the hardware logic unit in the instruction decoder 64, as shown in FIG. 26.

Figure 27:
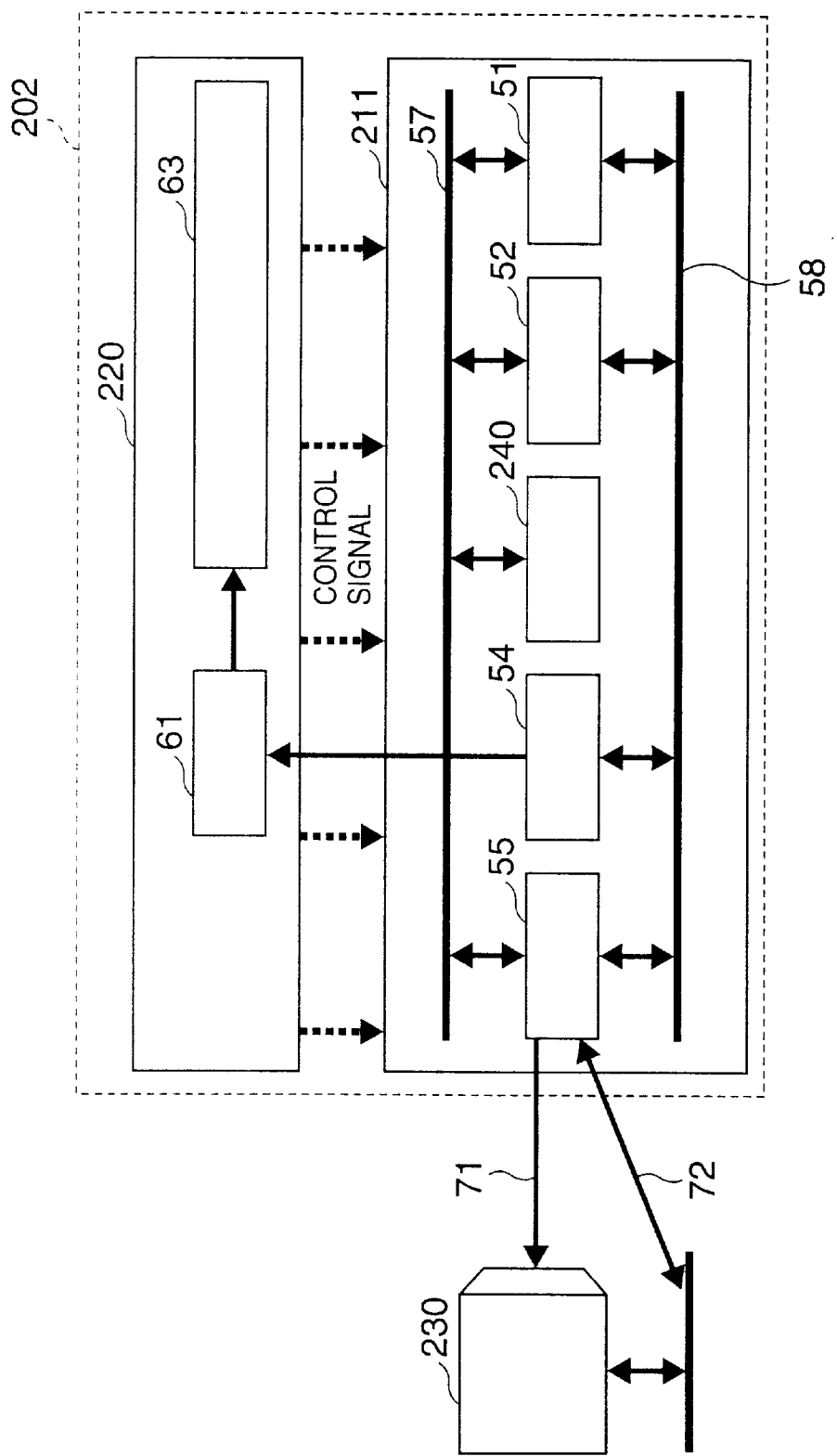
FIG. 27 shows a schematic diagram of a second variation of the microprocessor system according to the second embodiment of the present invention.

FIG. 27 shows a schematic diagram of a second variation of the microprocessor system according to the second embodiment of the present invention. The microprocessor system comprises a microprocessor 202, which includes a data path 211 and a control unit 220, a memory 230, an external address bus 71 and an external data bus 72. An internal bus within the microprocessor chip is divided into an on-chip internal address bus 57 and an on-chip internal data bus 58. An address generated by a pseudo-random pattern generator 240 in the microprocessor 202 is delivered to the on-chip internal address bus 57, which transfers the address to the external address bus 71 via a bus interface 55. According to this microprocessor architecture, a higher data transmission rate and an easier control of the data transmission can be achieved.

Figure 28:
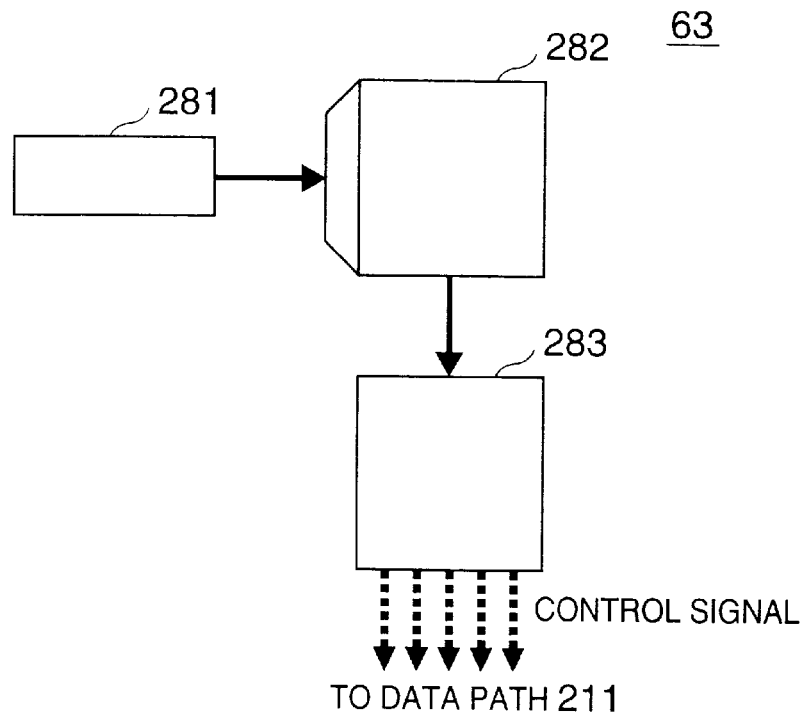
FIG. 28 shows a particular micro-program control circuit according to the second embodiment of the present invention.

FIG. 28 shows a particular micro-program control circuit 63 according to the second embodiment of the present invention. The micro-program control circuit 63 comprises a pseudo-random pattern generator 281, a $\mu$(micro)-program memory 282 and a $\mu$-program instruction decoder 283. The pseudo-random pattern generator 281 may be identical to the above pseudo-random pattern generator 240. It is difficult for outsiders to understand a $\mu$-program stored in the $\mu$-program memory 282. It is noted that each instruction code of the program is sequentially stored in the $\mu$-program memory 282 at an address specified by a pseudo-random number generated from the pseudo-random pattern generator 281.

Figure 29:
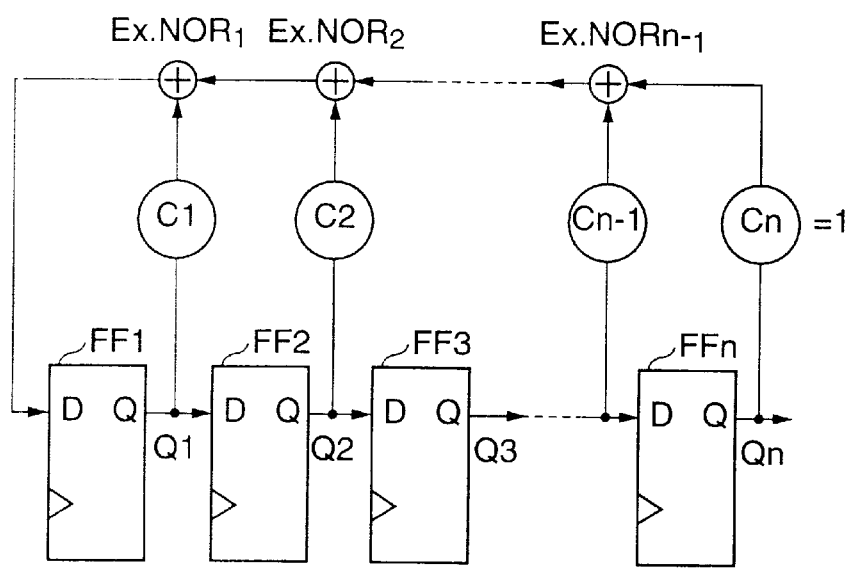
FIG. 29 shows a schematic diagram of a generalized LFSR (Linear Feedback Shift Register) used in the second embodiment of the present invention.

FIG. 29 shows a schematic diagram of a generalized LFSR (Linear Feedback Shift Register) 290 used in the second embodiment of the present invention. The LFSR 290 comprises a number n of D flip-flops FF1, FF2, ..., FFn, a number of n connection points C1, C2, ..., Cn, and a number n−1 of logic gates, as designated by Ex.NOR1, Ex.NOR2, ... Ex.NORn−1. On one hand, if the connection points C1, C2, ..., Cn−1 are to be connected (or closed), then output terminals Q1, Q2, ..., Qn−1, which correspond to the connection points C1, C2, ..., Cn−1, are connected to input terminals of the corresponding logic gates, respectively. On the other hand, if the connection points C1, C2, ..., Cn are not to be connected, then the connection points C1, C2, ..., Cn are opened, the corresponding logic gates are removed and lines across the logic gate are shortened. In FIG. 29, a notation "=1" indicates that the connection point Cn is always connected.

For example, if the connection point c1 is to be connected, the output terminal Q1 corresponding to the connection point C1 is connected to the input terminal of the corresponding logic gate Ex.NOR1. If the connection point C2 is not to be connected, the connection point C2 is open, the corresponding logic gate Ex.NOR2 is removed and the logic gate Ex.NOR1 and the logic gate Ex.NOR3 are directly connected across the logic gate Ex.NOR2.

Such a LFSR 290 is used as the pseudo-random pattern generator 240. In this case, since the LFSR 290 is designed so as to allow an initial value to be set to the LFSR 290, the LFSR 290 is provided with selectors preceding each of the D flip-flops FF1, FF2, . . . , FFn, in the same manner as described in conjunction with the pseudo-random pattern generator 260 such that the LFSR 290 has initial values to be set.

In the pseudo-random pattern generators that are explained in conjunction with the above second embodiment of the present invention and are shown in FIGS. 23, 25 and 29, it is assumed that the logic gate is an EXNOR gate. However, the logic gate should not be restricted to the EXNOR gate, but may be an EXOR gate.

If the program is analyzed or likely to be analyzed in the microprocessor system, the microprocessor system may be revised in order to protect the microprocessor system from being tampered with. For example, a connection of the LFSR 290 shown in FIG. 29 is modified such that this revision is carried out. In a first version of the microprocessor system, the connection points C1 and C2 are connected. In a second version of the microprocessor system, the further connection point Cn is also connected. In the following versions, a set of the connection points to be connected is modified.

In the above description, the LFSR 290 is employed as a measure for implementing the pseudo-random pattern generator, but the pseudo-random pattern generator may be formed by measures other than the LFSR. For example, the pseudo-random pattern generator may be formed by a pseudo-random pattern generator which generates a random sequence monotonously increasing by 2. Alternatively the pseudo-random pattern generator may be formed by another type of a pseudo-random pattern generator that generates a random sequence decreasing by a constant rate. Furthermore, the random pattern generator may generate a pseudo-random sequence which increases/decreases from an initial value in accordance with a predetermined rule, which is neither addition nor subtraction by a constant.

The memory used in the above second embodiment of the present invention sequentially stores the program in the memory at the address specified by the pseudo-random sequence, which is generated in accordance with the predetermined rule. Thus, the memory for storing instruction codes of the program is randomized in an order of the address.

Figure 30:
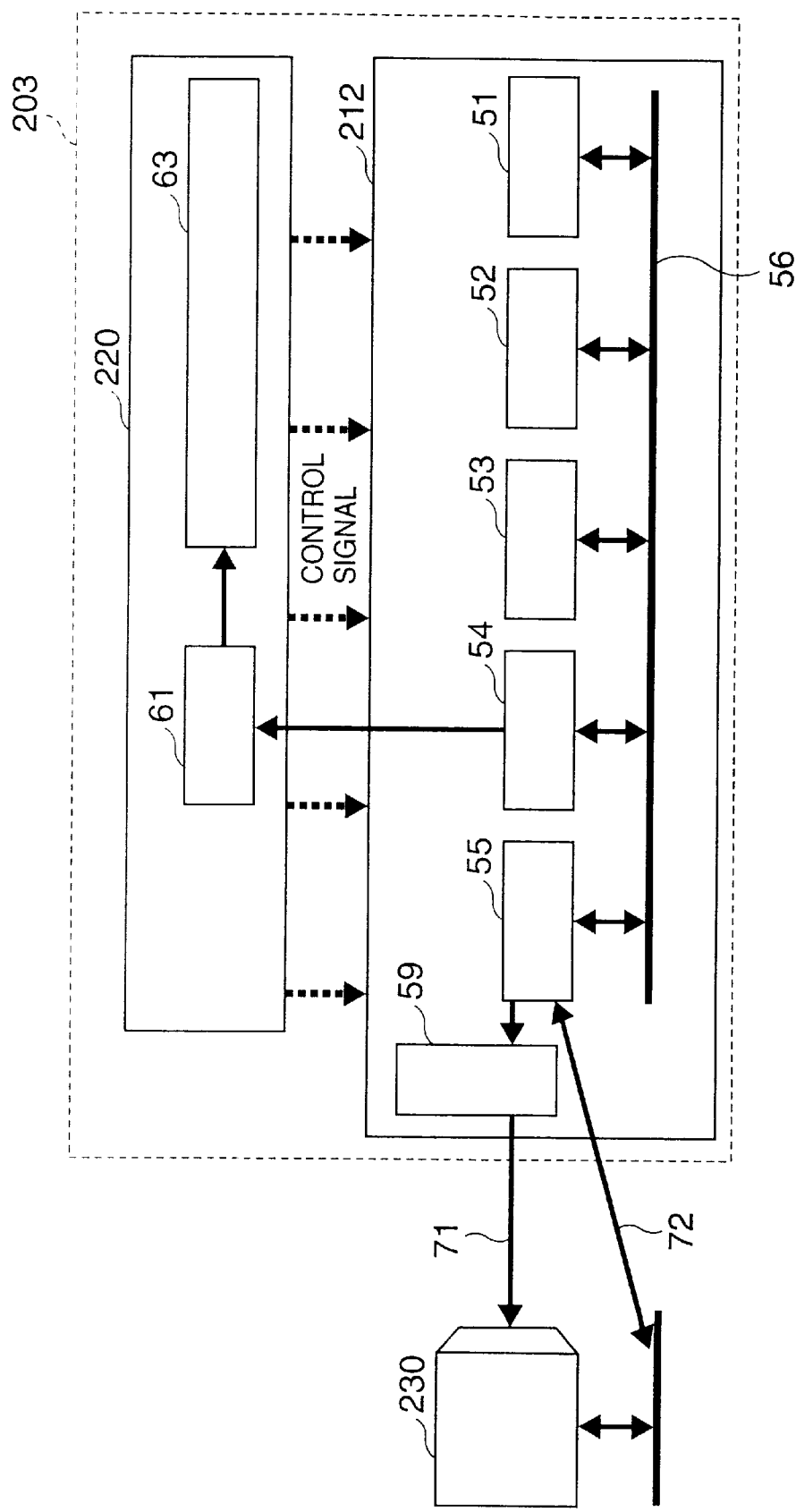
FIG. 30 shows a schematic diagram of a microprocessor system according to a third embodiment of the present invention.

FIG. 30 shows a schematic diagram of a microprocessor system according to a third embodiment of the present invention. The microprocessor system according to the third embodiment of the present invention comprises a microprocessor 203, a memory 230 storing a program executable by the microprocessor and/or data, an address bus 71 and a data bus 72 connecting the microprocessor 203 and the memory 230. The microprocessor 203 comprises a data path 212 and a control unit 220. According to the third embodiment, the microprocessor 203 includes an address converter block 59 for converting an address generated within the microprocessor 203 to a further address in accordance with a predetermined rule and for sending the further address to the memory 230.

Figure 1:
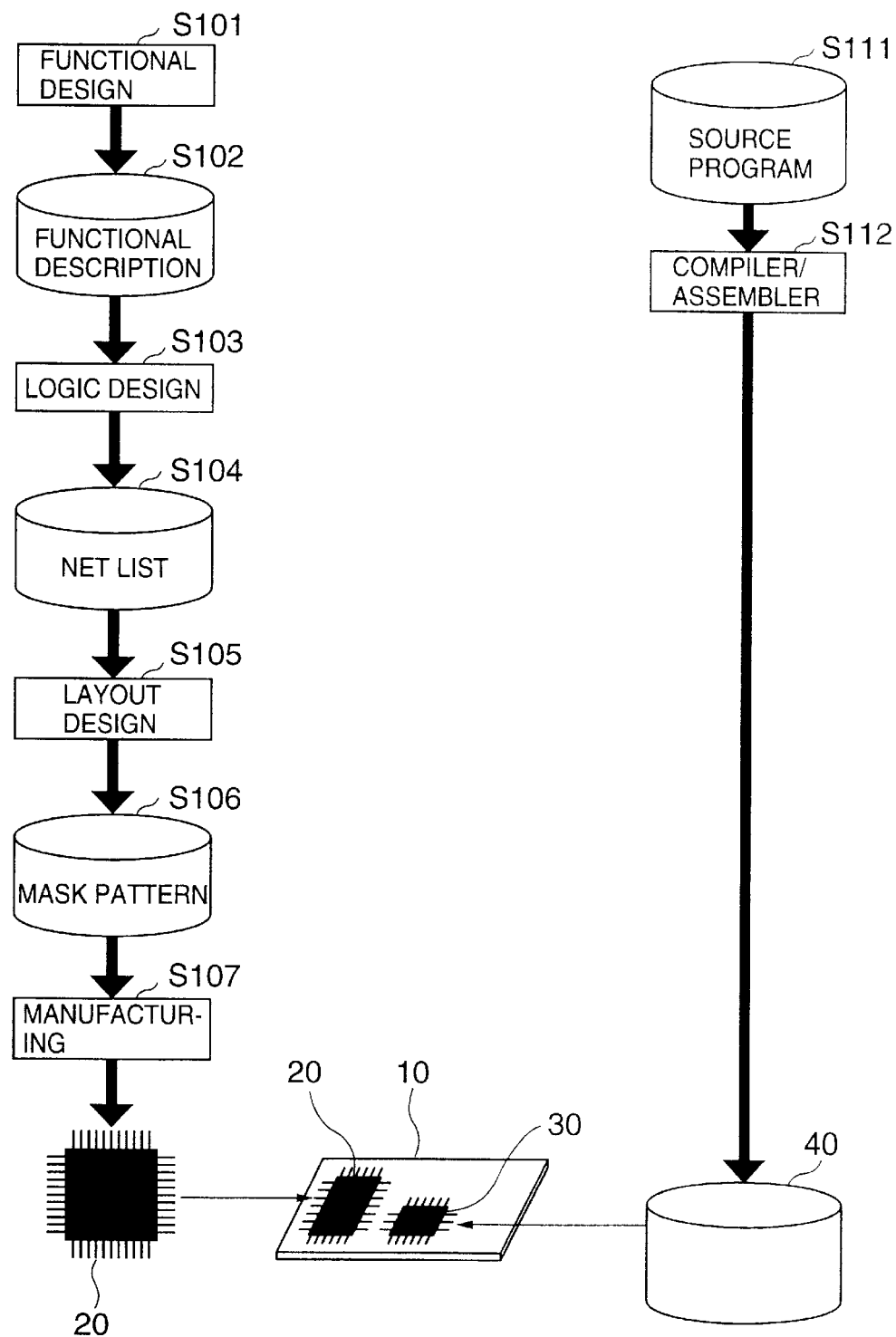
FIG. 1 is a flowchart illustrating a method for designing a microprocessor system of the prior art.
Figure 2:
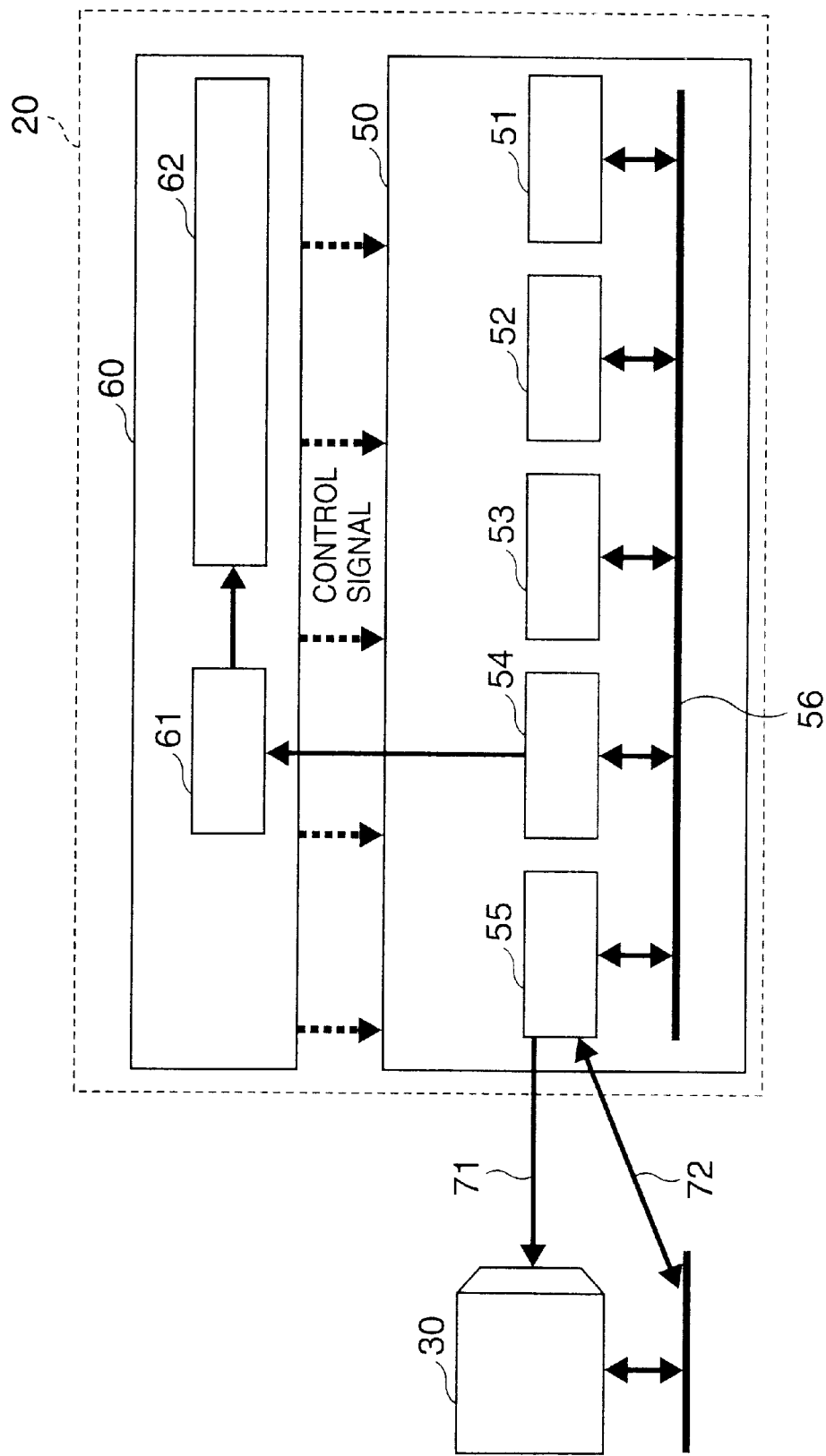
FIG. 2 shows a diagram of a microprocessor MPU of the prior art.
Figure 3:
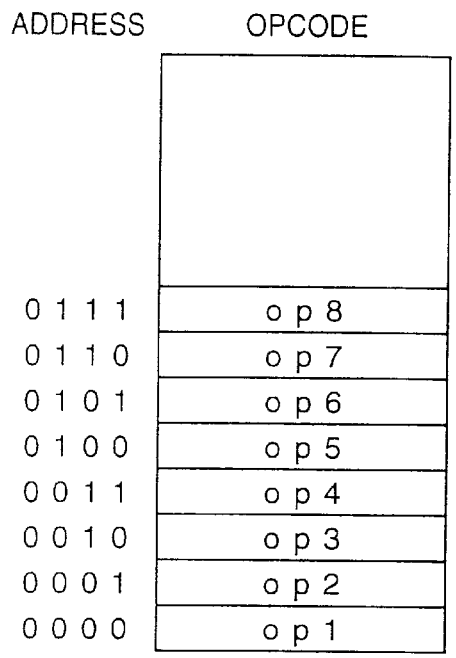
FIG. 3 shows an example of a program stored in a memory 30 shown in FIG. 2.
Figure 4:
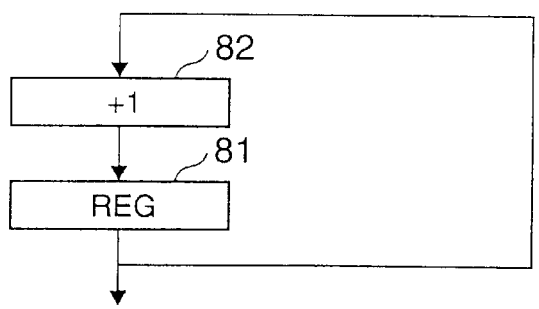
FIG. 4 shows an example program counter of the prior art.
Figure 5:
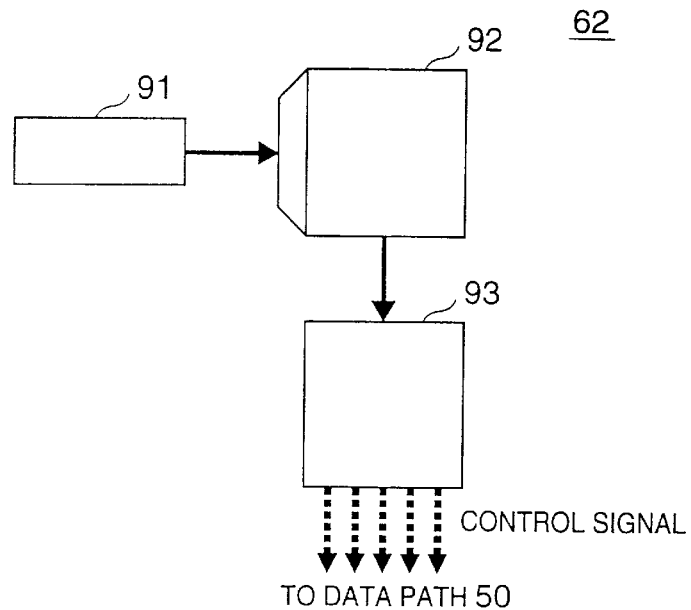
FIG. 5 shows an example of a micro-program control circuit 62 in the microprocessor MPU 20 in FIG. 2.
Figure 6:
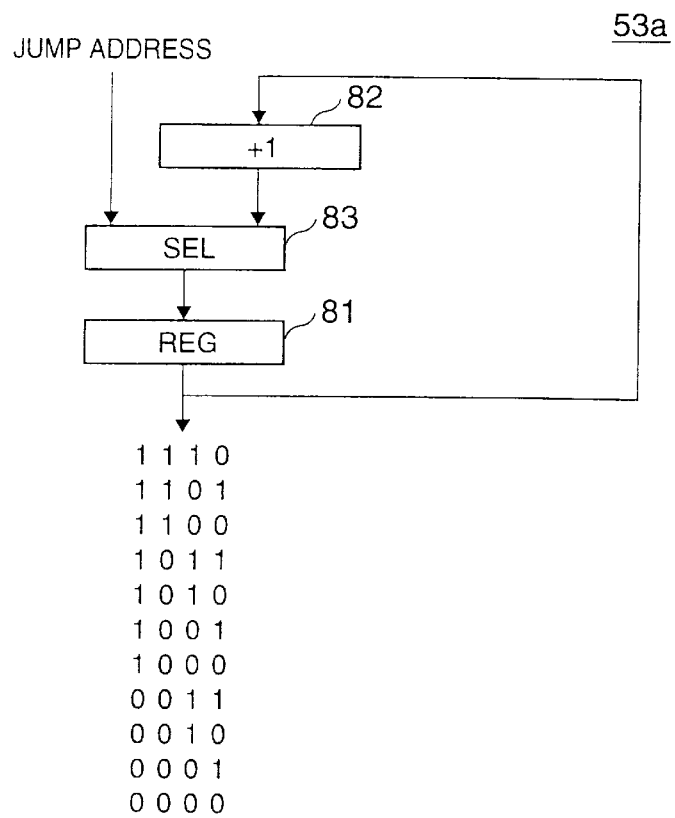
FIG. 6 illustrates a diagram of an example of a program counter in the prior art suited for jump instructions.

As shown in FIG. 30, the microprocessor 203 is basically similar to the conventional microprocessor 20 show in FIG. 2. But the microprocessor 203 is different from the microprocessor 20 in that the microprocessor 203 includes the address converter block 59 for converting the address generated by a program counter 53. In addition, the microprocessor 203 substitutes the memory 230 formed by a ROM, RAM, EEPROM or the like for the conventional memory 30. The address converter block 59 and the memory 230 will be explained hereinafter.

FIG. 31 shows an example of an input-output relation of an address converter block 59. The address converter block 59 comprises a memory used for an address conversion and storing a converted address at an address specified by an input address to input the address converter block 59. This input address input to the address converter block 59 is generated and supplied by the program counter 53. The converted address stored in the address conversion memory in the address converter block 59 is delivered to the memory 230 via the address bus 71.

As shown in FIG. 31, the address conversion memory stores values 0000 at the address 0000, E5D7 at the address 0001, 958A at the address 0002, and so on. As a result, the address converter block 59 outputs the values of 0000, E5D7 and 958A in response to the input addresses of 0000, 0001 and 0002, respectively. In FIG. 31, an example of a sequence of the converted addresses is illustrated. The converted addresses can have any values unless an identical value is stored at more than one address. Thus, each value stored in the address conversion memory of the address converter block 59 at one address is defined so as to be different from that stored at other addresses.

FIG. 32 illustrates a part of a program stored in a memory 230 according to the third embodiment of the present invention. The address converter block 59 converts a first address from the program counter 53 to a randomized second address by means of the address conversion memory. For example, the address value 0000 received from the program counter 53 is converted to the address value 0000, the address value 0001 to the address value E5D7, and so on. Therefore, the memory 230 stores an instruction code corresponding to the first address specified by the program counter 53 at the second address converted from the first address by means of the address converter block 59. For example, if the instructions op0, op1 and op2 correspond to the first addresses 0000, 0001 and 0002 specified by the program counter 53, then the instruction codes op0, op1 and op2 are stored in the memory 230 at the second addresses 0000, E5D7 and 958A converted from the first addresses 0000, 0001 and 0002, respectively, by means of the address converter block 59.

The operation of the memory 230, as shown in FIG. 32, will now be explained. When the microprocessor 203 is reset, the program counter 53 has an initial value 0000 and applies the value 0000 to the address converter block 59 via the bus interface 55. Then, the address converter block 59 converts the input address 0000 to the address 0000 and delivers this converted address 0000 to the address bus 71.

The microprocessor 203 has an access to the memory 230 at the address 0000 output from the address converter block 59, retrieves an instruction code op0 from the memory 230 at the specified address 0000. Then, the microprocessor 203 loads the instruction code op0 into the operation register 54 via the data bus 72 and executes the operation code op0 loaded into the operation register 54. Subsequently, after the content of the program counter 53 is incremented by +1 to 0001, the program counter 53 generates the address value 0001. The address converter block 59 receives this address value 0001 from the program counter 53, converts the address 0001 to the address E5D7 by looking up the address conversion memory, and delivers the address value E5D7 to the address bus 71.

The microprocessor 203 has an access to the memory 230 at the address E5D7 output from the address converter block 59, and retrieves an instruction code op1 from the memory 230 at the specified address E5D7. Then, the microprocessor 203 loads the instruction code op1 into the operation register 54 via the data bus 72 and executes the operation code op1 loaded into the operation register 54. Subsequently, after the content of the program counter 53 is incremented by +1 to 0002, the program counter 53 generates the address value 0002. The address converter block 59 receives this address value 0002 from the program counter 53, converts the address 0002 to the address 958A by looking up the address conversion memory, and delivers the address value 958A to the address bus 71. Then, the microprocessor 203 retrieves an instruction code op2 from the memory 230 at the specified address 958A and executes the operation code op2. Thereinafter, the microprocessor continues to execute the instruction codes retrieved from the memory 230 at the addresses specified by the address converter block 59.

Using this address conversion mechanism, the microprocessor system including the microprocessor 203 can realize a functionality equivalent to that realized by the microprocessor system without employing the address conversion mechanism. Furthermore, even if the contents of the memory 230 are read starting with the address 0 in sequence, the instruction codes of the program stored in the memory 230 are arranged in an order different from the order sequentially executed by the microprocessor 203. Therefore, according to the third embodiment of the present invention, it is an advantage that a behavior of the microprocessor 203 cannot be easily analyzed.

Advantageously, since the contents of the address conversion memory in the address converter block 59 may be optionally overwritten, various types of microprocessor can be constructed in accordance with different address conversion rules. In this sense, the address conversion memory in the address converter block 59 may be a look-up table containing first addresses and second addresses corresponding to the first addresses. If an identity conversion is selected as the conversion rule, then the microprocessor system may be constructed in the same manner as the conventional microprocessor system where the address conversion is not effected.

Figure 33:
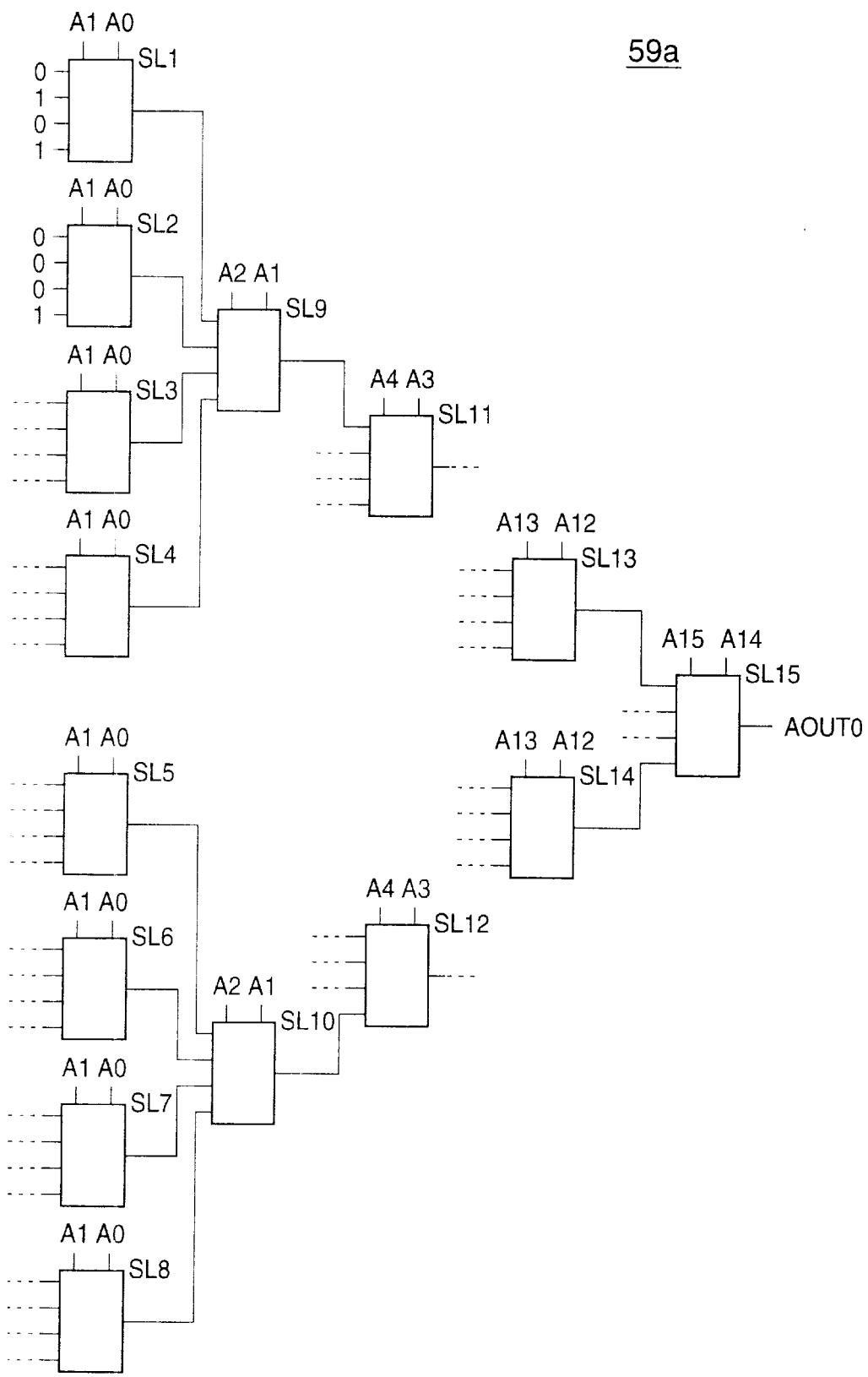
FIG. 33 shows a schematic diagram of a variation of the address converter block.

FIG. 33 shows a schematic diagram of a variation of the address converter block implemented without employing the address conversion memory. As shown in FIG. 33, an address converter block 59a comprises a set of selectors SL1, SL2, ..., SL15, which receive a first address A15, A14, ..., A0 as a select signal and receive a second address as an input value. The second address corresponds to an address AOUT15, AOUT14, ..., AOUT0, which is generated as a converted address from the address converter block. The selector selects and outputs one of predetermined input signals in response to the select signal. The selector will be explained in detail later.

In this case, the address converter block 59a serves as a circuit for providing only bit 0 of the second address. Other address converter blocks 59b, 59c, ..., 59p for providing other bits 1, 2, 15 of the second address are similar to the address converter block 59a and are not shown in FIG. 33. The address converter blocks 59a, 59b, 59c, ..., 59p are different from one another in that the selectors SL1, SL2, ..., SL8 at a lowest layer in each block are differently set by the input value "1" or "0."

Using the entire address converter blocks 59a, 59b, ..., 59p, for all the bits 0, 1, ..., 15, the first address can be converted to the second address. Consequently, the address converter blocks 59a, 59b, ..., 59p integrally perform the functionality equivalent to that of the above address converter block 59.

With reference to FIG. 33, the address converter block 59a is formed by the selectors SL1, SL2, ..., SL15 and only some of them are illustrated. The selectors included in the address convert block 59a are divided into 8 layers.

Each of the selectors SL1, SL2, ..., SL15 is provided with 2 bits from the 16 bits of the address A0, A1, ..., A15 output from the program counter as the select signal. In particular, in the lowest layer of the 8 layers, each of the selectors SL1, SL2, ..., SL8 is provided with the address bits A0 and A1 as the select signal, and, in the lowest but one layer, each of the selectors SL9, ..., SL10 is provided with the address bits A2 and A3 as the select signal. In the highest layer of the 8 layers, the selector S15 is provided with the address bits A14 and A15 as the select signal.

Figure 34:
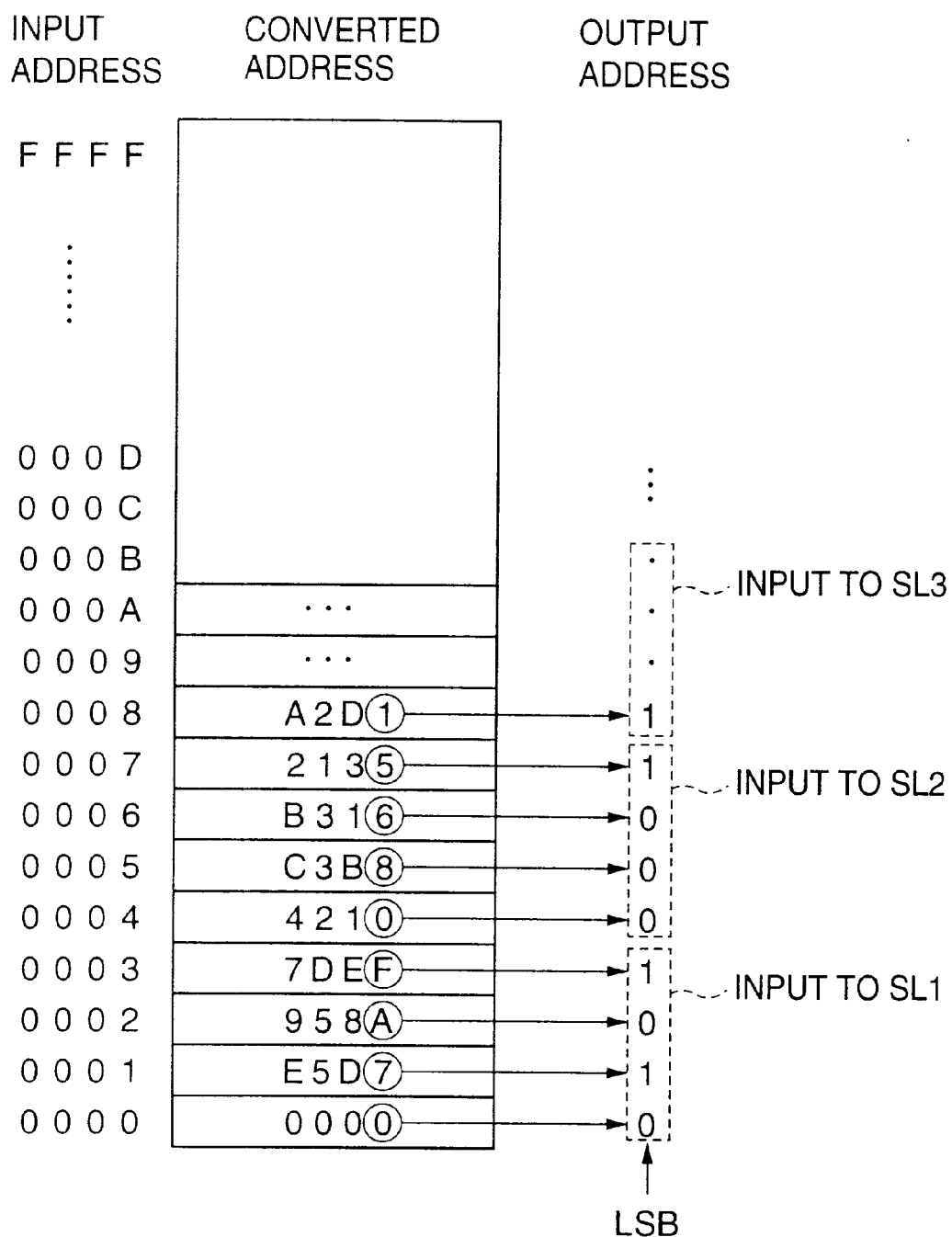
FIG. 34 illustrates how input signals received by selectors SL1, SL2 and SL3 are determined.

FIG. 34 illustrates how input signals received by selectors SL1, SL2 and SL3 in FIG. 33 are determined.

The first four addresses of the addresses generated from the program counter 53 are values of 0000, 0001, 0002 and 0003. It is assumed that the address converter block 59 should produce four output addresses 0000, E572, 958A and 7DEF in response to the above first four input addresses from the program counter 53a received as the select signal, respectively.

In this case, the four output addresses 0000, E572, 958A and 7DEF (in hexadecimal notation) from the address converter block 59 have LSB bit values of 0, 1, 0 and 1 (in binary notation), respectively. Therefore, the LSB of the output address AOUT0 from the address converter block 59 takes 0 or 1 based on the select signals given to the address converter block 59. It is assumed that the first four addresses 0000, 0001, 0002 and 0003 are input to the address converter block 59a as the select signals. Since the other bits A2, A3, ..., A15 of the four select signals are all 0s, four input signals to the selector SL1 are selected and generated from the selector SL1 on the basis of the two LSBs A1 and A0 of the select signal.

The input signal to the selector SL1 is determined as follows. The two LSBs A1 and A0 of the four input addresses, i.e., select signals, are represented as "00," "01," "10" and "11" in binary notation. The SL1 should generate the LSB of the output address "0," "1," "0" and "1" in response to the above A1 and A0 bits of "00," "01," "10" and "11." Therefore, the input signal of the selector SL1 is determined so as to be "0101" in binary notation.

Each of the next four input addresses 0004, 0005, 0006 and 0007 to the address converter block 59a has the two bits A3 and A2 of the value represented as "01" in binary notation. Thus, the input signal to the selector SL2 may be determined so as to be "0001." Each input signal for each selector is determined in order to produce the bit 0 of the output address AOUT0 generated from the address converter block 59.

The bit 1 of the output address AOUT1 generated from the address converter block 59 will be determined as follows. The address converter block 59 should be provided with a further address converter block 59b similar to the address converter block 59a. In this case, the address converter block 59 produces the four output addresses 0000, E5D7, 958A and 7DEF in response to the above first four input addresses. The $2^{nd}$ LSB, bit 1, of the output addresses AOUT1 are 0, 1, 1 and 1, respectively. Therefore, the input signal for the address converter block 59b may be "0111."

The following bits AOUT2, AOUT3, ..., AOUT15 may be generated by further address converter blocks 59c, 59d, ..., 59p, respectively, arranged in the address converter block 59 in the same manner as described above. Thus, each input signal for each selector within the address converter blocks 59c, 59d, ..., 59p may be determined according to the same process as applied to the selectors for the bits AOUT0 and AOUT1. Consequently, another address converter block can be implemented, which address converter block is different from the address converter block as shown in FIG. 31 but realizes functionality equivalent to that of the address conversion memory.

Figures 35A, 35B:
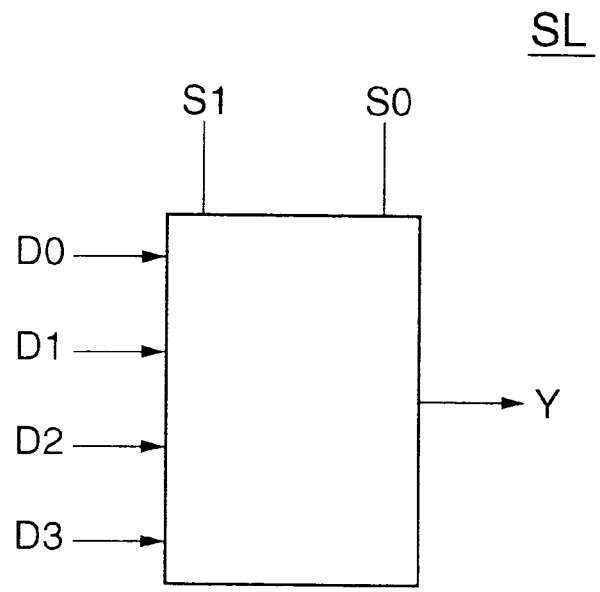
FIG. 35A shows a diagram of a selector and FIG. 35B is a table for representing a function of the selector.

FIG. 35A shows a diagram of a selector SL typically used in the above embodiment. The selector has input terminals receiving input signals D0, D1, D2 and D3, and select terminals being applied with select signals S0 and S1. It is assumed that this selector SL is employed as the above-mentioned selector SL1. A set of the input signals "0101" is provided to the input terminals as the input signals D0="1", D1="0", D2="1" and D3="0." Also, the lowest two bits A0 and A1 of the address generated from the program counter 53 are applied to the selection terminals as the select signals S0 and S1.

In FIG. 35B, a table for representing a function of the selector SL is shown, which selector SL selects and outputs an output signal Y from the input signals D0, D1, D2 and D3 in response to a combination of the select signals S0 and S1. For example, in the case of the select signals S0="0" and S1="0," then the selector SL outputs the signal D0, in the case of the select signals S0="0" and S1="1," the signal D1 is provided, in the case of the select signals S0="1," and S1="0," the signal D2 is provided, and in the case of the select signals S0="1" and S1="1," the signal D3 is provided. The address converter block 59a, as shown in FIG. 33, includes such selectors SL connected in a tree, and is applied with the address generated from the program counter 53 as the select signal.

In the address converter block 59a, if all the address bits A15, A14, . . . , A0 of the select signal are set to 0, the selector SL1 selects the input signal D0 and outputs it as the bit AOUT0 of the output signal. If only the bit A0 is 1, the selector SL1 selects and outputs the input signal D1. If only the bit A1 is 1, the selector SL1 selects and outputs the input signal D2. If both the bit A0 and A1 are 1, the selector SL1 selects and outputs the input signal D3. Thus, when the input signal "0101" is given to the selector SL1 of the selector 59a, the selector 59a produces the output signal "0101."

Other address converter blocks 59b, 59c, . . . , 59p serve to generate the bits 1, 2, . . . , 15 of the output address, respectively. Each of the address converter blocks 59b, 59c, . . . , 59p is also formed by the selectors SL connected in a tree, and is applied with the address generated from the program counter 53 as the select signal.

It can be seen that the address converter blocks 59a, 59b, . . . , 59p are formed by a set of the selectors SL, each of which has the input signal corresponding to the output address generated by the address converter block and has the selection signal corresponding to the input address generated by the program counter 53.

In the above particular address converter block 59a, the SL selector is illustrated as a 4-input and 1-output selector. Of course, the selector SL used in the above address converter blocks 59a, 59b, . . . , 59p are not limited to the 4-input and 1-output selector, but other selectors such as 2-input, 8-input, 16-input or the like selectors may be used.

As described above, in the microprocessor system according to the third embodiment of the present invention, the address that is delivered to the memory 230 by the microprocessor 203 is subjected to an address conversion. The address generated within the microprocessor 203, that is to say, for example, the address generated by the program counter 53, is converted to a randomized address in accordance with a predetermined rule. Each instruction code to be executed by the microprocessor 203 is arranged in the memory 230 at the converted address in a randomized order. Therefore, even if the instruction codes stored in the memory 230 are sequentially read out, a behavior of the microprocessor cannot be easily understood, because it is impossible to rearrange the read out instruction codes in a correct order unless the predetermined rule is known.

FIG. 36 shows a schematic diagram of a microprocessor system according to a fourth embodiment of the present invention. The microprocessor system includes a microprocessor 300, a memory 230 and address and data buses 71 and 72. The microprocessor 300 comprises a control unit 220 and a data path 310.

On one hand, the data path 310 includes a jump address memory 320, which stores address information corresponding to an address to be jumped to for a jump instruction of a program in a form of an address specifying a memory location. The jump address memory 320, in this case, is formed by a ROM, and may be formed by a non-volatile memory such as an EEPROM or FRAM. Alternatively, a RAM, in which jump addresses are stored at a start up of the microprocessor 300, may form the jump address memory 320.

On the other hand, the microprocessor 300 according to the fourth embodiment of the present invention is very similar to the microprocessor 200 according to the second embodiment of the present invention. The data path 310 of the microprocessor 300 may substitute a pseudo-random pattern generator, such as a pseudo-random pattern generator 240 or the like, for a program counter in the same manner as described with respect to the second embodiment of the present invention. This pseudo-random pattern generator may be constructed as illustrated in FIG. 23.

Other elements, such as an ALU 51, a general purpose register 52, an instruction register 54 and a bus interface 55 in the data path 310 are already explained with respect to the second embodiment of the present invention, and further explanations will not be necessary. The bus interface 55 is connected to the external memory 230, such as a RAM, ROM or the like, via the external address and data buses 71 and 72. The control unit 220 of the microprocessor 300 includes an instruction decoder 61 and a micro-program control circuit 63, as mentioned in the explanation of the second embodiment.

Figure 37:
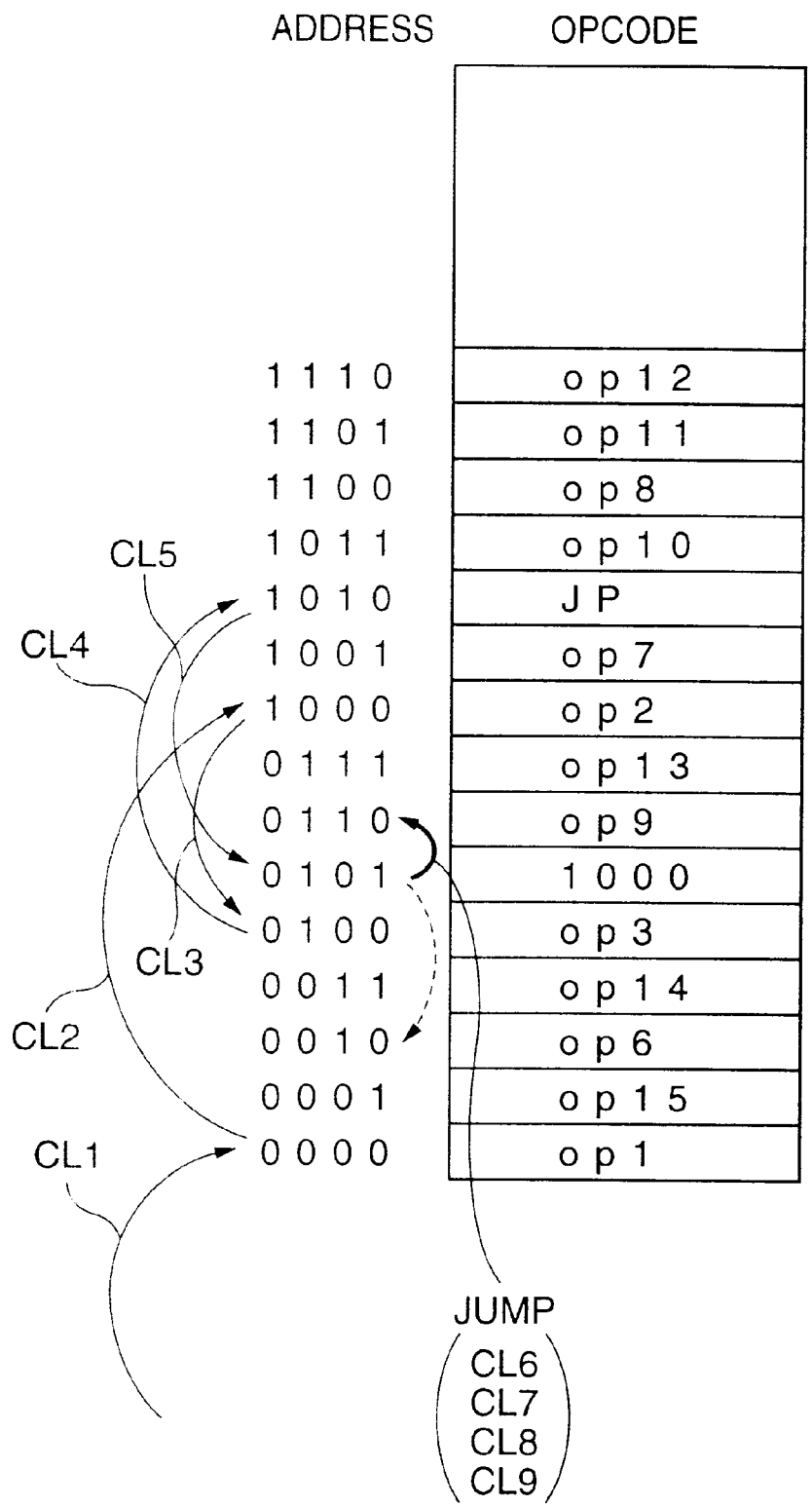
FIG. 37 illustrates an example of a program stored in a memory according to the fourth embodiment of the present invention.

FIG. 37 illustrates an example of a program stored in a memory 230 according to the fourth embodiment of the present invention. In this case, the pseudo-random pattern generator 240 sequentially generate values of 0000, 1000, 0100, 1010, 0101, 0010, 1001, 1100, 0110, 1011, 1101, 1110, 0111, 0011 and 0001. Using this pseudo-random pattern generator 240 as the program counter, the values generated from the pseudo-random pattern generator 240 are taken as addresses specifying a location in the memory 230.

Instruction codes of a program to be executed by the microprocessor 300 are sequentially stored in the memory 230 at the addresses as the pseudo-random generator 240 generates the addresses. For example, it is assumed that a sequence of instruction codes op1, op2, op3, JP, 1000, op6, . . . , as shown in FIG. 7, is stored in the memory 230. The first instruction code op1 of the sequence is stored in the memory 230 at the address 0000, which is generated by the pseudo-random pattern generator 240 at first. The next instruction code op2 of the sequence is stored in the memory 230 at the next address 1000, which is generated by the pseudo-random pattern generator 240. The following instruction codes are stored in the memory 230 at the corresponding addresses, which are sequentially generated in the above order. For example, the $4^{th}$ instruction code JP is stored in the memory at the address 1010 and the $5^{th}$ instruction code 1000 is stored in the memory at the address 0101 generated after the address 1010.

In this case, since the just previous instruction code is a jump instruction code, which is the $4^{th}$ instruction code of the program, the $5^{th}$ instruction code 1000 represents a jump address, at which the program counter of the microprocessor should be jumped to due to the jump instruction. However, this jump address is expressed so as to be applicable to the conventional microprocessor, which is not associated with the pseudo-random pattern generator 240. Therefore, in this case where the pseudo-random pattern generator 240 is used as the program counter, the jump address 1000 should be converted to another version of the jump address expressed on the basis of the randomized addresses generated by the random pattern generator 240.

In particular, the originally given jump address 1000, which is not randomized, is at a $9^{th}$ position from a top address 0000. Thus, the microprocessor 300 has to take a $9^{th}$ address 0110 of the addresses generated by the pseudo-random pattern generator 240 as the randomized version of the jump address corresponding to the original jump address 1000. Also, the microprocessor 300 has to execute an instruction code stored in the memory 230 at the address 0110.

Figure 38:
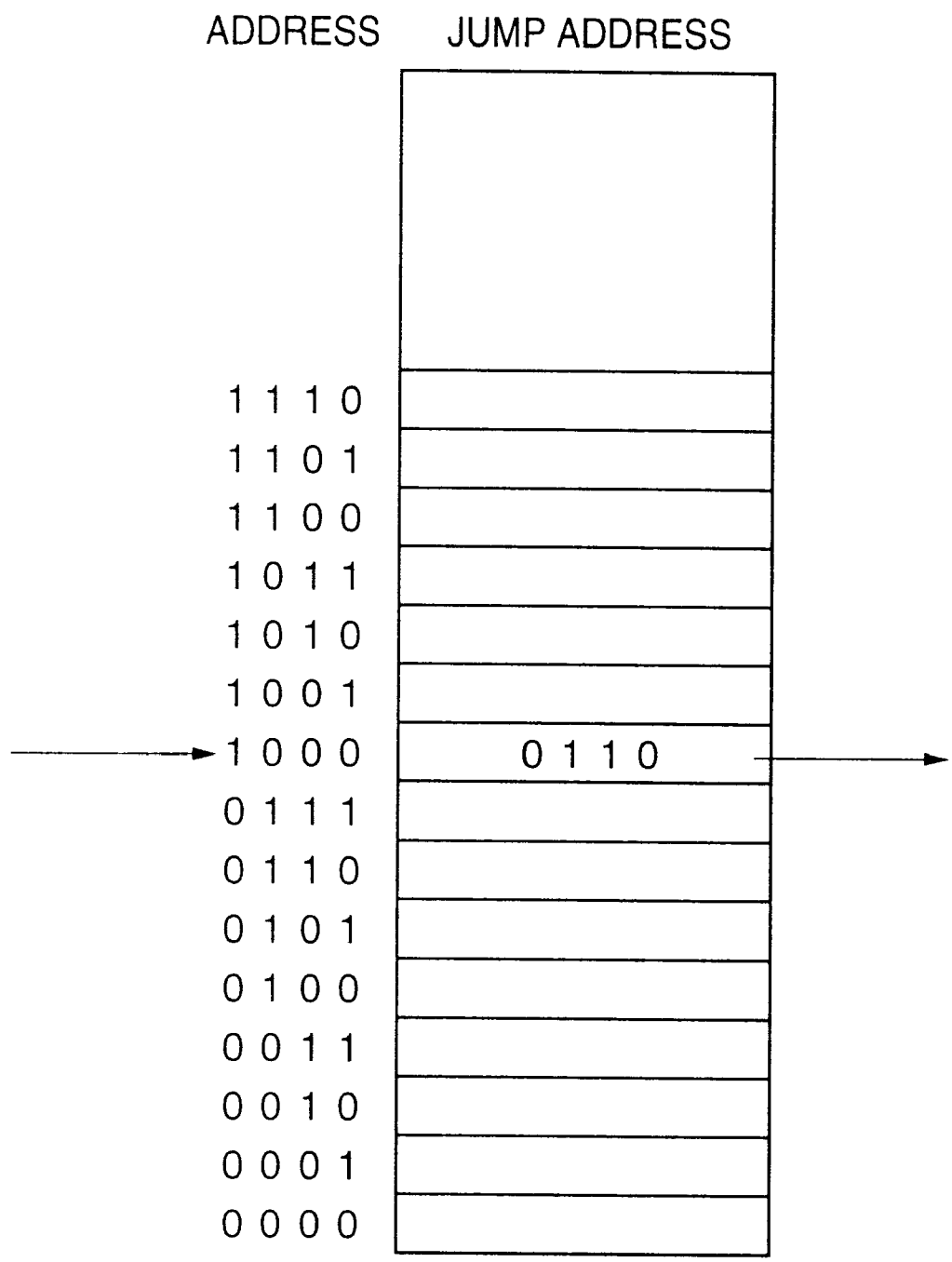
FIG. 38 illustrates contents of a jump address memory according to the fourth embodiment of the present invention.

To do this, according to the fourth embodiment of the present invention, if the pseudo-random pattern generator 240 substitutes for the program counted, the randomized version of the jump addresses is preciously calculated and stored in the jump address memory 320. For this purpose, in designing the microprocessor 300, a non-randomized version of the jump address is converted to a randomized version of the jump address by counting an order of the original jump address from the beginning and calculating the address generated by the pseudo-random pattern generator 240 at the order from the beginning. Then the calculated randomized version of the jump address is stored in the jump address memory 320 at the address corresponding to the non-randomized original jump address. Such constructed contents of the jump address memory 320 are shown in FIG. 38.

An operation of the microprocessor 300 according to the fourth embodiment of the present invention will now be explained. At first, the pseudo-random pattern generator 240 has an initial value 0000 being set therein. A cooperation of an on-chip internal bus 56 and the bus interface 55 within the microprocessor 300, and the external address and data buses 71 and 72, respectively, is operative as a program reading unit intended to read a content op1 from the memory 230 at the address 0000 specified by the initial value 0000. The read content from the memory 230, i.e., an opcode op1, is decoded in the instruction decoder 61 at the microprocessor 300, and then the micro-program control circuit 63 is operative to control an execution of the opcode op1.

After the execution of the opcode op1, the pseudo-random pattern generator 240 subsequently generates the value 1000. This causes the microprocessor 300 to read the next opcode op2 from the memory 230 at the address 1000 and to execute the opcode op2. After the execution of the opcode op2, the pseudo-random pattern generator 240 subsequently generates the value 0100. Then, the microprocessor 300 reads the next opcode op3 from the memory 230 at the address 0100 and executes the opcode op3.

The pseudo-random pattern generator 240 subsequently generates the next value 1010. The microprocessor 300 reads the content, i.e., the instruction code JP, from the memory 230 at the address 1010. The instruction decoder 61 in the microprocessor 300 interprets that this instruction code JP is an opcode of the unconditional jump instruction JP. As a result, the next value 0101 generated from the pseudo-random pattern generator 240 is judged to be an operand of the jump instruction JP. The operand of the jump instruction JP indicates a jump address at which the next instruction is stored in the memory. Then, the microprocessor 300 reads the content 1000 from the memory 230 and interprets the content 1000 as the jump address.

As previously stated, the jump address 1000 is significant as long as the instruction codes of the program are aligned in sequence. In this case, the instruction codes are arranged in an order according to the pseudo-random sequence generated by the pseudo-random pattern generator 240. This is why the address 1000 directly read from the memory 230 cannot be effective as the correct jump address at which the microprocessor has the next access to the memory 230. In order to overcome this problem, according to the fourth embodiment of the present invention, the jump address memory 320 is provided for storing the previously calculated jump address useful for the address conversion. In particular, the content 0110 stored in the jump address memory 320 at the address 1000 corresponding to the original jump address is effective when the pseudo-random pattern generator 240 is in use.

In this embodiment, the jump address 0110, which is read from the jump address memory 320 at the address 1000, is set to the subsequent value to be generated from the pseudo-random pattern generator 240. Then, the microprocessor 300 delivers this value 0110 to the address bus 71 as the address specifying the location of the memory 230, reads the content op9 from the memory 230 at the specified address 0110 and executes the instruction op9.

In the fourth embodiment, the microprocessor 300 executes the program in sequence according to the addresses generated from the pseudo-random pattern generator 240. In this case, it is an advantage of the fourth embodiment of the present invention that a correct execution order of the program, which contains the jump instruction JP, is ensured by means of the jump address memory 320.

Figure 39:
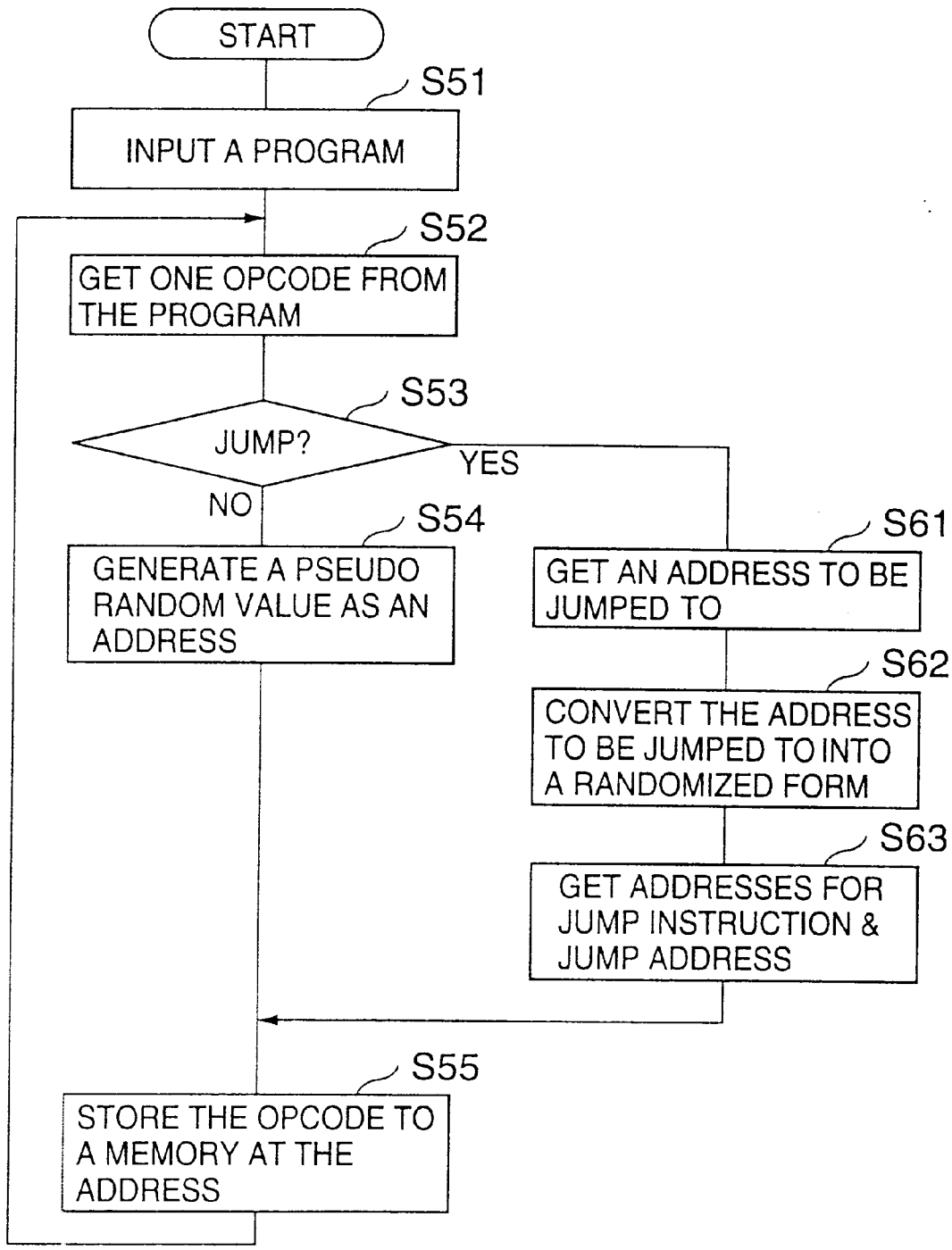
FIG. 39 is a flowchart for representing an operation of a method according to a fifth embodiment of the present invention.

FIG. 39 is a flowchart for representing an operation of a method for storing a program in a memory according to a fifth embodiment of the present invention. The operation of the method for executing a jump instruction in a correct order in a microprocessor system using the pseudo-random pattern generator 240 without requiring the above jump address memory 320 will be explained with reference to FIG. 39.

In step 51, a program to be executed by the microprocessor 300 is entered. Then, each instruction code of the program, that is to say, opcode, is sequentially retrieved from the program in step 52. In step 53, it is determined whether the retrieved opcode is a jump instruction or not.

If the opcode is not the jump instruction, then, in step 54, the pseudo-random pattern generator 240 generates an address in sequence corresponding to a position of the opcode in the program. Next, the opcode is stored in the memory 230 at the address generated by the pseudo-random pattern generator 240 in step 55. Thereafter, this algorithm returns to step 52 to process a further opcode.

If the opcode is found to be an opcode of the jump instruction, then there exists an operand of the jump instruction following the opcode. The operand of the jump instruction code is a jump address to be jumped to. Then, the jump address (e.g., "1000") is retrieved from the program at the position directly next to that of the opcode of the jump instruction and is estimated to be the jump address for the jump instruction in step 61.

The estimated jump address identifies the address to be jumped to in a condition in which the instruction codes are aligned in the program in an order to be executed by the microprocessor 300. Thus, this estimated jump address should be converted to the address representing the position for which the pseudo-random pattern generator 240 can generate a corresponding address. To do this, the pseudo-random pattern generator 240 generates the address (e.g., "0110") for the order corresponding to the position of the estimated jump address in the program, and the estimated jump address (e.g., "1000") is converted to a randomized version of the jump address (e.g., "0110") in step 62. This randomized version of the jump address (e.g., "0110") is an available jump address when the pseudo-random pattern generator 240 substitutes for the program counter.

Finally, in step 63, the opcode of the jump instruction and the operand of the jump instruction, that is to say, the available jump address, are stored in the memory 230 at appropriate addresses, respectively. To do this, the pseudo-random pattern generator 240 generates the address (e.g., "1010") for the order corresponding to the position of the opcode JP of the jump instruction in the program, and the opcode (e.g., "JP") of the jump instruction is stored in the memory 230 at the generated address (e.g., 1010). Also, the pseudo-random pattern generator 240 generates the address (e.g., "0101") for the order corresponding to the position of the operand of the jump instruction in the program and the available jump address (e.g., "0110") is stored in the memory 230 at the generated address (e.g., "0101").

The method for storing the randomized version of the program in the memory 230 according to the fifth embodiment of the present invention is generally implemented by a software unit. It is noted that the method may also be implemented by a hardware unit including a combination logic gate or a general purpose microprocessor.

FIG. 40 illustrates an example of a program stored in a memory 230 used in the fifth embodiment of the present invention. The operation of the microprocessor 300 will be explained.

At first, the pseudo-random pattern generator 240 has its initial value 0000 set therein. The microprocessor 300 reads the content op1 from the memory 230 at the address 0000 specified by the initial value and executes the read instruction op1. Subsequently, the microprocessor 300 repeatedly performs in the same manner as that of the microprocessor according to the fourth embodiment of the present invention.

Thereafter, when the pseudo-random pattern generator 240 generates a value of 1010, the microprocessor 300 reads the instruction code JP, that is to say, the opcode JP of the jump instruction, from the memory 230 at the address 1010 specified by the pseudo-random pattern generator 240. This opcode JP is interpreted to be a jump instruction by the instruction decoder 61 of the control unit 220 in the microprocessor 300. As a result, the next value of 0101 subsequently generated by the pseudo-random pattern generator 240 is estimated to be an operand representing a jump address of the jump instruction. In this case, the content 0110 from the memory 230 at the address 0101 is read as the jump address.

According to the fifth embodiment of the present invention, the microprocessor 300 sets the jump address 0101 read from the memory 230 directly in the pseudo-random pattern generator 240. And the microprocessor 300 reads the instruction code op9 from the memory 230 at the address 0110 specified by the pseudo-random pattern generator 240 and executes the instruction code op9. Therefore, according to the fifth embodiment of the present invention, it is an advantage that a desired jump operation can be certainly achieved.

Figure 41:
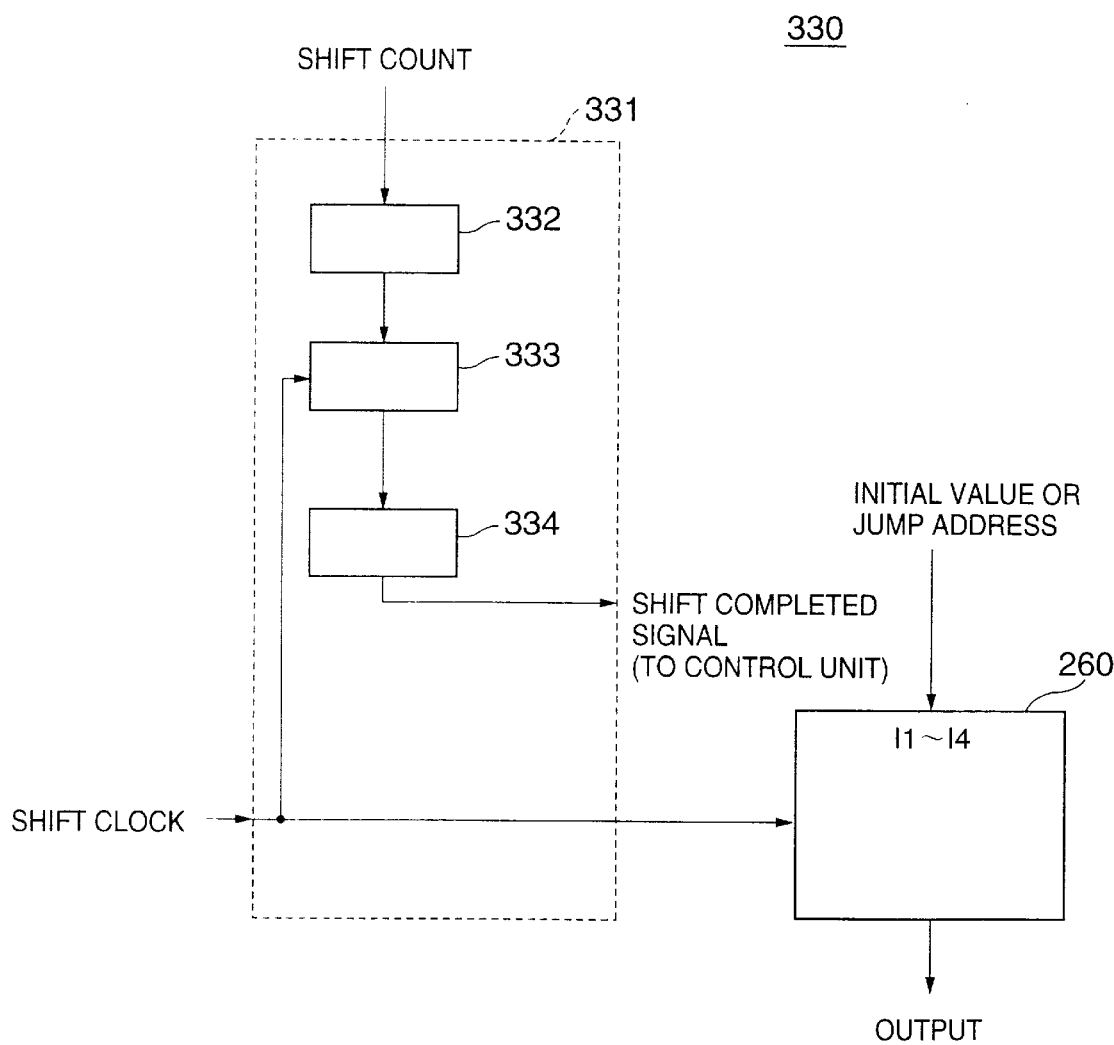
FIG. 41 shows a schematic diagram of a program counter according to a sixth embodiment of the present invention.

A sixth embodiment of the present invention for implementing a relative jump to an address calculated from a current value of a program counter will be explained. FIG. 41 shows a schematic diagram of a program counter 330 according to the sixth embodiment of the present invention.

The program counter 330 comprises a shift clock control unit 331 and a pseudo-random pattern generator 260. The program counter 330 is operable to carry out a relative jump operation. The shift clock control unit 331 includes an increment-by-1 circuit 332, a down counter 333 and a 0-detection circuit 334.

The pseudo-random pattern generator 260 may be identical or similar to the pseudo-random pattern generator 260 with regard to the second embodiment of the present invention in conjunction with FIG. 25, and, thus, the details of the pseudo-random pattern generator 260 will no longer be explained.

FIG. 42 illustrates an example of a program stored in a memory 230 according to the sixth embodiment of the present invention. The memory 230 contains instruction codes op1, op2, op3, . . . at addresses 0000, 1000, 0100, 1010, 0101, 0010, 1001, 1100, 0110, 1011, 1101, 1110, 0111, 0011 and 0001, respectively, generated sequentially from the pseudo-random pattern generator 260.

As shown in FIG. 8, the memory 30 of the prior art contains an opcode JR of the relative jump instruction at the address 1011, and an operand 0010 of the relative jump instruction at the next address 1100. The operand of the relative jump instruction indicates a difference between an address holding the current processed opcode and a jump address representing a location to be jumped to. In the prior art, the opcode and the operand of the relative jump instruction are stored in the memory 30 at $12^{th}$ and $13^{th}$ addresses 1011 and 1100, respectively.

According to the sixth embodiment of the present invention, as shown in FIG. 42, the memory 230 contains the opcode JR of the relative jump instruction at the address specified by the $11^{th}$ value 1110 of a pseudo-random sequence generated from the pseudo-random pattern generator 260. Also, the memory 230 contains the operand 0010 of the relative jump instruction at the address 0111 specified by the $12^{th}$ value.

The relative jump operation of the microprocessor according to the sixth embodiment will be explained. Once an initial value of 0000 is set in the pseudo-random pattern generator 260, as shown in FIG. 41, the microprocessor reads the instruction code op1 from the memory 230 at the address specified by the value 0000 and executes the instruction code op1. Thereafter, the pseudo-random pattern generator 260 is provided with a shift clock and the following process is repeated. The pseudo-random pattern generator 260 generates the next address. The microprocessor reads the next instruction code from the memory 230 at the generated next address and executes the read next instruction code.

When the value generated from the pseudo-random pattern generator 260 reaches a value of 1110, the opcode JR of the relative jump address is read from the memory 230 at the address 1110. The control unit 220 in the microprocessor interprets that the opcode JR is the relative jump instruction and retrieves the content of 0010 from the memory at the address specified by the value 0111 subsequently generated by the pseudo-random pattern generator 26. In this case, it is defined that the value following the opcode JR of the relative jump instruction indicates a difference between the address to be jumped to and the current value of the program counter.

The difference value of 0010 may be estimated as a count of shift operations to be carried out in the pseudo-random pattern generator 260 in order to take the address to be jumped to. To do this, the difference value of 0010 is incremented in the increment-by-1 circuit 331 and the incremented value 0011 is set in the down counter 333 of the shift clock control unit 331 as an initial value. At the same time a shift complete signal is set to represent that the shift operation has not been completed and the microprocessor terminates its normal operation.

Once one shift clock signal is entered to the pseudo-random pattern generator 260, it generates the next value of 0111, and the value contained in the down counter 333 is decreased by 1, and thus decreasing from the value of 0011 to 0010.

The 0-detection circuit 334 detects whether the value of the down counter 333 reaches 0 or not, and if the value of 0 is present, the 0-detection circuit 334 notifies the control unit 220 of the completed shift operation for the relative jump.

Then, the control unit 220 resumes the operation of the microprocessor, reads the instruction code op15 from the memory 230 at the address 0001 generated from the pseudo-random pattern generator 260 and executes the instruction code op15.

Thus, the sixth embodiment of the present invention enables a relative jump instruction to be executed in a correct order on a condition that the pseudo-random pattern generator 260 is employed as a program counter. Furthermore, advantageously, the sixth embodiment of the present invention for implementing a relative jump scheme by converting the jump address may be used in conjunction with the fourth or fifth embodiment of the present invention for implementing an unconditional jump scheme.

In the above sixth embodiment, the jump address for the relative jump instruction is defined as a sum of the address at which the opcode of the relative jump instruction is stored, the value of the operand of the relative jump instruction and 1. Therefore, the shift clock control unit 331 is provided with the increment-by-1 circuit 332. However, the definition of the jump address may be such that the jump address is the sum of the address at which the opcode of the relative jump instruction is stored and the value of the operand of the relative jump instruction. Thus, the increment-by-1 circuit 332 may be dispensed with.

In the above sixth embodiment, the pseudo-random pattern generator 260 is operative to carry out the shift operation with the same clock as the clock provided at the normal operation when the pseudo-random pattern generator 260 attempts to take the jump address. During the shift operation, since the microprocessor is halted, it is beneficial to shorten an interval of the shift operation in order to improve a performance of the microprocessor.

Figure 43:
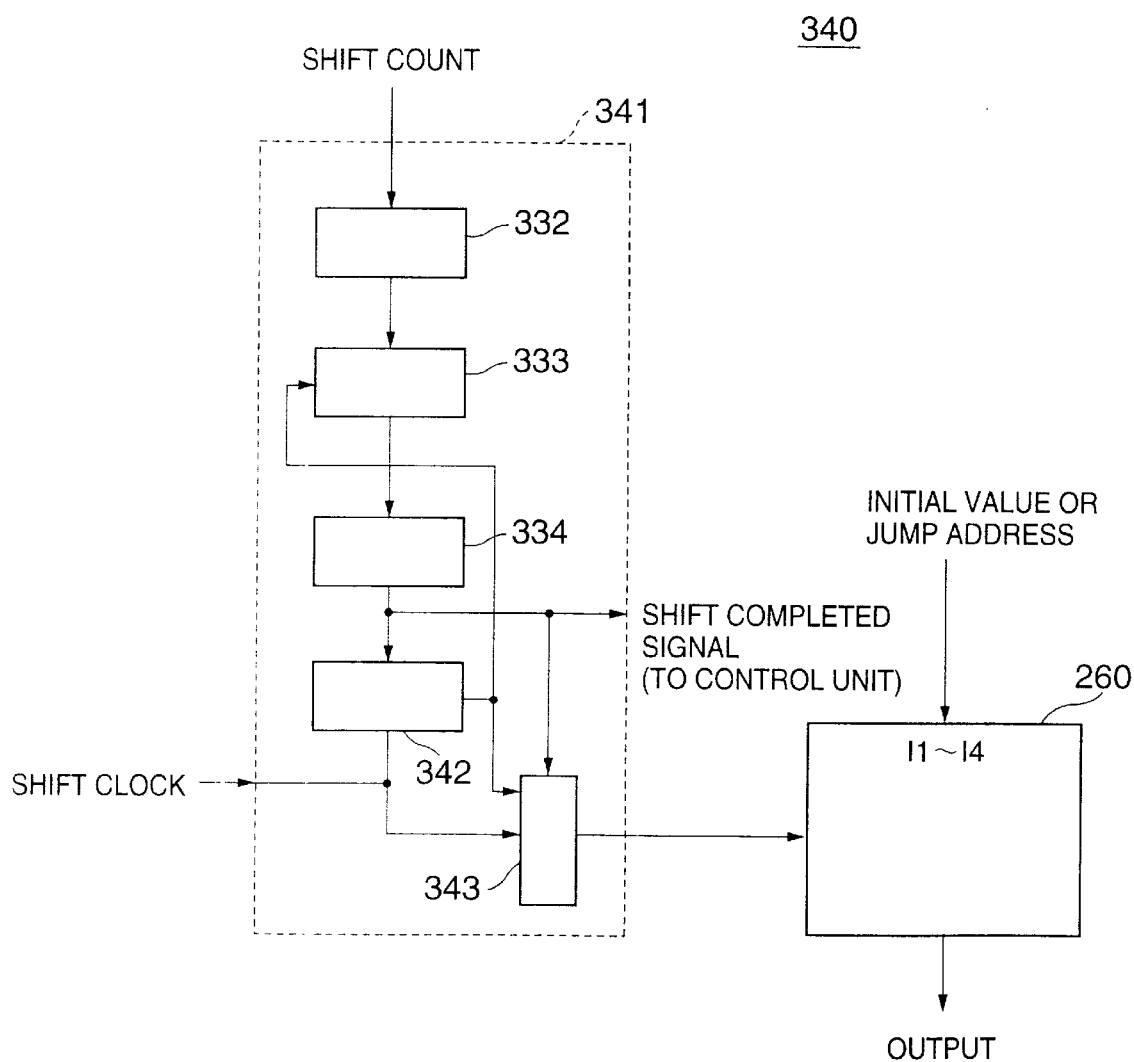
FIG. 43 shows a schematic diagram of a modified program counter according to the sixth embodiment of the present invention.

To this end, it is proposed that a clock other than the above normal clock should be used to get the jump address for the relative jump instruction. FIG. 43 shows a schematic diagram of a modified program counter 340 for improving the performance of the microprocessor according to the sixth embodiment of the present invention.

The program counter 340 comprises an increment-by-1 circuit 332, a down counter 333, 0-detection circuit 334, a clock multiplier 342 and a selector 343. The program counter 340 operates as follows.

At first, the program counter of the microprocessor executes each instruction of a program starting from op1 in sequence. The selector 343 in the shift clock control unit 341 selects the shift clock and delivers it to the pseudo-random pattern generator 260 during a normal operation other than the relative jump instruction.

The microprocessor continues to sequentially execute the instructions until the pseudo-random pattern generator 260 generates a value of 1110. Then, the control unit 220 retrieves the opcode JR of the relative jump instruction from the memory, and the control unit 220 checks whether the instruction read from the memory is the relative jump instruction. If it is true, then the control unit 220 reads the value of 0010 from the memory 230 at the address 0111 generated from the pseudo-random pattern generator 260, which has just previously generated the value of 1110. The value of 0010 read from the memory 230 may represent a difference between the jump address to be jumped at and the current value of the program counter. The shift clock control unit 341 increases this difference value by 1 and sets the increased value to the down counter 333 as the initial value. The selector 343 selects the output from the clock multiplier 342 and provides the selected output from the clock multiplier 342 to the pseudo-random pattern generator 260.

The clock multiplier 342 is operative to generate a predetermined number of clocks during one clock cycle. In this case, for example, the clock multiplier 342 is assumed to generate eight cycle clocks during the one clock cycle. Of course, the number of the clocks generated by the clock multiplier 342 during the one clock cycle is not limited to a value of eight.

The value of the down counter 333 is decreased by 1 in response to the clock provided by the clock multiplier 342. When the value of the down counter 333 reaches 0 at the $3^{rd}$ clock from the clock multiplier 342, the output generated from the pseudo-random pattern generator 260 reaches 0001. Then, the 0-detection circuit 334 detects that the value of the down counter 333 equals 0 and signals the shift complete signal to the control unit 220. At the same time, the selector 343 changes the clock to be provided to the pseudo-random pattern generator 260 from the multiplied clock at the clock multiplier 342 to the shift clock. Subsequently, the microprocessor has an access to the memory 230 at the address specified by the output 0001 from the pseudo-random pattern generator 260.

In this case, if the clock multiplier 342 is an 8-times multiplier, three shift operations can be effected in one clock cycle. Therefore, it is possible to reduce the time required for counting the jump address for the relative jump instruction by employing the clock multiplier 342, thus improving the performance of the microprocessor system.

A seventh embodiment of the present invention will be explained based on a microprocessor system including a microprocessor, a memory storing a program executable by the microprocessor and/or data, address and data buses for connecting the microprocessor and the memory. In this embodiment, one bit order of terminals for the data bus at the microprocessor is different from the other bit order of terminals for the data bus at the memory.

Figure 9:
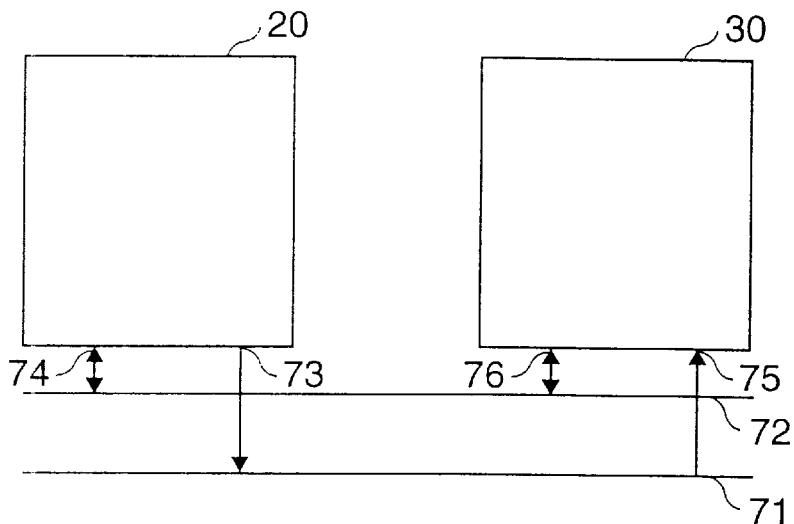
FIG. 9 shows a schematic diagram of a microprocessor system of the prior art.
Figure 10:
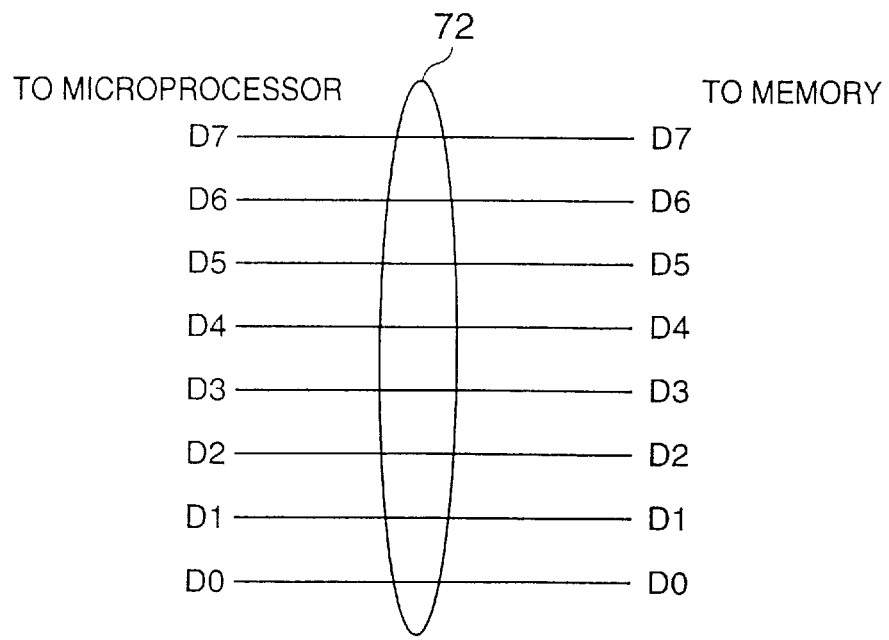
FIG. 10 shows a connection between data terminals of a microprocessor and a memory in the microprocessor system of the prior art.
Figure 12:
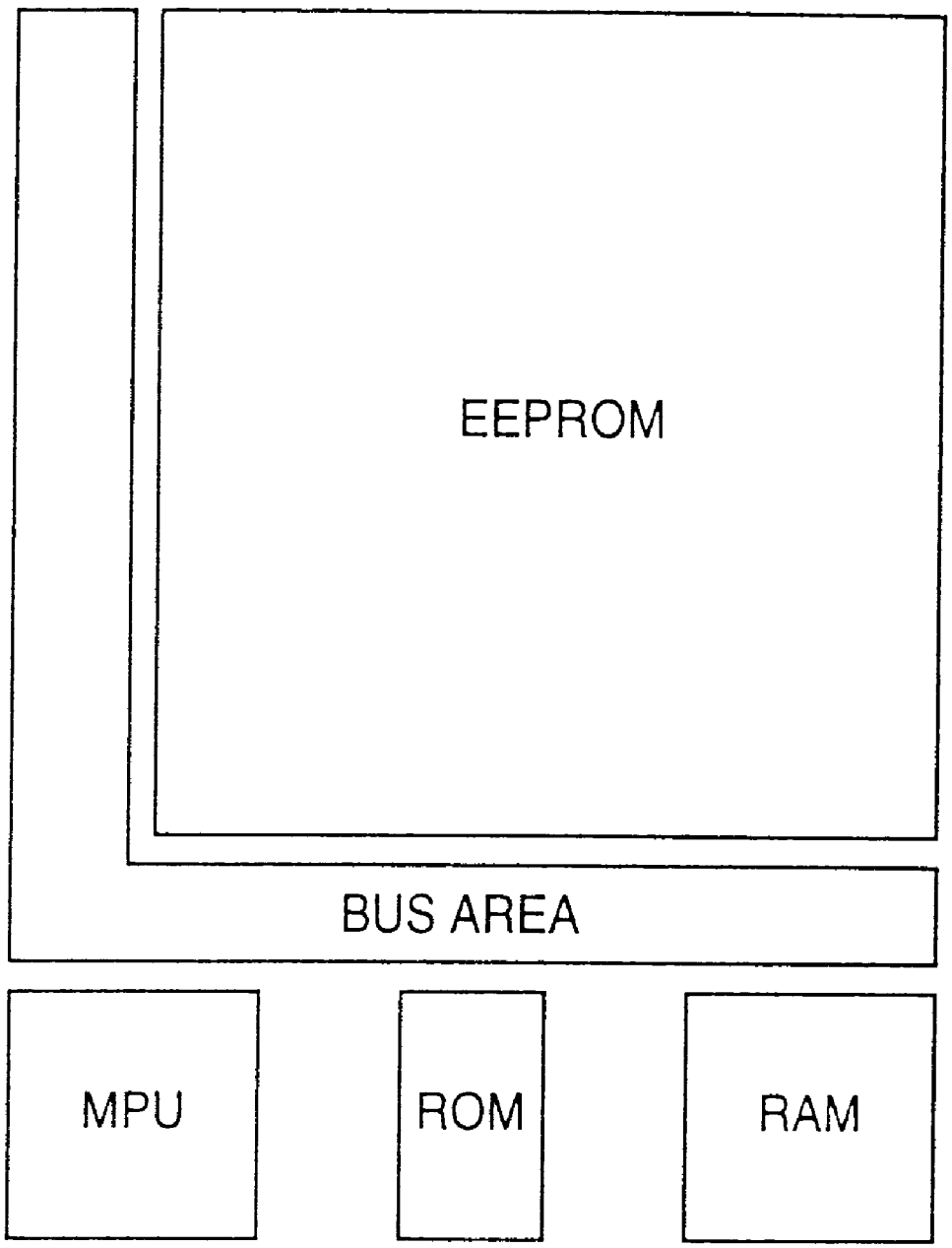
FIG. 12 shows a schematic diagram of an LSI circuit for IC cards of the prior art.
Figure 44:
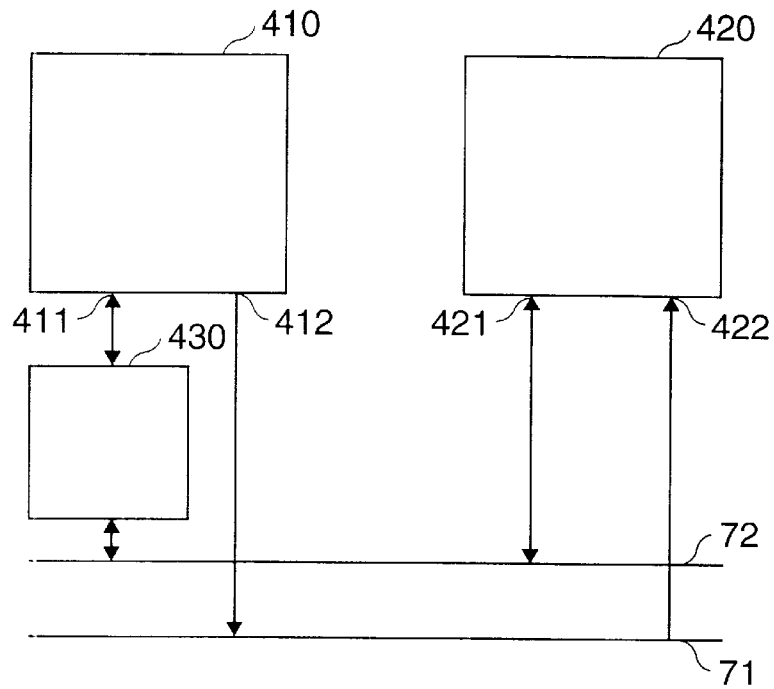
FIG. 44 shows a schematic diagram of a microprocessor system according to a seventh embodiment of the present invention.

FIG. 44 shows a schematic diagram of a microprocessor system 400 according to the seventh embodiment of the present invention. The microprocessor system 400 comprising a microprocessor 410, memory 420 and address and data buses 71 and 72 is basically similar to that of the prior art, as shown in FIG. 9. The microprocessor system 400 is different from the conventional microprocessor system in that a bit-order exchanging block 430 is inserted between the data bus 72 and the data bus terminal 411 of the microprocessor 410.

At the memory 420, each bit of the data bus 72 is connected directly to the corresponding bit of the data bus terminal 421. Also, each bit of the address bus terminal 412 at the microprocessor 410 is directly connected to each bit of the address bus terminal 422 at the memory in sequence without exchanging a bit position. Therefore, for the address bit, the bit-order exchanging does not take place.

Figure 45:
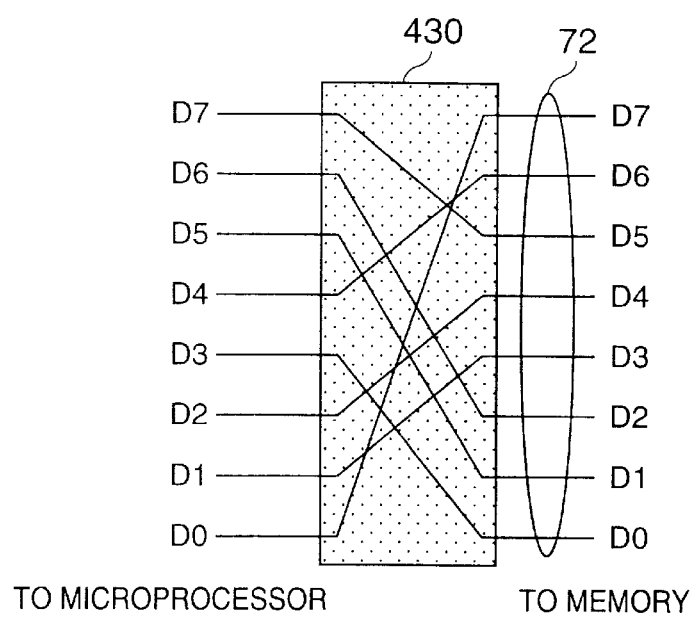
FIG. 45 shows a schematic diagram of a bit-order exchanging block according to the seventh embodiment of the present invention.

FIG. 45 shows a schematic diagram of the bit-order exchanging block 430 according to the seventh embodiment of the present invention. As shown in FIG. 45, the bit-order exchanging block 430 connects a line D7 of the data bus terminal 411 at the microprocessor 410 to a line D5 of the data bus terminal 421 at the memory 420. Also, the bit-order exchanging block 430 connects lines D6, D5, D4, D3, D2, D1 and D0 of the data bus terminal 411 at the microprocessor 410 to lines D2, D1, D6, D0, D4, D3 and D7 of the data bus terminal 421 at the memory 420, respectively. This results in a bit-order exchanging for the data bus between the microprocessor 410 and the memory 420.

FIG. 45 shows only one example of a connection for implementing the bit-order exchanging. Apparently, the present invention may cover any connections that can connect each line of the data bus terminal 411 at the microprocessor 410 and each line of the data bus line 421 at the memory one by one.

FIG. 46 shows an example of data to be stored in a memory 420 according to the seventh embodiment of the present invention. As shown in FIG. 45, the bit order is exchanged between the data bus terminal 411 at the microprocessor 410 and the data bus terminal 421 at the memory 420. In this case, bit positions of programs and/or data to be stored in the memory 420 should be exchanged in order to allow the microprocessor 410 to operate normally.

It is assumed that the microprocessor 410 is a Z-80 microprocessor and a first instruction to be executed by the microprocessor 410 is "LD SP, 7FFF" represented in a Z-80 machine language. This instruction is represented as values of "31" "FF" and "7F" in hexadecimal notation. Without bit-order exchanging, the memory 420 contains these values in sequence starting from an address 0 to the address 2. If the microprocessor 410 has an access to the memory at the address 0, then the value 31 (i.e., 00110001 in binary notation) at the address 0 is delivered from the memory 420 to the microprocessor 410 via the bit-order exchanging block 430. Since the value 31 is passed through the bit-order exchanging block 430, as shown in FIG. 45, the data available on the bus terminal 411 at the microprocessor 410 is exchanged from the value of 31 with respect to the bit order. Then the value of 8C (i.e., 1001000 in binary notation) appears on the bus terminal 411 at the microprocessor 410. Therefore, the microprocessor 410 interprets this code 8C as the instruction code "ADC A, H," not the correct code "LD SP, address." To overcome this misunderstanding, the program and/or data stored in the memory 420 should be previously subjected to the bit-order exchanging process in order to allow the microprocessor 410 to correctly interpret the instruction codes generated from the bit-order exchanging block 430. To do this, the memory 420 contains a bit-order exchanged version of the values C2, FF, DF, 18, C0, 19, 0A, 88, B4, F4 and so on, which correspond to the original version of the values 31, FF, 7F, 06, 11, 0E, 22, 03, C5, D6 and so on, respectively.

Figure 47:
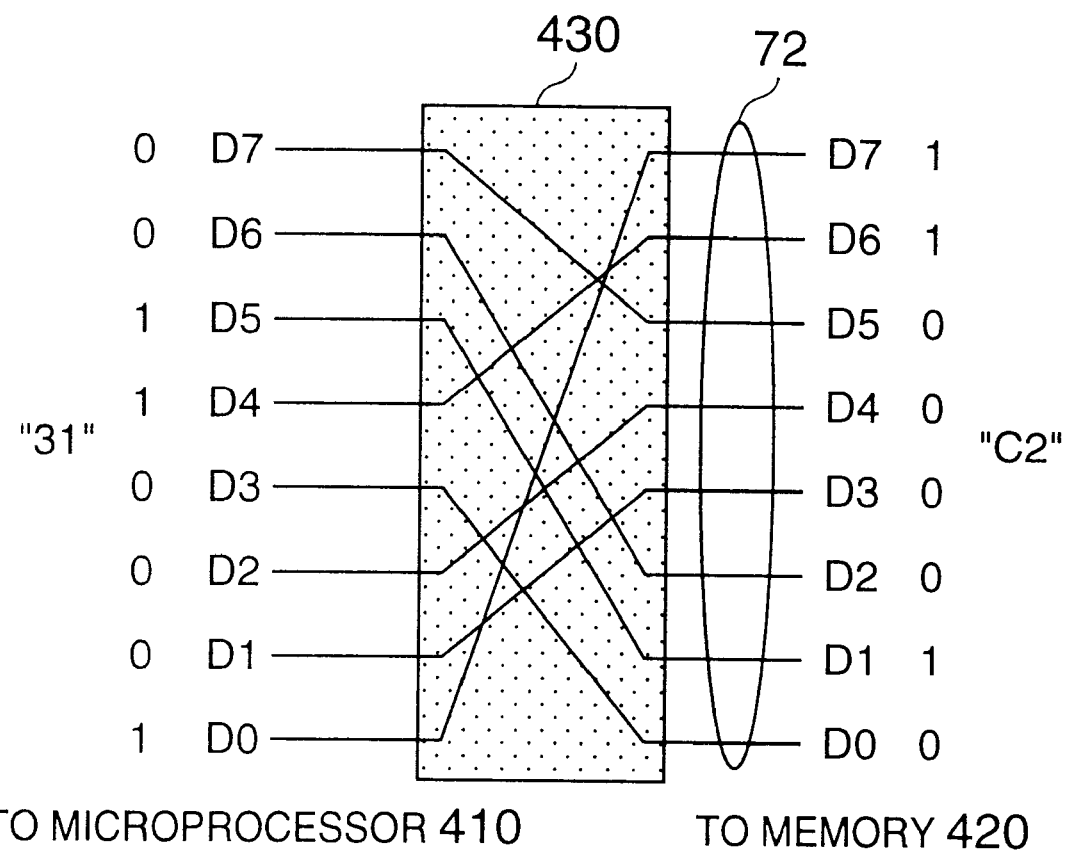
FIG. 47 illustrates particularly how the bit-order exchanging block exchanges an order of some bits according to the seventh embodiment of the present invention.

FIG. 47 illustrates particularly how the bit-order exchanging block exchanges an order of some bits according to the seventh embodiment of the present invention. In particular, the value of C2 on the data terminal 421 at the memory 420 is converted to the value of 31 on the data terminal 411 at the microprocessor 410 by means of the bit-order exchanging block 430.

According to the seventh embodiment of the present invention, each word of the program codes stored in the memory 420 has been previously subject to the bit-order exchanging. As a result, if the microprocessor 410 directly reads the codes from the memory 420, each code read from the memory 420 is a bit order-converted version of the original program code. Thus, it is impossible for the microprocessor 410 to normally execute the codes present on the data bus 72 and effect the same operation in the case of the original program codes.

This leads to an advantage that the operation of the original program codes cannot be analyzed by observing the contents of the memory 420 or the data transmitted on the data bus 72, because the bit order of the observed contents is converted from that of the original program codes.

On the contrary, in the microprocessor system 700 according to the seventh embodiment of the present invention, the bit order conversion block 430 is inserted between the microprocessor 410 and the data bus 72. This keeps the data present on the data bus 72 bit-order converted and enables the microprocessor 410 to process the data without bit-order conversion. In other words, the microprocessor 410 can manipulate the data, whose bit order is recovered by the bit conversion block 430. Therefore, the microprocessor 410 according to the seventh embodiment of the present invention can achieve the correct operation as if the bit order of the program codes stored in the memory 420 is not exchanged.

Figure 48:
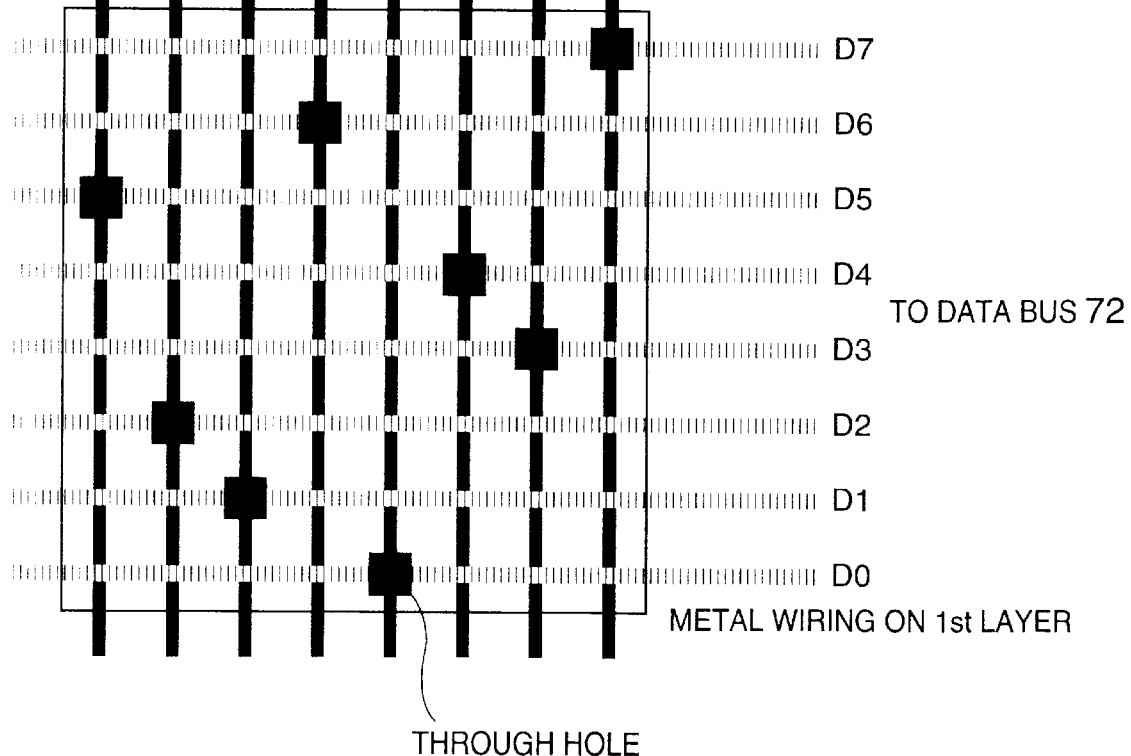
FIG. 48 shows a first particular variation of a bit-order exchanging block according to the seventh embodiment of the present invention.

FIG. 48 shows a first particular variation of a bit-order exchanging block 431 according to the seventh embodiment of the present invention. The bit-order exchanging block 431 includes first metallic lines on a first interconnection layer and second metallic lines on a second interconnection layer. The first metallic lines and the second metallic lines are provided on a substrate. In FIG. 48, the first metallic lines are horizontally extended and the second metallic lines are vertically extended. Each line of the data bus 72 is connected to each of the first metallic lines and each line connected to the data bus terminal 411 at the microprocessor 410 is connected to each of the second metallic lines.

It can be seen from FIG. 48 that lines D7, . . . , D0 of the first metallic lines are sequentially connected to lines D7, . . . , D0 of the data bus 72. Also, lines D7, . . . , D0 of the second metallic layer are connected sequentially to lines D7, . . . , D0 of the data bus terminal 411 at the microprocessor 410.

The first metallic lines and the second metallic lines disposed on each side of an insulator film are connected to each other via through holes arranged each at a predetermined location. It is noted that the desired bit-order conversion can be achieved by appropriately selecting the locations of the through holes.

In the bit-order exchanging block 431, as shown in FIG. 48, the line D7 of the second metallic lines and the line D5 of the first metallic lines are connected via the through hole. Also, the lines D6, D5, D4, D3, D2, D1 and D0 of the second metallic lines are connected to the lines D2, D1, D6, D0, D3, D3 and D7 of the first metallic lines, respectively, via the through holes. This connection results in the same bit-order exchanging as that of the bit-order exchanging block 430 in FIG. 47.

This bit-order exchanging block 431 may be implemented by a block, which comprises first metallic lines connected to the microprocessor 410, second metallic lines connected to the memory 420 and through holes each connecting a predetermined portion of the first metallic lines to a further predetermined portion of the second metallic lines.

Figure 49:
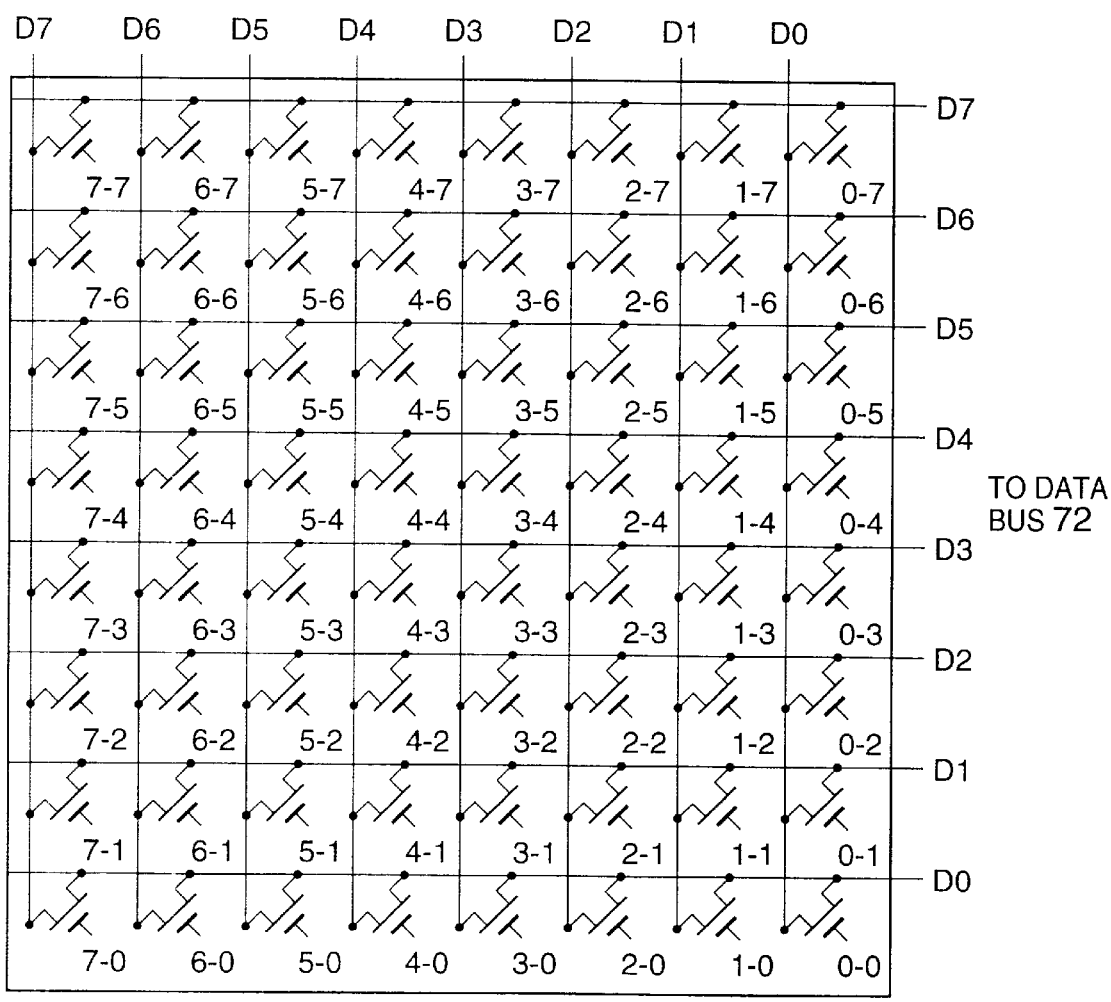
FIG. 49 shows a second particular variation of a bit-order exchanging block according to the seventh embodiment of the present invention.

FIG. 49 shows a second particular variation of a bit-order exchanging block 432 according to the seventh embodiment of the present invention. The bit-order exchanging block 432 comprises a plurality of N-channel MOS transistors, each of which connects one of the lines of the data bus 72 to one of the lines of the data bus terminal 411 at the microprocessor 410.

As shown in FIG. 49, for example, the N-channel MOS transistors are arranged in a matrix of eight rows and eight columns. It is assumed that the N-channel MOS transistor arranged at the row i and column j is designated as the N-channel MOS transistor (j, i). Then, it is easily found that a source and a drain of the N-channel MOS transistor (j, i) is connected to the line Dj at the microprocessor 410 and the line Di at the data bus 72.

Each N-channel MOS transistor has its gate applied with a control signal of 0 or 1 depending on the desired bit-order exchanging. In other words, the gate of the N-channel MOS transistor is connected to a potential of GND or VDD. In this situation, the data bus terminal at the microprocessor 410 is connected to the data bus 72 and thus the desired bit-order exchanging can be achieved by appropriately selecting the control signal applied to the gate of the N-channel MOS transistor.

For example, the bit-order exchanging block 432 can be configured to implement the same bit-order exchanging as that of the bit-order exchanging block 430 in FIG. 47 or the bit-order exchanging block 431 in FIG. 48. In this case, the N-channel MOS transistor (0, 7) connecting the line D0 at the microprocessor 410 to the line D7 at the data bus 72 has its gate applied with the control signal of 1. Also, each gate of the N-channel MOS transistors (4, 6), (7, 5), (2, 4), (1, 3), (6, 2), (5, 1) and (3, 0) is applied with the control signal of 0. Each of other N-channel MOS transistors has its respective gate applied with the control signal of 0.

It is summarized that a bit-order exchanging block 432 comprises first metallic lines connected to the microprocessor 410, second metallic lines connected to the memory 420, a plurality of the N-channel MOS transistors connecting each of the first metallic lines to each of the second metallic lines, and a control unit for applying a desired control signal to a gate of each N-channel MOS transistor. The bit-order exchanging block 432, as shown in FIG. 49, is one example of blocks for implementing a desired bit-order exchanging by applying the desired control signal to the gate of each N-channel MOS transistor by means of the control unit.

In the above embodiment, the bit-order exchanging block 432 is formed by the N-channel MOS transistors, but the N-channel MOS transistor may be replaced with a P-channel MOS transistor. In the case where the bit-order exchanging block is formed by the P-channel MOS transistor, the control signal applied to the gate of the P-channel MOS transistor is inverted so as to implement a bit-order exchanging block equivalent to the bit-order exchanging block 432, as shown in FIG. 49.

Alternatively, it will be appreciated by those skilled in the art that the bit-order exchanging block may be formed by a combination of the N-channel MOS transistors and the P-channel MOS transistors such that the bit-order exchanging is equivalent to that of the above bit-order exchanging block 432.

Furthermore, the control signal applied to each MOS transistor in the bit-order exchanging block 432 may be stored in the memory 420 at some predetermined locations. FIG. 50 schematically illustrates contents of control signals stored in the memory 420. In FIG. 50, each row corresponds to one address in the memory 420 and each column corresponds to one bit within a word stored in the memory 420. That is to say, each control signal is assigned to one bit position at one address in the memory. For example, a location in row 0 and in column 1 represents a control signal for a transistor (0, 0) and is designated as 0-0 in the drawing. Thus, the location designated by j-i in FIG. 50 indicates the control signal for the transistor (j, i) in FIG. 49.

FIG. 51 shows control signals to be supplied to a bit-order exchanging block 432 in order to exchange a bit order as shown in FIG. 45. Each control signal, as shown in FIG. 51, is stored in the memory 420 at a address and a bit position corresponding to a bit assignment, as shown in FIG. 50.

Figure 52:
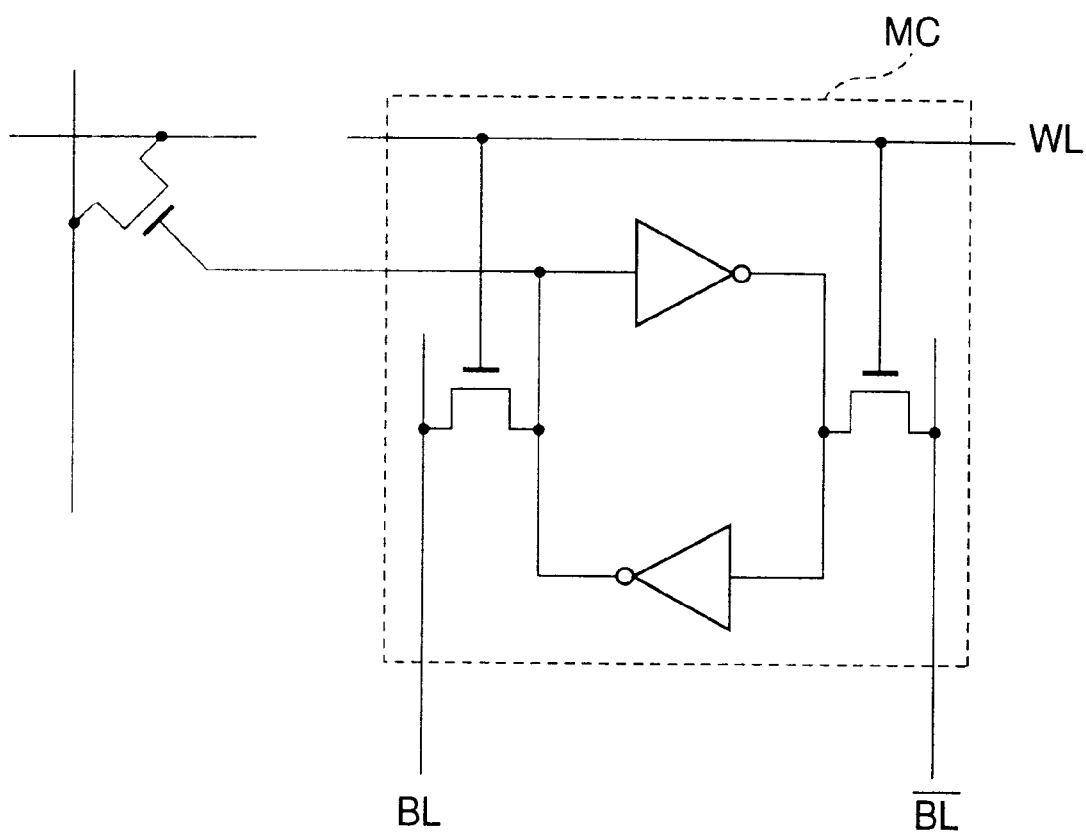
FIG. 52 illustrates a particular memory cell required for controlling a bit-order exchanging block and a connection between the memory cell MC and a transistor.

FIG. 52 illustrates a particular memory cell required for controlling a bit-order exchanging block 432 and a connection between the memory cell MC and transistors. A given node of each bit in the memory 420 is connected to a gate of the corresponding gate and some of the transistors are switched on. This allows a bit-order exchanging to take place. In this case, it is shown that a one-port SRAM is used for the memory cell MC. It is noted that the memory cell may be formed by a two-port SRAM, an EEPROM, a ROM and the like and that the same or similar effect can be caused as that of the one-port SRAM in any case. Moreover, a bit-order exchanging scheme may be modified by employing the SRAM and varying the data to be written in the SRAM. Therefore, at any time, the bit-order exchanging scheme can be modified by overwriting the data in the SRAM.

Figure 53:
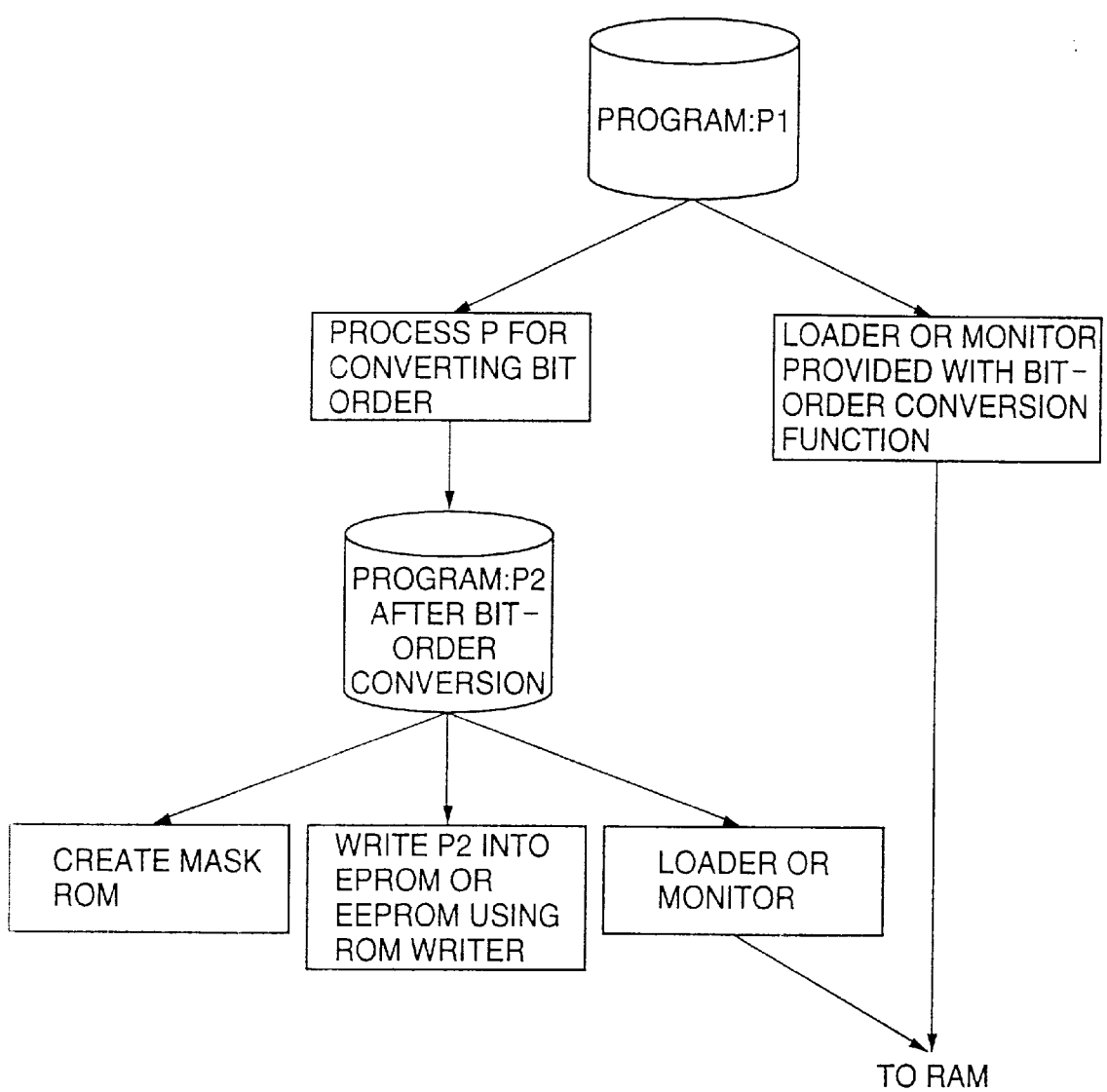
FIG. 53 shows how a bit order of a program stored in a memory is exchanged according to the seventh embodiment of the present invention.

FIG. 53 shows how a bit order of a program stored in a memory 230 is exchanged according to the seventh embodiment of the present invention.

A program P1 is a program capable of being executed by a conventional microprocessor. A program P2 is a program capable of being executed by a microprocessor 410 according to the seventh embodiment of the present invention. The program P2 is derived from the program P1 by exchanging a bit order of words in the program P2.

At first, a bit-order exchanging process P is started for converting the program P1 to the program P2. Then, a mask ROM for storing the program P2 generated by the process P is created, and is connected to the microprocessor 410.

Alternatively, the program P2 may be stored in a RAM by means of an external loader program or another loader program running on the microprocessor 410 such that the program P2 can be executed on the microprocessor 410.

Furthermore, it is assumed that a loader program for loading the program P2 into the memory or a monitor program running on the microprocessor 410 is provided with a bit-order exchanging algorithm. Then the loader program or the monitor program may be used to directly covert the original program P1 to the destination program P2, store the program P2 in the RAM and allow the microprocessor 410 to execute the program P2 stored in the RAM.

Figure 54:
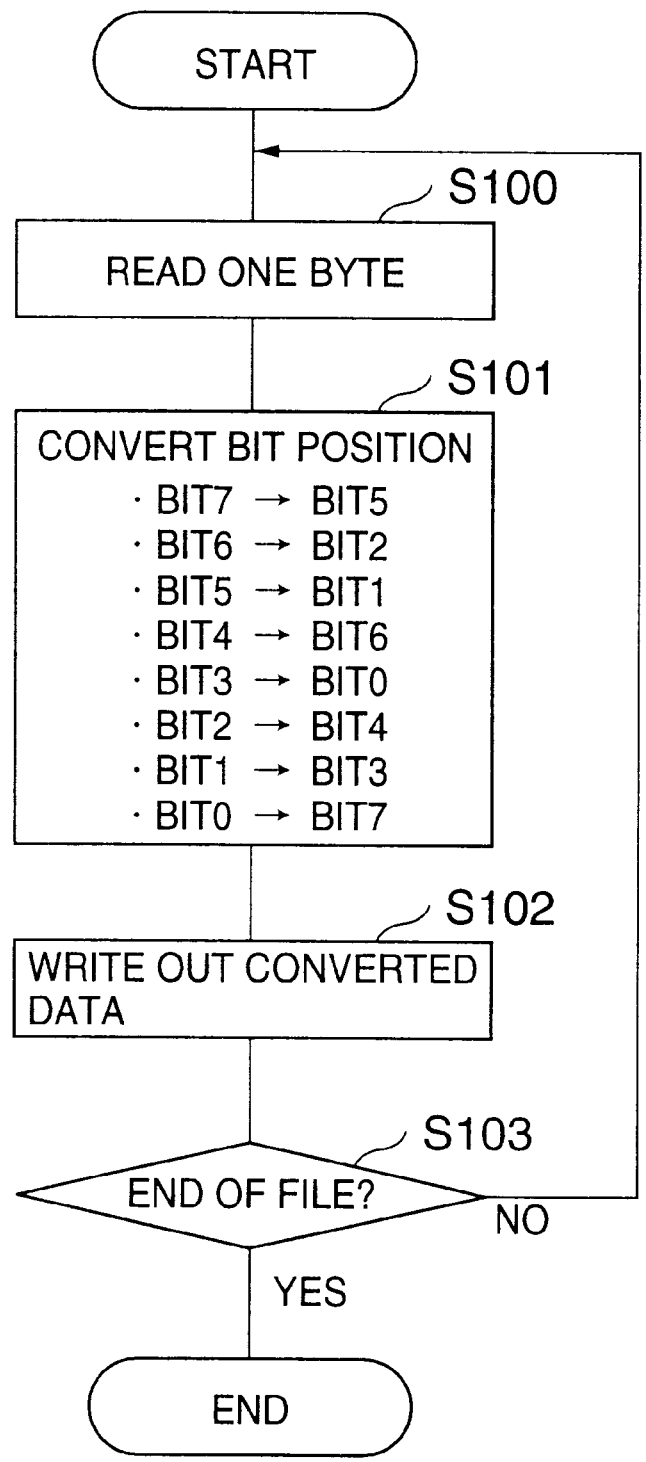
FIG. 54 is a flowchart of a bit-order exchanging operation by a bit-order exchanging process P according to the seventh embodiment of the present invention.

FIG. 54 is a flowchart of a bit-order exchanging operation by a bit-order exchanging process P according to the seventh embodiment of the present invention. The bit-order exchanging process P may, for example, be recorded on a given recording medium, and be executed by any computer other than the microprocessor 410.

The process P starts with step 100 for reading one byte from the original program P1. Then, in step 101, an exchanging of some bit positions within the one byte read from the original program P1 is carried out. In this case, for example, a source bit order of 7, 6, 5, 4, 3, 2, 1 and 0 within the original byte is sequentially converted to a destination bit order of 5, 2, 1, 6, 0, 4, 3 and 7. Then, a new byte having the destination bit order is generated from the original byte. This new byte is written out in step 102. Then it is determined whether all of the bytes from a program file are processed or not, that is to say, whether an end of file is reached or not in step 103. If the process is not completed, the process returns to step 100 to read a further byte from the program and steps 101, 102 and 103 are repeatedly carried out. Otherwise, the process is terminated.

This process P may not only be executed by the other computers besides the microprocessor 410, but also may be embedded and executed by the loader or monitor program.

Figure 55:
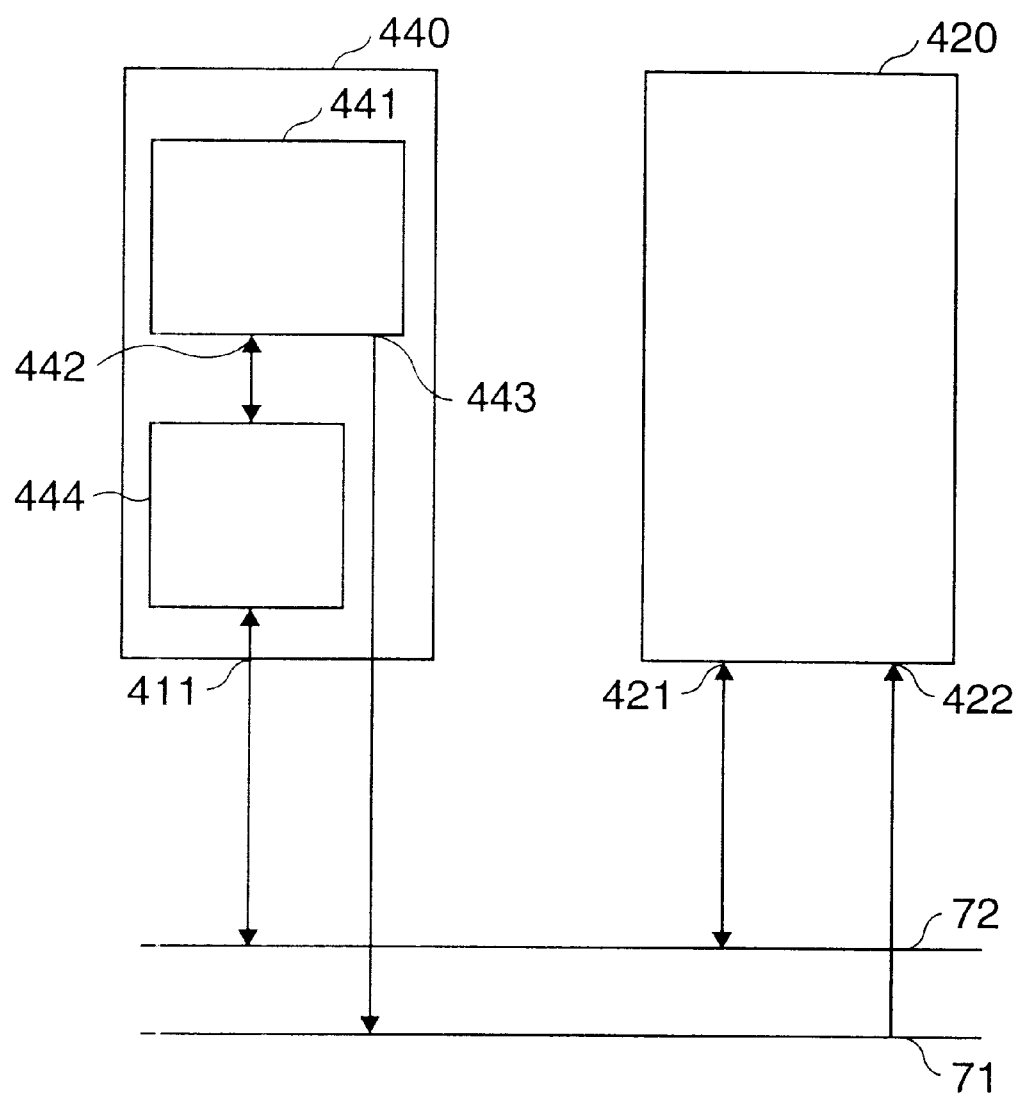
FIG. 55 shows a schematic diagram of a variation of a microprocessor system according to the seventh embodiment of the present invention.

FIG. 55 shows a schematic diagram of a variation of a microprocessor system 401 according to the seventh embodiment of the present invention. In the microprocessor system 400, as shown in FIG. 44, the bit-order exchanging block 430 is inserted between the data bus 72 and the data bus terminal 411 at the microprocessor 410. On the contrary, in the microprocessor system 401, as shown in FIG. 55, a bit-order exchanging block 444 is provided between a microprocessor core 441 and the data bus terminal 411 within a microprocessor 440. As a result, the data bus terminal 411 at the microprocessor 440 and the data bus terminal 421 at the memory 420 are connected without changing a bit order one by one.

Figure 56:
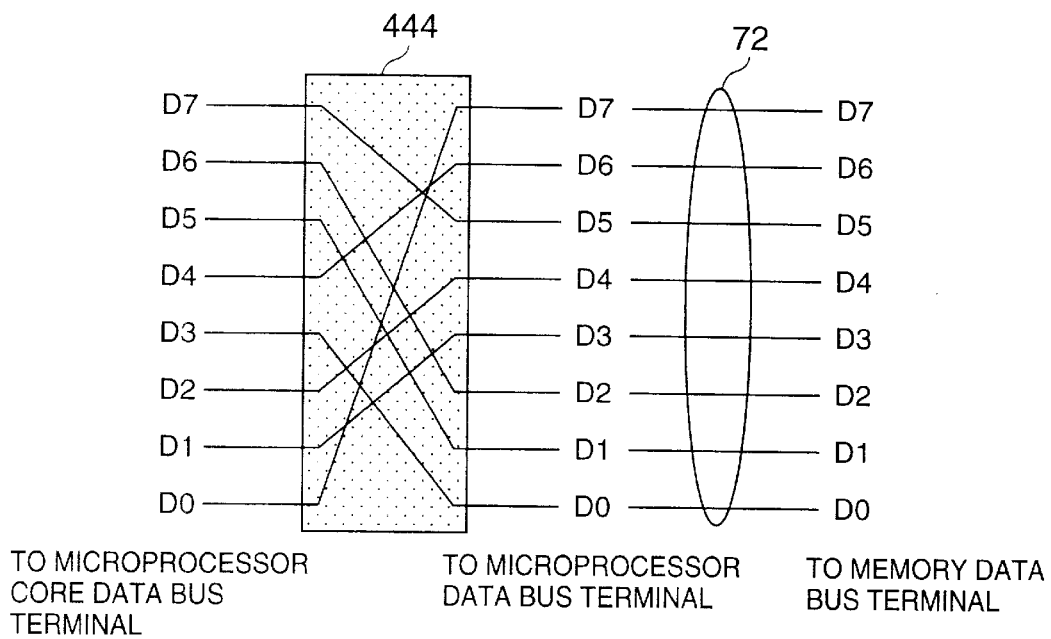
FIG. 56 shows a diagram of a particular bit-order exchanging block used in the microprocessor system shown in FIG. 55.

FIG. 56 shows a diagram of a particular bit-order exchanging block 444 used in the microprocessor system 401, as shown in FIG. 55. In this case, as shown in FIG. 56, a line D7 of the data bus terminal 442 at the microprocessor core 441 is connected to a line D5 of the data bus terminal 411 at the microprocessor 440 via the bit-order exchanging block 444. Now, the line D5 of the data bus terminal 411 is connected to a line D5 of the data bus terminal 421 at the memory 420 via a line D5 of the data bus 72. Then, the line D7 of the data bus terminal 442 at the microprocessor core 441 is connected to the line D5 of the data bus terminal 421 at the memory 420.

Also, further lines D6, D5, D4, D3, D2, D1 and D0 of the date bus terminal 442 at the microprocessor core 441 are connected to lines D2, D1, D6, D0, D4, D3 and D7, respectively, via the bit-order exchanging block 444 and the data bus 72. In this manner, the bit-order exchanging block 444 can be implemented between the data bus terminal 442 at the microprocessor core 441 and the data bus terminal 421 at the memory 420. This bit-order exchanging block 444 realizes functionality equivalent to that of the bit-order exchanging block 430, as shown in FIG. 45. Alternatively, the bit-order exchanging block 444 may be formed by the bit-order exchanging block 431, as shown in FIG. 48, or the bit-order exchanging block 432, as shown in FIG. 49.

Figure 57:
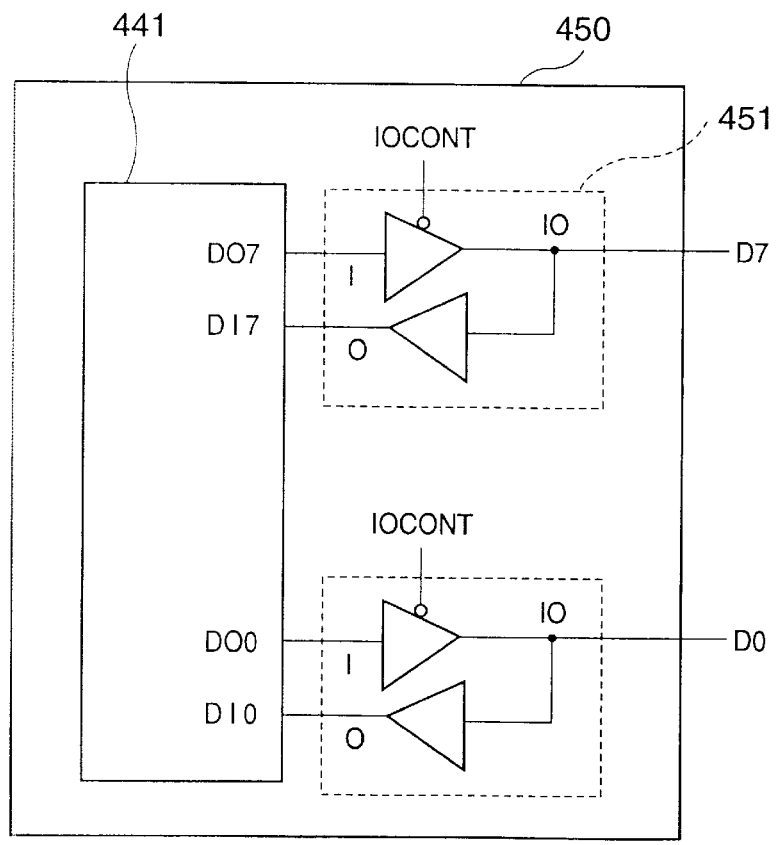
FIG. 57 illustrates a microprocessor core and an IO buffer within a microprocessor of the prior art.

FIG. 57 illustrates a microprocessor core 450 and an IO buffer 451 within a microprocessor 450 of the prior art. The microprocessor 450 comprises a microprocessor core 441 including an internal logic gate and a memory, and an input, output or IO buffer 451 for connecting a terminal of the microprocessor core 441 to a peripheral device. In FIG. 57, for clarity of the drawing, only the IO buffer 451 is illustrated. In general, the IO buffer 451 comprises a tri-state output buffer and an input buffer. An input terminal I is connected to an output terminal O via the tri-state output buffer. Also, an I/O terminal IO is connected to the output terminal O via the input buffer. The tri-state buffer is controlled between an output state and a high impedance state by a control terminal IOCONT. The input terminal I is connected to the data terminal 442 at the microprocessor core 441 and the I/O terminal IO is connected to the data bus terminal 452 at the microprocessor 450.

Figure 58:
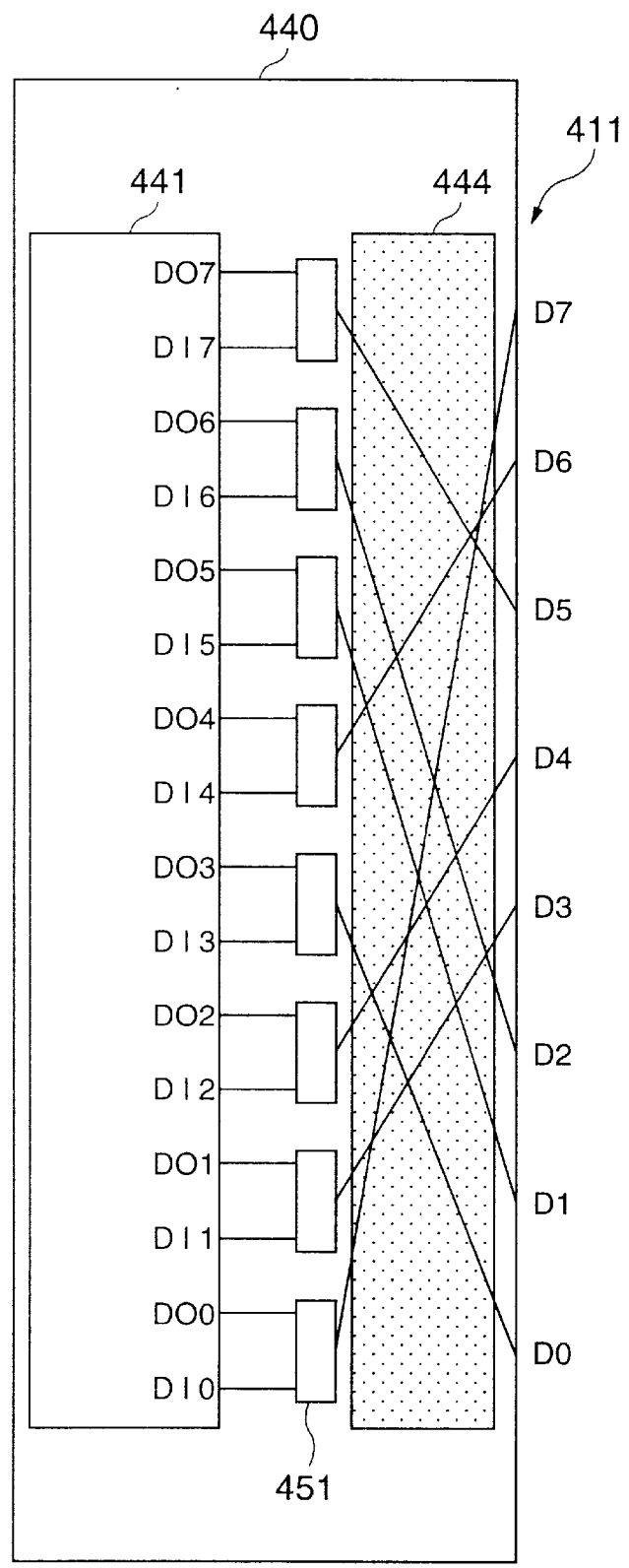
FIG. 58 shows a diagram of a particular circuit of a microprocessor having the bit-order exchanging block in FIG. 56.

FIG. 58 shows a diagram of a particular circuit of a microprocessor 440 having the bit-order exchanging block 444 in FIG. 56. In the microprocessor 440, as shown in FIG. 58, the bit-order exchanging block 444 is inserted between the IO buffer 451 and the data bus terminal 411 at the microprocessor 440.

Figure 59:
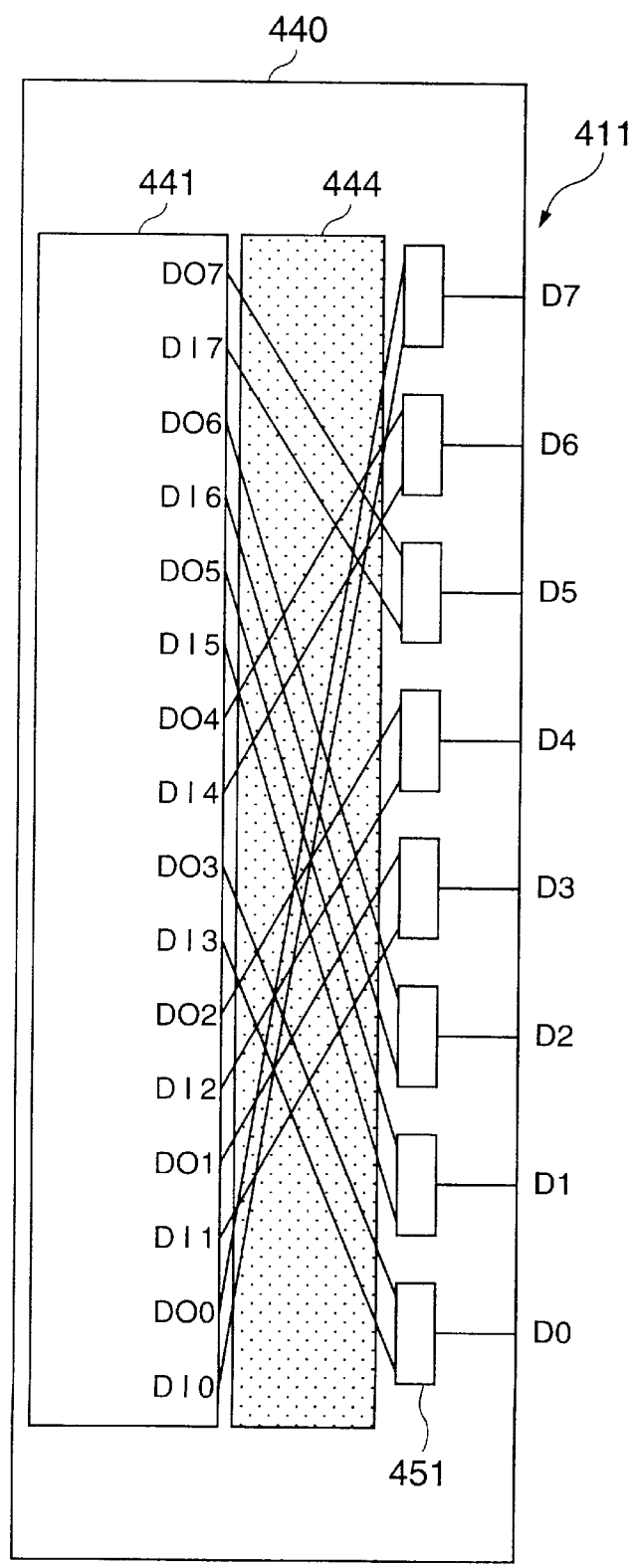
FIG. 59 shows a diagram of another particular circuit of a microprocessor having the bit-order exchanging block in FIG. 56.

FIG. 59 shows a diagram of another particular circuit of a microprocessor 440 having the bit-order exchanging block 444 in FIG. 56. In the microprocessor 440, as shown in FIG. 59, the bit-order exchanging block 444 is inserted between the IO buffer 451 and the microprocessor core 441.

In either case of the microprocessors shown in FIG. 58 or FIG. 59, the bit-order exchanging scheme, as described with reference to FIG. 45, can be realized.

Figure 60:
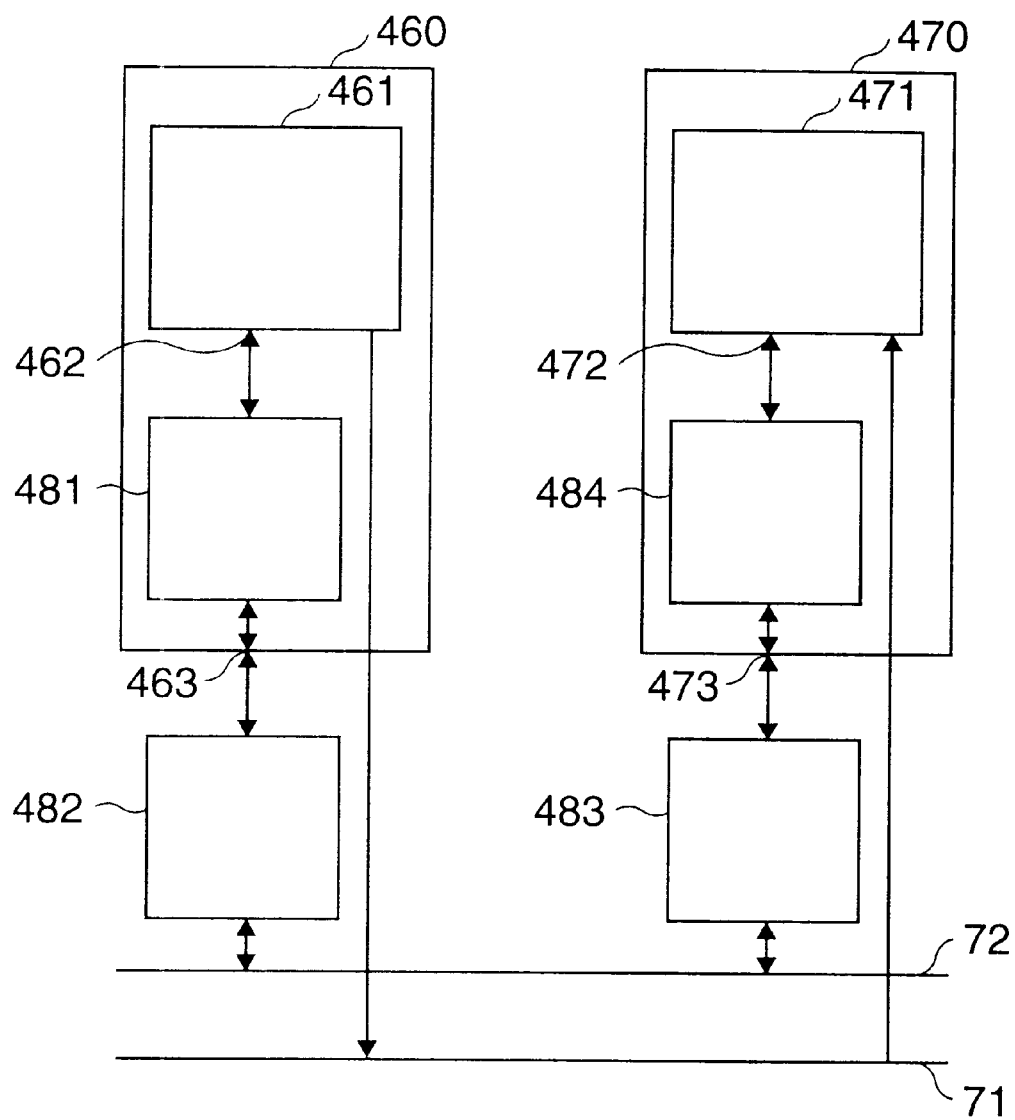
FIG. 60 shows a schematic diagram of a further variation of a microprocessor system according to the seventh embodiment of the present invention.

FIG. 60 shows a schematic diagram of a further variation of a microprocessor system 402 according to the seventh embodiment of the present invention. The microprocessor system 402 includes first, second, third and fourth bit-order exchanging blocks, 481, 482, 483 and 484, respectively. In particular, the first bit-order exchanging block 481 is provided within a microprocessor 460, the second bit-order exchanging block 482 is inserted between a data bus terminal 463 at the microprocessor 460 and the data bus 72, the third bit-order exchanging block 483 is inserted between the data bus 72 and a data bus terminal 473 at a memory 470 and the fourth bit-order exchanging block 484 is provided within the memory 470.

Figure 61:
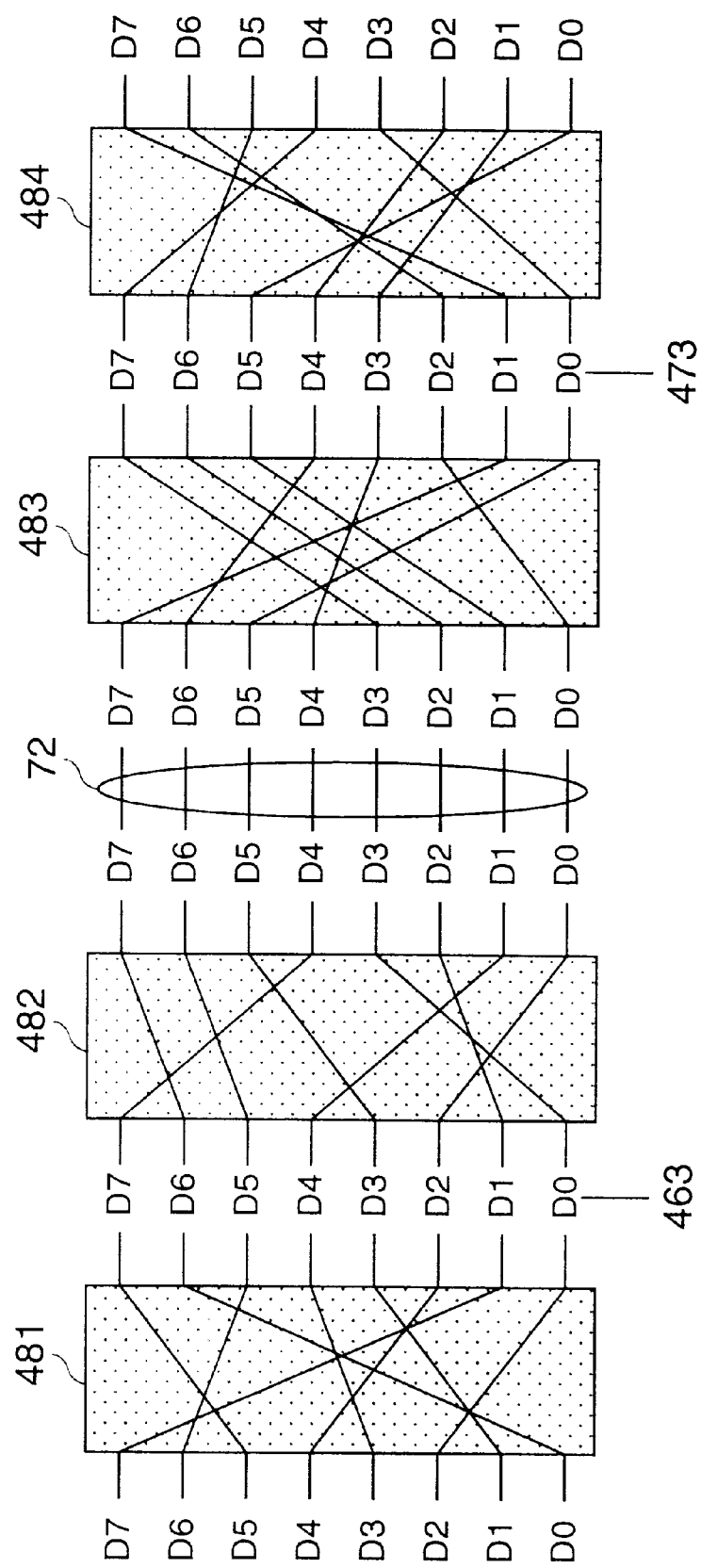
FIG. 61 illustrates how a bit-order exchanging operation is realized in the further variation of the microprocessor system according to the seventh embodiment of the present invention.

FIG. 61 illustrates how a bit-order exchanging operation is realized in the further variation of the microprocessor system 402 according to the seventh embodiment of the present invention. The four bit-order exchanging blocks 481, 482, 483 and 484 are operable to individually exchange the bit positions. These four bit-order exchanging blocks 481, 482, 483 and 484 are constructed such that they cooperate together to realize the bit-order exchanging scheme, such as the scheme shown in FIG. 45, from a data bus terminal 462 at the microprocessor core 461 to the data bus terminal 472 at a memory core 471. In this case, it will be understood that various combinations of each structure of the bit-order exchanging blocks 481, 482, 483 and 484 can achieve the equivalent bit-order exchanging scheme, as a whole.

Furthermore, each of the bit-order exchanging blocks 481, 482, 483 and 484 may be formed by the bit-order exchanging block, as shown in FIG. 48 or FIG. 49, or any elements that can exchange bit positions may be applicable to the bit-order exchanging blocks 481, 482, 483 and 484.

It is also noted that the microprocessor system 402, as shown in FIG. 60, may be constructed such that the microprocessor system 402 includes at least one of the bit-order exchanging blocks 481, 482, 483 and 484. This structure is operative enough to exchange the bit positions as long as each bit-order exchanging block is adequately designed. Of course, a particular combination of the bit-order exchanging blocks 481, 482, 483 and 484, which realize an identity conversion, should be avoided.

In this situation, since the bit order of the contents stored in the memory 470 is converted, the microprocessor system 402 will be protected against an analysis of a behavior of the system 402 by observing the contents stored in the memory. However, since the bit order of the data transmitted on the data bus 72 is aligned in a normal order, the analysis of the behavior of the system 402 by monitoring the data on the data bus 72 will be effective.

A microprocessor system according to an eighth embodiment of the present invention comprises a microprocessor, a memory storing items such as programs executable by the microprocessor and/or data to be accessed by the microprocessor, and address and data buses connecting the microprocessor and the memory. The microprocessor system is characterized in that at least one predetermined bit value of the items to be processed by the microprocessor is inverted relative to at least one corresponding bit value of the items stored in the memory.

Figure 62:
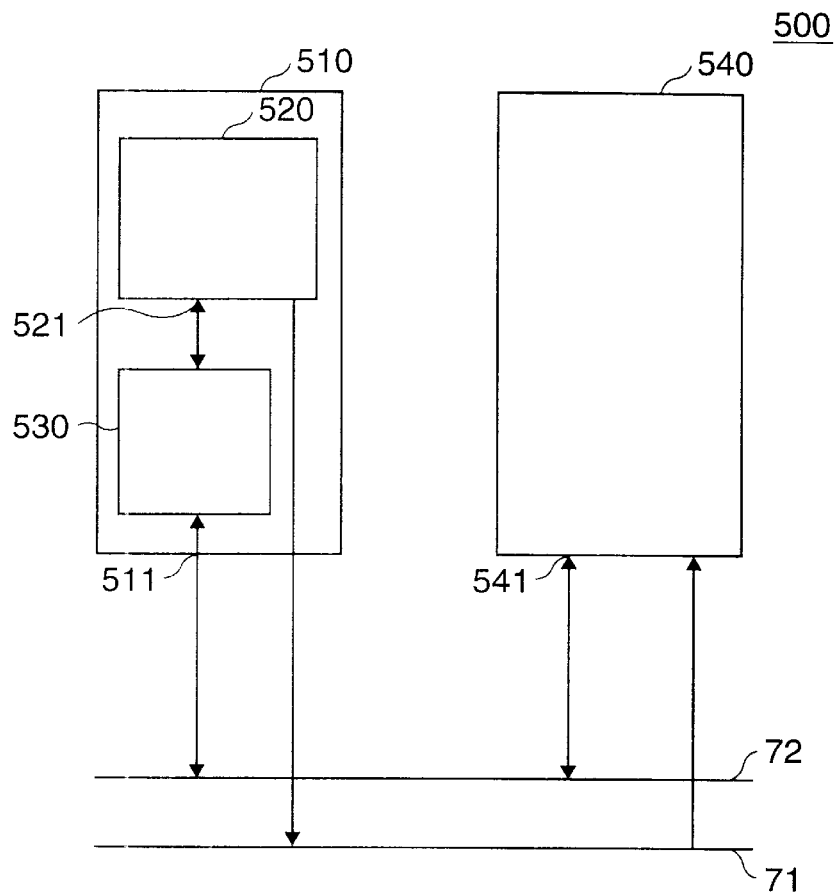
FIG. 62 shows a schematic diagram of a microprocessor system according to an eighth embodiment of the present invention.

FIG. 62 shows a schematic diagram of a microprocessor system 500 according to the eighth embodiment of the present invention. The microprocessor system 500 is basically similar to that of the prior art, as shown in FIG. 9. The latter microprocessor is different from the former microprocessor in that a bit-value inverting block 530 is provided between a microprocessor core 520 at a microprocessor 510 and a data bus terminal 511 at the microprocessor 510 and connected to both.

A memory 540 is identical or similar to a memory 30 of the prior art. Each bit terminal of the data bus 72 is connected to a corresponding bit terminal of the data bus terminal 541 at the memory 540. Each bit of an address bus terminal at the microprocessor 510 is connected to a corresponding bit of an address bus terminal at the memory 540 without changing a bit order.

Figure 63:
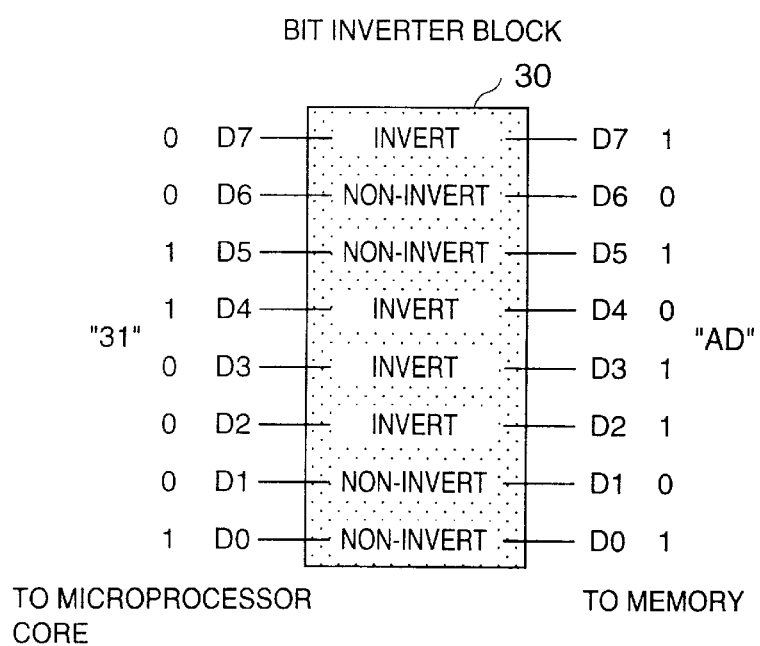
FIG. 63 illustrates how a bit is inverted in a bit-value inverting block according to the eighth embodiment of the present invention.

FIG. 63 illustrates how a bit value is inverted in a bit-value inverting block 530 according to the eighth embodiment of the present invention. In FIG. 63, for each bit, a connection of the data bus 72 is illustrated. The bit-value inverting block 530 is operative to invert the bit value of the data bus 72 within the block 530. In this case, values of bit 7, 4, 3 and 2 of the data bus 72 are inverted.

It is noted that an example of the connection scheme is illustrated in FIG. 63 and the connection scheme is not limited to this example. Any connection scheme may be applicable to this embodiment, as long as each bit of the data bus terminal 521 at the microprocessor core 510 is connected to a corresponding bit of the data bus 541 at the memory one by one, thus inverting the value of at least one predetermined bit.

FIG. 64 illustrates an example of data to be stored in a memory 540 according to the eighth embodiment of the present invention. As shown in FIG. 63, the values of bit 7, 4, 3 and 2 on the data bus are inverted within a path between the microprocessor 510 and the memory 540. In this case, the microprocessor 510 cannot directly execute instruction codes stored in the memory 540, when each instruction code is stored in the memory 540 without inverting the value of any bits. Therefore, it is required for inverting each value of the predetermined bits of the contents, which may be the instruction codes and/or data, to be stored in the memory 540.

It is assumed that the microprocessor system 500 is required to realize functionality equivalent to that given by executing the program, as shown in FIG. 11, in an ascending order. Then the program codes stored in the memory 540 should be converted in terms of some predetermined bits, as shown in FIG. 64. In this case, the values of bit 7, 4, 3 and 2 within original instruction codes 31, FF, 7F, 06, 11, . . . are inverted such that the inverted version of the instruction codes AD, 63, E3, 9A, 8D, . . . are generated using bit-value inverting and stored in the memory 540.

Figure 65:
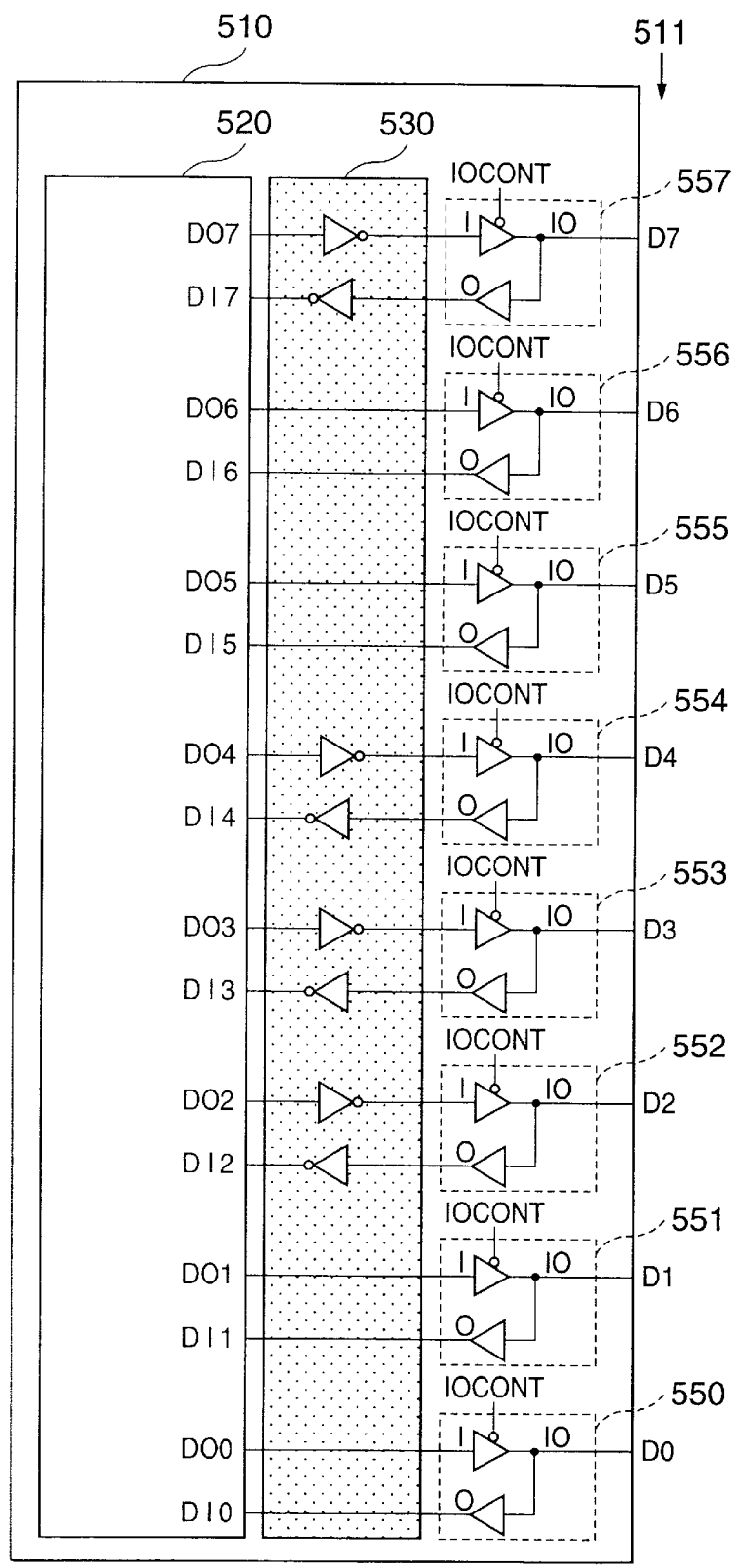
FIG. 65 illustrates a schematic diagram of a particular bit-value inverting block according to the eighth embodiment of the present invention.

FIG. 65 illustrates a schematic diagram of a particular bit-value inverting block 530 according to the eighth embodiment of the present invention. As shown in FIG. 65, the bit-value inverting block 530 is provided between a terminal of a microprocessor core 520 and IO buffers 550, . . . , 557 at any bit position where a corresponding bit value is to be inverted. In this case, the bit-value inverting block 530 is formed of inverters in a direction of input/output, and these inverters carry out an inversion of any desired bits.

Figure 66:
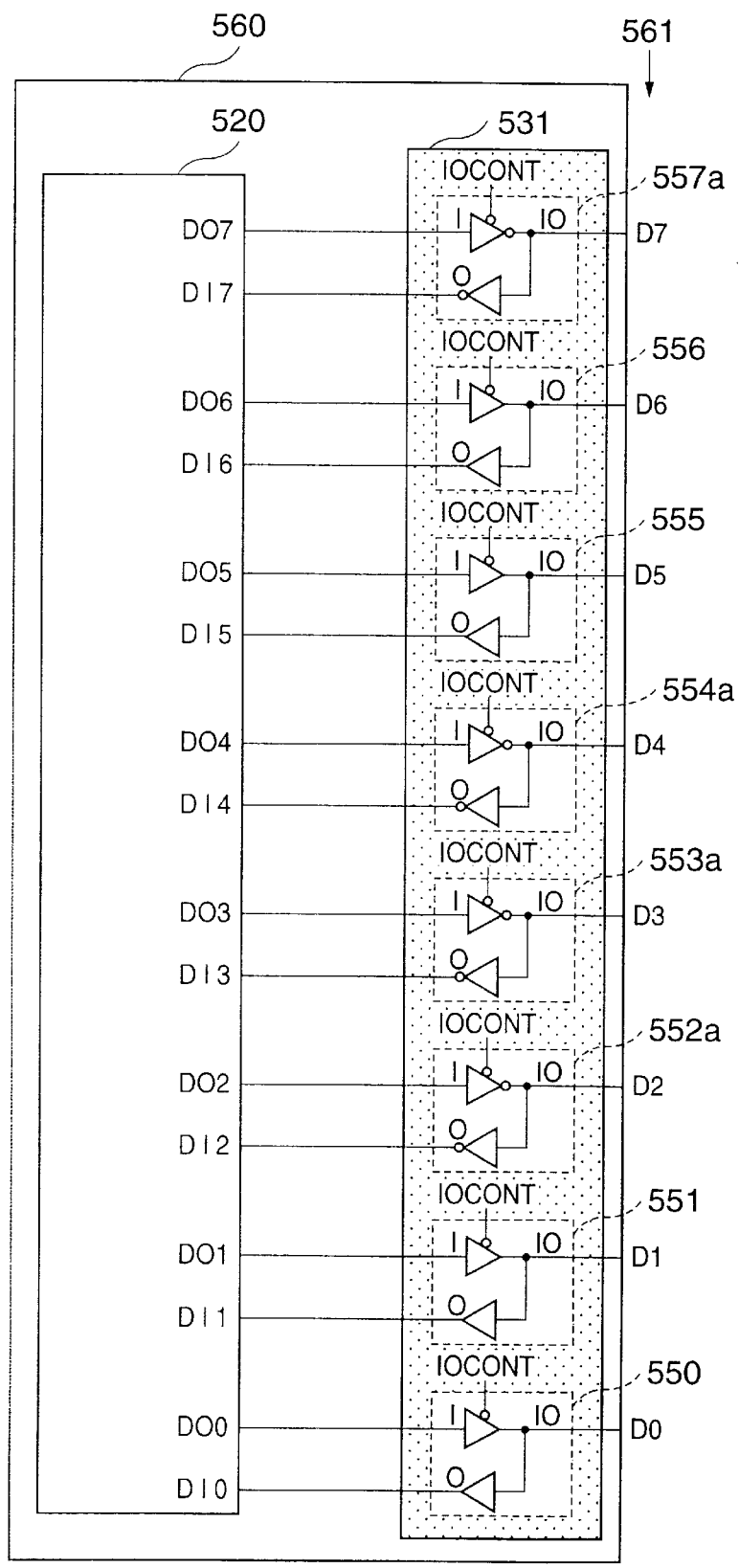
FIG. 66 illustrates a schematic diagram of a further particular bit-value inverting block according to the eighth embodiment of the present invention.

FIG. 66 illustrates a schematic diagram of a further particular bit-value inverting block 531 according to the eighth embodiment of the present invention. In this case, the bit-value inverting block 531 comprises IO buffers 552a, 553a, 554a and 557a being provided at bit positions where the corresponding bit values should be inverted for inverting the bit value. Also, the bit-value inverting block 531 includes other IO buffers 550, 551, 555 and 556 being provided at other bit positions where the corresponding bit values are not inverted. The bit-value inverting takes place in the IO buffers with bit-value inverting capability.

Figure 67:
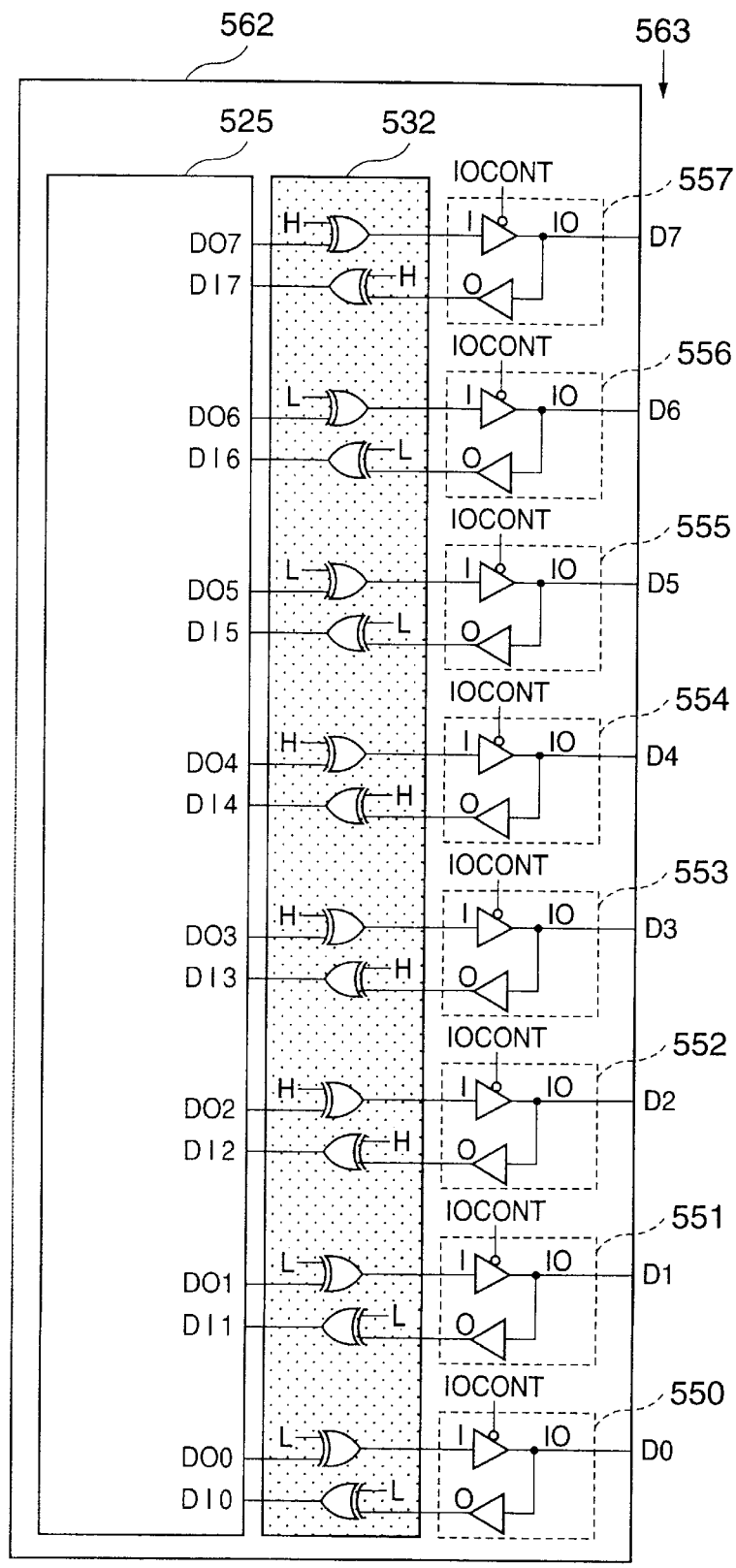
FIG. 67 illustrates a schematic diagram of a still further particular bit-value inverting block according to the eighth embodiment of the present invention.

FIG. 67 illustrates a schematic diagram of a still further particular bit-value inverting block 532 according to the eighth embodiment of the present invention. The bit-value inverting block 532 substitutes an XOR gate for an inverter, as illustrated in FIG. 65. A microprocessor core 525 is connected to one input of the XOR gate and an output of the XOR gate is connected to an IO buffer. Thus, the microprocessor core 525 is connected to the IO buffer via the XOR gate. The other input of the XOR gate is used to determine whether a corresponding bit value is inverted or non-inverted. In the case of bit-value inverting, the corresponding XOR gate has its other input set to a high level. When the XOR gate is located at the bit position where the bit-value inverting is not required, the other input of the XOR gate is set to a low level. In this case, as shown in FIG. 67, each XOR gate located at the bit positions 2, 3, 4 and 7, respectively, has its other input set to the high level and each of the remaining XOR gates has its other input set to the low level.

Alternatively, an XNOR gate may substitute for the XOR gate. With the XNOR gate being used, one input of the XNOR gate is also connected to the microprocessor core 525 and the other input of the XNOR gate is set to the low level when the XNOR gate is located at the bit position where the corresponding bit value is to be inverted.

Otherwise, the other bit of the XNOR gate is set to the high level. As a result, the bit-value inverting block 532, as shown in FIG. 67, can realize similar functionality to the bit-value inverting block 510, as shown in FIG. 65.

Figure 68:
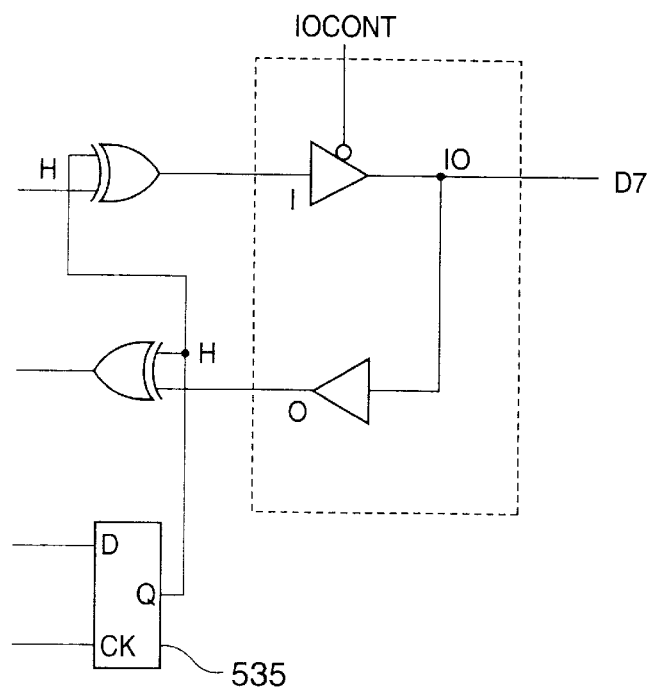
FIG. 68 shows a diagram of a variation of the bit-value inverting block in FIG. 67.

FIG. 68 shows a diagram of a variation of the bit-value inverting block 532 in FIG. 67. In FIG. 67, the bit-value inverting block 532 is directly set at the other input. On the contrary, in the bit-value inverting block 532, as shown in FIG. 68, the other input of the XOR gate is held by a flip-flop 535. In this case, an inversion or non-inversion of the bit value at a given bit position is controllably set by modifying a value held in the corresponding flip-flop 535.

Also, in this case, the flip-flop 535 for holding the value to be set to the other input of the XOR gate may be replaced with a predetermined bit line from a memory such as a DRAM, SRAM, EPROM, EEPROM, FeRAM and so on.

Figure 69:
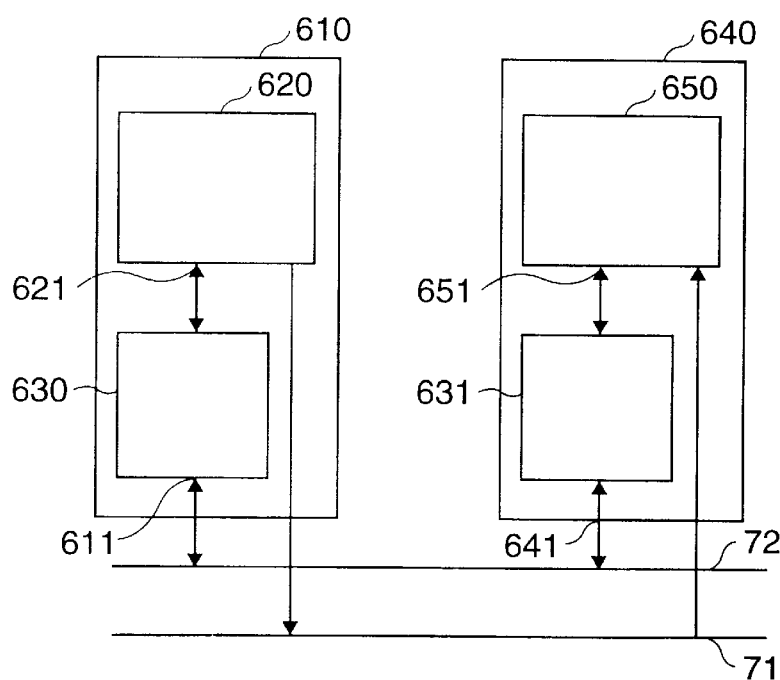
FIG. 69 shows a schematic diagram of a variation of a microprocessor system according to the second embodiment of the present invention.

FIG. 69 shows a schematic diagram of a variation of a microprocessor system 600 according to the second embodiment of the present invention. The microprocessor system 600 comprises a microprocessor core 620, a memory core 650 and a data bus 72. The microprocessor system 600 is provided with a first bit-value inverting block 630 between the microprocessor core 650 and the data bus 72, and a second bit-value inverting block 631 between the memory core 650 and the data bus 72. The bit-value inverting block 630 may dispensed with. However, without the bit-value inverting block 630, it is noted that non-inverted data is transmitted on the data bus 72. This is because the bit-value inverted data stored in the memory 640 is subject to further bit-value inverting in the bit-value inverting block 631 and the bit value is restored to the non-inverted value. In this case, it is difficult to analyze and understand the data stored in the memory 640, but the data transmitted on the data bus 72 may be analyzed and understood in the same manner as the conventional microprocessor system being used.

Figure 70:
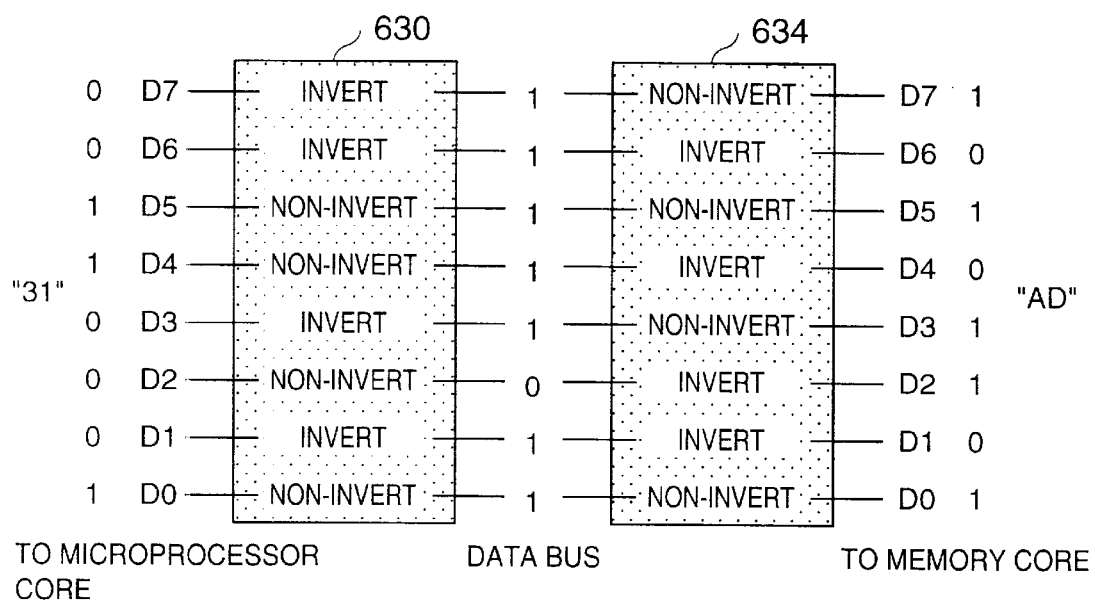
FIG. 70 illustrates how a bit is inverted in the microprocessor system shown in FIG. 69.

FIG. 70 illustrates how each bit is inverted in the microprocessor system 600 shown in FIG. 69. In FIG. 70, it is assumed that the memory 640 stores the same data as illustrated in FIG. 64. A bit-value inverting block 630 is provided within a microprocessor 610 and inverts bit values at bit positions 7, 6, 3 and 1. Also, a bit-value inverting block 631 provided within the memory 640 inverts bit values at the bit positions 6, 4, 2 and 1. Since these two bit-value inverting blocks 630 and 631 are connected in series between a microprocessor core 620 and a memory core 650, the bit values at the bit positions 7, 4, 3 and 1 are inverted between the microprocessor core 620 and the memory core 650. This allows the same bit-value inverting as shown in FIG. 63 and the data stored in the memory 640 corresponds to the data as shown in FIG. 64.

Of course, there are various combinations of the bit-value inverting block 630 and the bit-value inverting block 631 so as to effect the desired bit-value inverting between the microprocessor core 620 and the memory core 650. Even if the bit positions, where the bit value within a word stored in the memory 640 should be inverted, are previously determined, the bit positions where the bit value should be inverted in the bit-value inverting blocks 630 and 631 are not always fixed. It is noted that the bit values at any bit positions in the memory 640 can be inverted by inverting the corresponding bit values at the appropriate bit positions.

Figure 71:
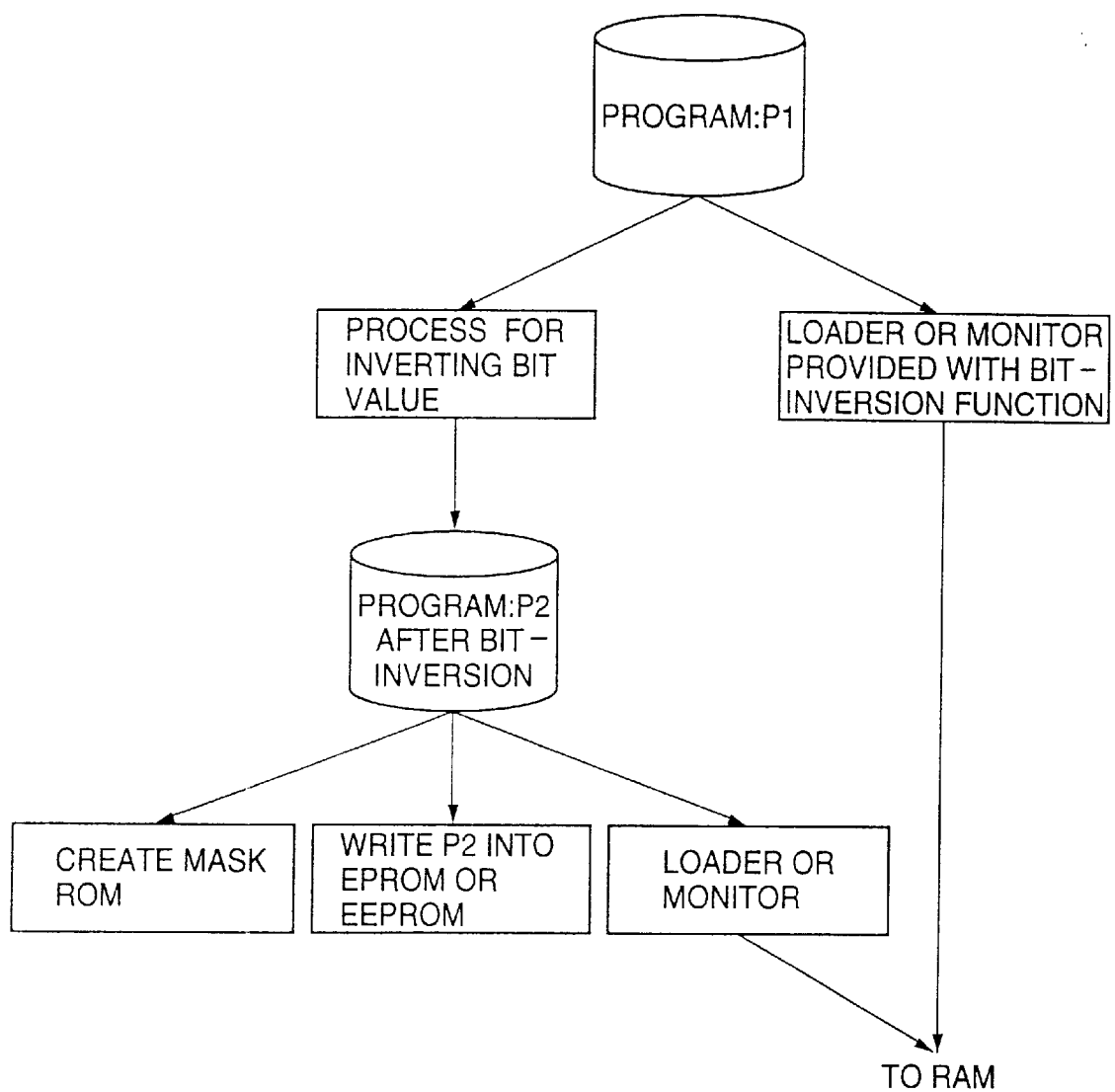
FIG. 71 shows how some bits of a program stored in a memory are inverted according to the eighth embodiment of the present invention.

With reference to FIG. 71, a method for creating a bit-value inverted version of a program and storing in a memory 540 or 640 according to the eighth embodiment of the present invention will be explained.

A program P1 is a program capable of being executed by a conventional microprocessor. A program P2 is a program capable of being executed by a microprocessor 510 or 610 according to the eighth embodiment of the present invention. The program P2 is derived from the program P1 by inverting each bit value at any predetermined position of words in the program P2.

At first, a bit-value inverting process P is started for converting the program P1 to the program P2. Then, a mask ROM for storing the program P2 generated by the process P is created, and is connected to the microprocessor 510 or 610.

The program P2 may be stored in a memory such as an EPROM or EEPROM by means of a ROM writer, and the memory storing the program P2 may be connected to the microprocessor 510 or 610.

Alternatively, the converted program P2 may be loaded into a RAM by means of an external loader program or another loader program running on the microprocessor 510 or 610 such that the program P2 can be executed on the microprocessor 510 or 610.

Furthermore, it is assumed that a loader program for loading the program P2 into the memory or a monitor program running on the microprocessor 510 or 610 is provided with a bit-value inverting algorithm. Then the loader program or the monitor program may be used to directly covert the original program P1 to the destination program P2, store the program P2 in the RAM and allow the microprocessor 510 or 610 to execute the program P2 stored in the RAM.

Figure 72:
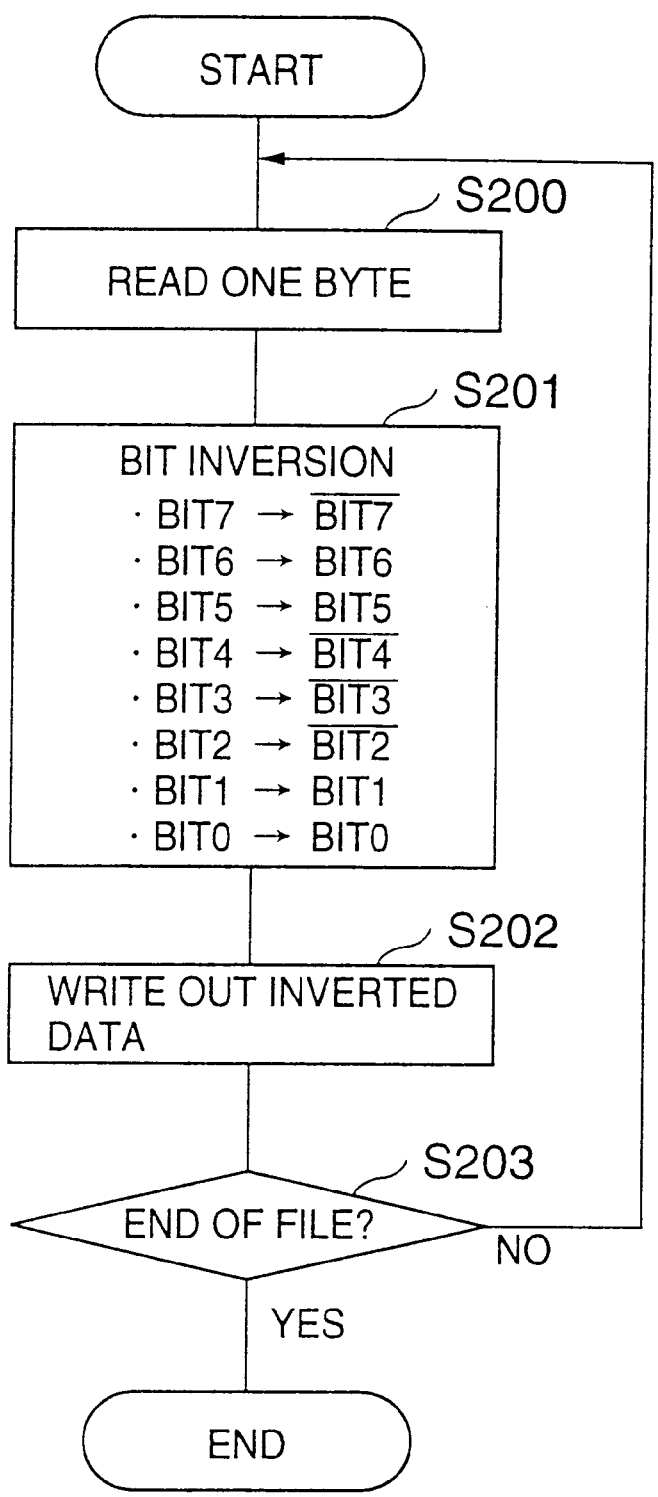
FIG. 72 is a flowchart of a bit-value inverting operation by a bit-value inverting process P according to the eighth embodiment of the present invention.

FIG. 72 is a flowchart of a bit-value inverting operation by a bit-value inverting process P according to the eighth embodiment of the present invention. The bit-value inverting process P may be, for example, recorded on a given recording medium, and be executed by any computer other than the microprocessor 510 or 610.

The process P starts with step 200 for reading one byte from the original program P1. Then, in step 201, an inverting of each bit value of some bit positions within the one byte read from the original program P1 is carried out. In this case, particularly, each bit value at the bit positions 7, 4, 3, and 2 is inverted, and a new byte having some inverted bit values is generated from the original byte. This new byte is written out in step 202. Then it is determined whether all of the bytes from a program file are processed or not, that is to say, whether an end of file is reached or not in step 203. If the process is not completed, the process returns to step 200 to read a further byte from the program and steps 201, 202 and 203 are repeatedly carried out. Otherwise, the process is terminated.

This process P may not only be executed by the other computers besides the microprocessor 510 or 610, but also may be embedded and executed by the loader or monitor program.

According to the eighth embodiment of the present invention, at least one bit value of the data to be processed in the microprocessor is inverted from the corresponding bit value of the data stored in the memory. Therefore, it is difficult to analyze and understand a behavior of the microprocessor system by observing the contents stored in the memory or transmitted on a data bus.

Various aspects of a ninth embodiment of the present invention will be summarized at first.

According to the ninth embodiment of the present application, a semiconductor device, in particular, a microprocessor system, includes a microprocessor, a memory storing items accessed by the microprocessor and a plurality of interconnection layers forming bus lines in columns and bus lines in rows, the bus lines arranged on the separate interconnection layers being connected to one another via through holes. The microprocessor system is characterized in that the bus lines in columns and the bus lines in rows are aligned in a random bit order with respect to a bit order of digital signals to be processed.

The through holes connecting the bus lines in columns and the bus lines in rows may be randomly arranged with respect to the bit order of the digital signals to be processed.

In another aspect of the ninth embodiment, at least a portion of the through holes connecting the bus lines in columns and the bus lines in rows may be covered by a metallic interconnection layer of a rectangular shape.

The bus lines directly inputting/outputting from/to a circuit block may be aligned in a random bit order with respect to the bit order of the digital signal to be processed.

In a further aspect of the ninth embodiment of the present invention, the bus lines in columns and/or the bus lines in rows may be divided into several interconnection layers.

Furthermore, a borderless contact type through hole may be used as the through hole and the bus lines may be extended beyond the through holes.

In addition, the through holes connecting the bus lines in columns and the bus lines in rows may be randomly arranged at intersections of the bus lines in columns and the bus lines in rows such that the bus lines in columns and the bus lines in rows are aligned in a different bit order.

The ninth embodiment of the present invention will be explained in detail.

Figure 13:
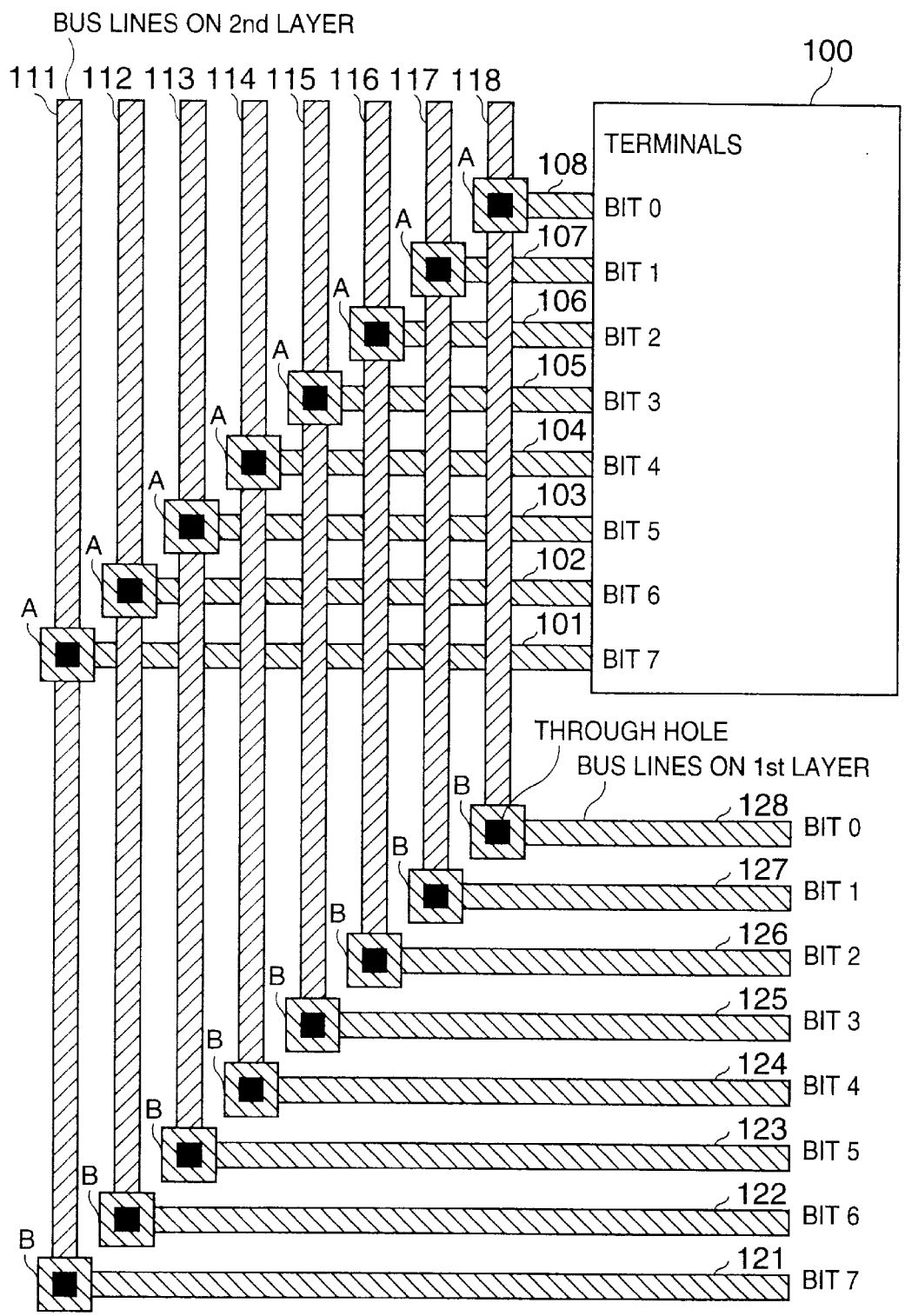
FIG. 13 illustrates a layout of bus lines of the prior art.
Figure 73:
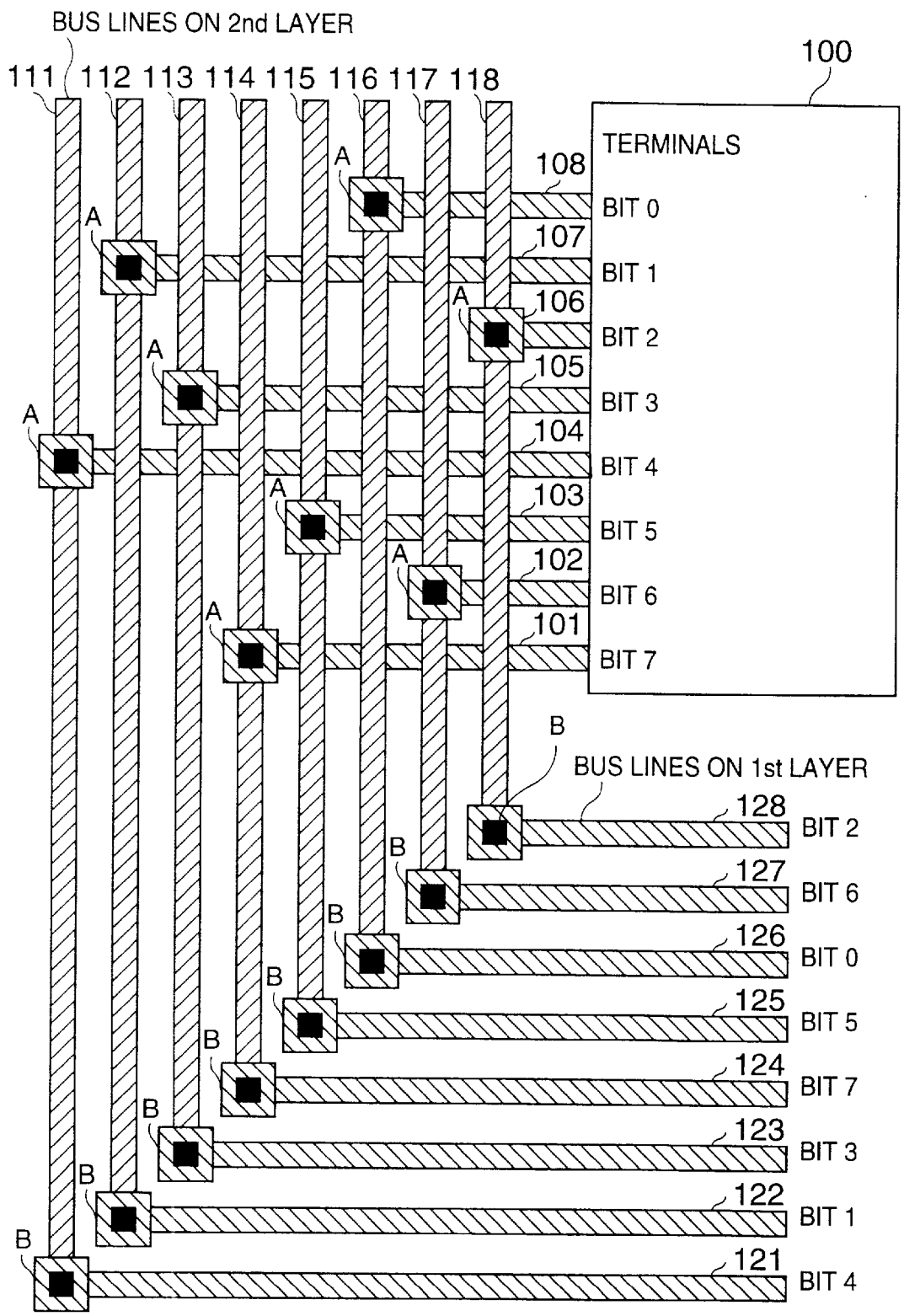
FIG. 73 illustrates a first example of bus lines according to a ninth embodiment of the present invention.

FIG. 73 illustrates a first example of bus lines according to the ninth embodiment of the present invention. In FIG. 73, the same or similar elements to those shown in FIG. 13 are designated by identical references. In FIG. 73, it is assumed that bus lines and a circuit block 100 such as a memory are connected. Of course, the circuit block 100 may be a microprocessor.

In this case, as shown in FIG. 73, bus lines 111, . . . , 118 in columns are arranged on a second interconnection layer and bus lines 121, . . . , 128 in rows are arranged on a first interconnection layer. At a right and lower part of the drawing, terminals in rows of the memory are shown and connected to the bus lines 121, . . . , 128 on the first interconnection layer. The bus lines 121, . . . , 128 in rows are expanded horizontally. The bus lines 121, 128 in rows are connected to the bus lines 111, . . . , 118 in columns on the second interconnection layer, via through holes B. Each terminal corresponding bit 0, 1, . . . , 7 from the circuit block 100 is connected to each of the bus lines 111, . . . , 118 in columns on the second interconnection layer, via each through hole A. The bus lines 111, . . . , 118 on the second interconnection layer are connected to the bus lines 121, . . . , 128 on the first interconnection layer, via the through holes B. This connection can be represented in the following Table 1.

TABLE 1

| BIT TERMINAL OF CIRCUIT BLOCK 100 | BUS LINES ON 2$^{ND}$ LAYER | BUS LINES ON 1$^{ST}$ LAYER | BIT ORDER |
| --- | --- | --- | --- |
| BIT 0 | 116 | 126 | BIT 0 |
| BIT 1 | 112 | 122 | BIT 1 |
| BIT 2 | 118 | 128 | BIT 2 |
| BIT 3 | 113 | 123 | BIT 3 |
| BIT 4 | 111 | 121 | BIT 4 |
| BIT 5 | 115 | 125 | BIT 5 |
| BIT 6 | 117 | 127 | BIT 6 |
| BIT 7 | 114 | 124 | BIT 7 |

Such connection allows an alignment order of the bus lines to be randomly assigned to an order of data bits to be processed. Therefore, if the data on the bus lines are observed by outsiders, the outsiders cannot understand the data on the buses, because the order of the data bits is unknown unless the bit order within the circuit block 100, which corresponds to the alignment order of the bus lines, is given.

Figure 74:
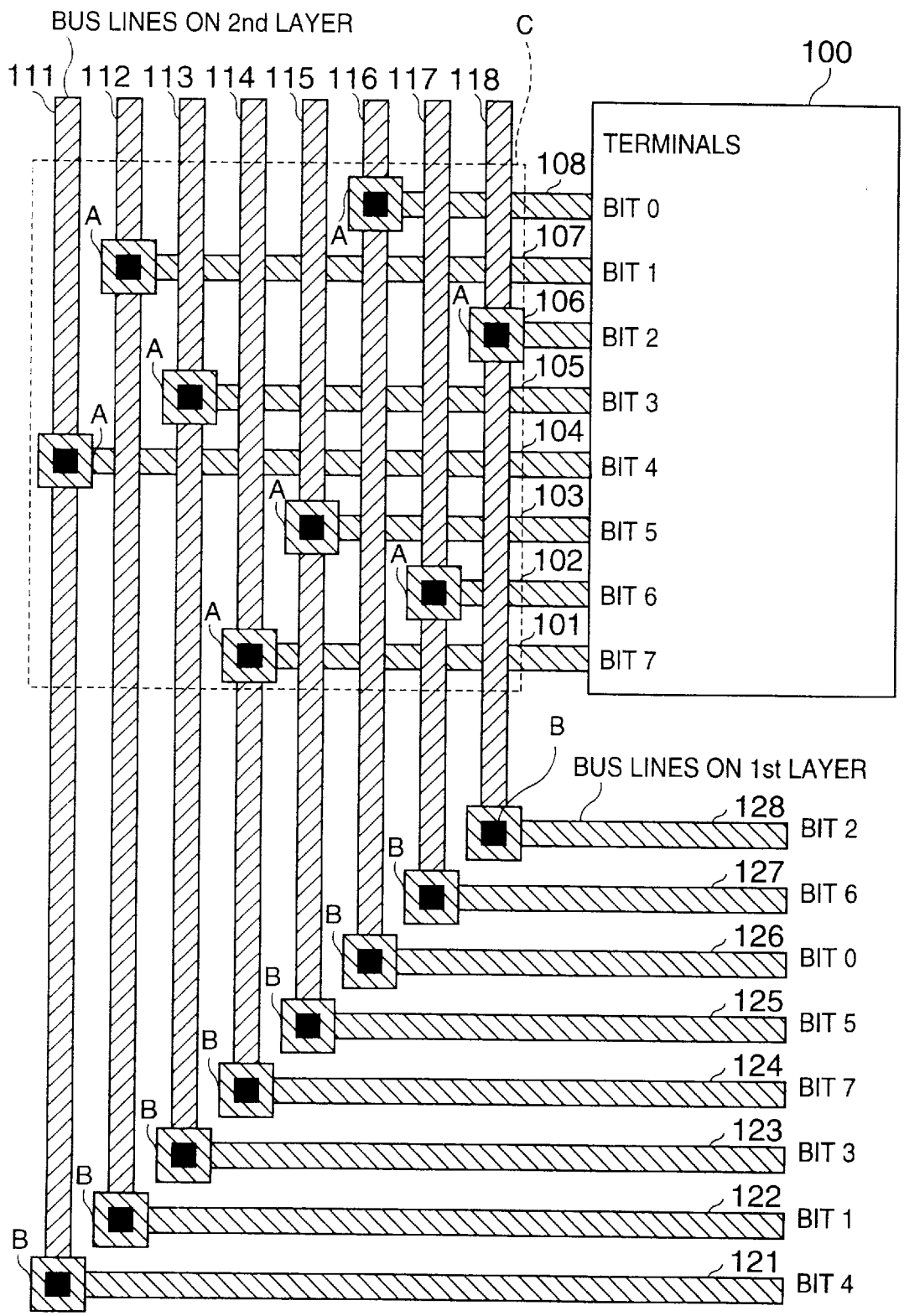
FIG. 74 illustrates a second example of bus lines, where the bus lines are protected against an analysis of a bit order of the bus lines, according to the ninth embodiment of the present invention.

FIG. 74 illustrates a second example of bus lines, where the bus lines are protected against an analysis of a bit order of the bus lines. In this case, an upper metallic rectangular interconnection layer C is provided over an intersectional region of the circuit block 100 and the bus lines at the intersectional region. In FIG. 74, the metallic rectangular interconnection layer C is outlined by a dot line. For example, the metallic rectangular interconnection layer C is provided over a third metallic interconnection layer and/or a fourth metallic interconnection layer.

A pattern analysis technique may be applied to the intersectional region of the circuit block 100 and the bus lines in order to observe the intersectional region. However, in this case, the metallic rectangular interconnection layer C will interfere with an easy access to the intersectional region. As a result, it is difficult to find the bit order of the bus lines by examining the intersectional region.

Figure 75:
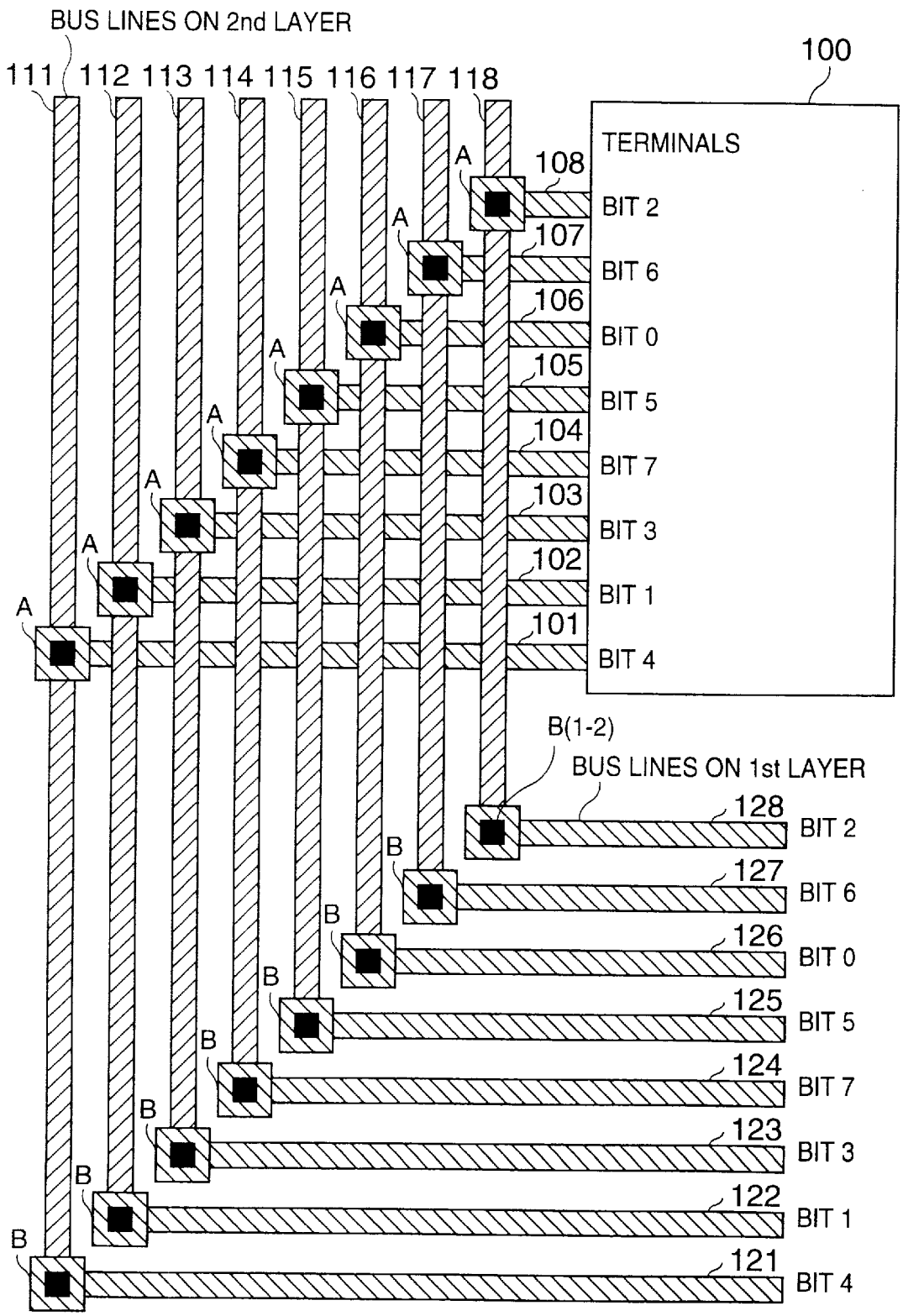
FIG. 75 illustrates a third example of bus lines according to the ninth embodiment of the present invention.

FIG. 75 illustrates a third particular example of bus lines according to the ninth embodiment of the present invention. In this case, if signals from an output terminal at the circuit block 100 and signals on the bus lines are observed, a layout of the bus lines is achieved such that it is impossible to analyze connection between the terminals of the circuit block 100 and the bus lines.

To this end, an interconnection of the circuit block 100 is modified such that the signals available at the output terminal at the circuit block 100 are not sequentially arranged in the bit order. In FIG. 75, each bit of the output terminal from the circuit block 100 is arranged in an order of bits 2, 6, 0, 5, 7, 3, 1 and 4. The terminal for each bit is sequentially connected to the bus lines 118, 117, . . . , 111 on the second interconnection layer. Then, the bus lines 118, 117, . . . , 111 on the second interconnection layer are sequentially connected to the bus lines 128, 127, . . . , 121 on the first connection layer, respectively, via the through holes B.

Such a layout of the bus lines allows the bus lines 111, 112, . . . , 118 to be assigned by the bits in the randomized order of the bits 4, 1, 3, 7, 5, 0, 6 and 2, while a wiring pattern on a chip is observed to be aligned in a normal order. Therefore, it is difficult to analyze and understand the data on the bus lines by observing the data on the bus lines.

FIG. 76 illustrates a variation of the third example of a layout of the bus lines according to the ninth embodiment of the present invention. In the above third example, the bit order appearing at the output terminal of the circuit block 100 is exchanged by modifying the interconnection within the circuit block 100. In this variation of the third example, the bit order of words contained in the memory 100 is exchanged in order to achieve an equivalent effect to that of the third example. In FIG. 76, all the bit positions of the word stored in the memory 100 are converted to the bit positions in accordance with the order of bits 2, 6, 0, 5, 7, 3, 1 and 4. It is possible to exchange the bit positions on the bus lines by exchanging the bit order within the word stored in the memory 100 without modifying the mask pattern. Also, it is difficult to analyze the data stored in the memory 100. It should be noted that such bit-order exchanging in the memory can be applied in conjunction with other various examples of the bus lines according to the ninth embodiment.

Figure 77:
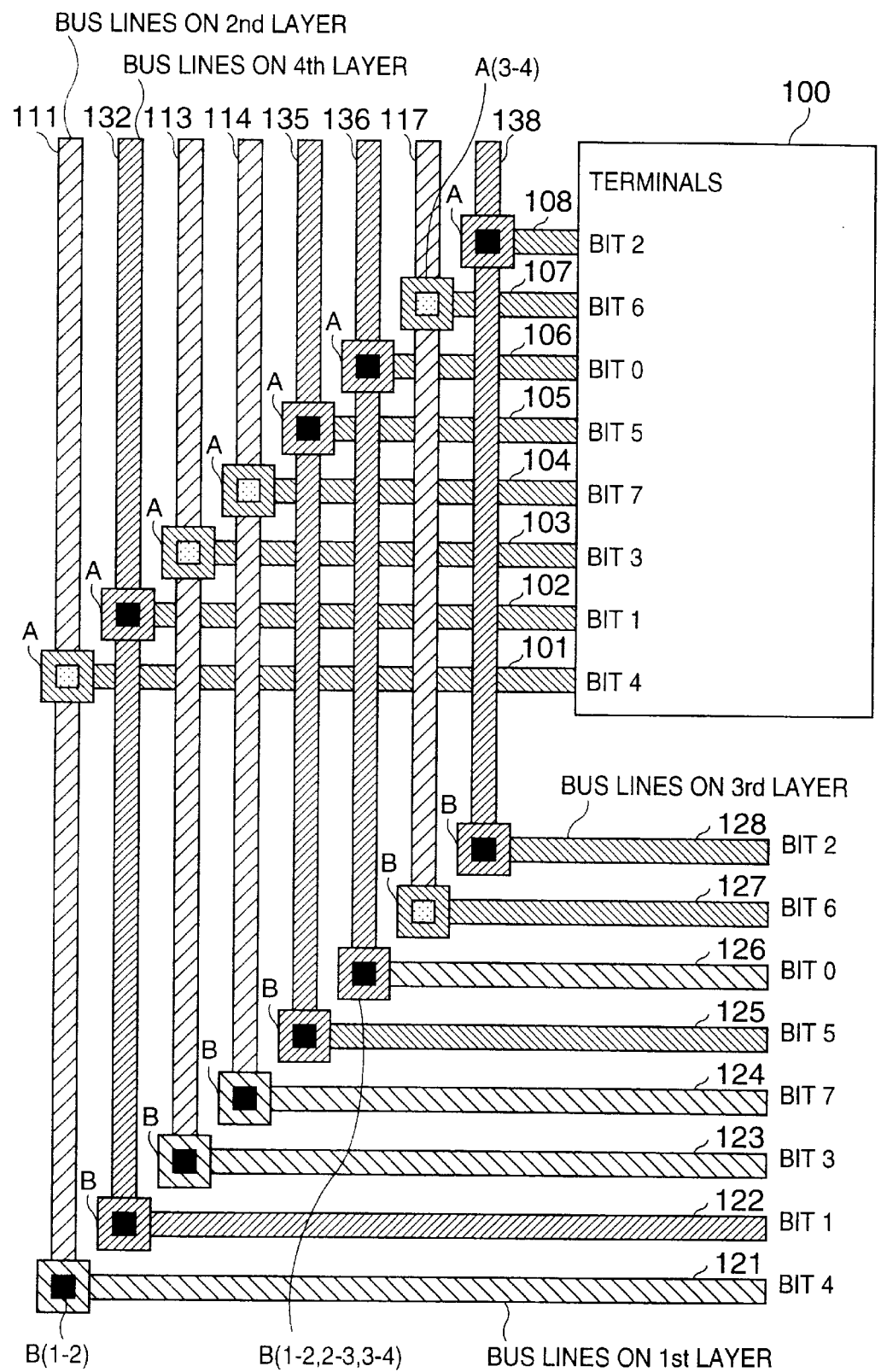
FIG. 77 illustrates a fourth example of bus lines where either or both of the buses in columns and the buses in rows are distributed over a plurality of interconnection layers according to the ninth embodiment of the present invention.

FIG. 77 illustrates a fourth example of the layout of the bus lines. In FIG. 77, either or both of the buses in columns and the buses in rows are distributed over a plurality of interconnection layers.

On one hand, the bus lines 111, 113, 114 and 117 on the second interconnection layer and the bus lines 132, 135, 136 and 138 on the fourth interconnection layer are utilized as the bus lines in columns. On the other hand, the bus lines 121, 123, 124 and 126 on the first interconnection layer and the bus lines 142, 145, 147 and 148 on the third interconnection layer are utilized as the bus lines in rows. The bus line 132 on the fourth interconnection layer is connected to the bus line 142 on the third interconnection layer via a through hole B (3-4) connecting the third and fourth layers. Also, the bus lines 135 and 138 on the third layer are connected to the bus lines 145 and 148, respectively, via the through holes B(3-4) connecting the third layer and the fourth layer. In addition, the bus line 136 on the fourth layer is connected to the bus line 126 on the first layer via a through hole B(1-2, 2-3, 3-4) for connecting the third layer to the fourth layer, the second layer to the third layer and the first layer to the second layer. The bit order in FIG. 77 is similar to that of the layout, as shown in FIG. 75.

It is assumed that an attempt to contact the bus lines and measure a potential of the bus lines, or apply some signals to the bus lines by means of a manual probe device is performed. Then, it is normally obvious that insulating films, such as passivation or interlayer films, formed on the bus lines or inserted between the interconnection layers should be removed before the attempt. However, in this case, the layout has the bus lines belonging to the same group of the bus lines distributed over the several interconnection layers. Therefore, it is impossible, for example, to contact the first metallic interconnection layer after removing the insulating films in order to allow the prove to contact with the third metallic interconnection layer. A further attempt to contact the prove with the first metallic interconnection layer by removing the films will cause a damage to the third metallic interconnection layer, and make it difficult to monitor an internal operation of the bus lines or an application of the signals to the bus lines.

Figure 78:
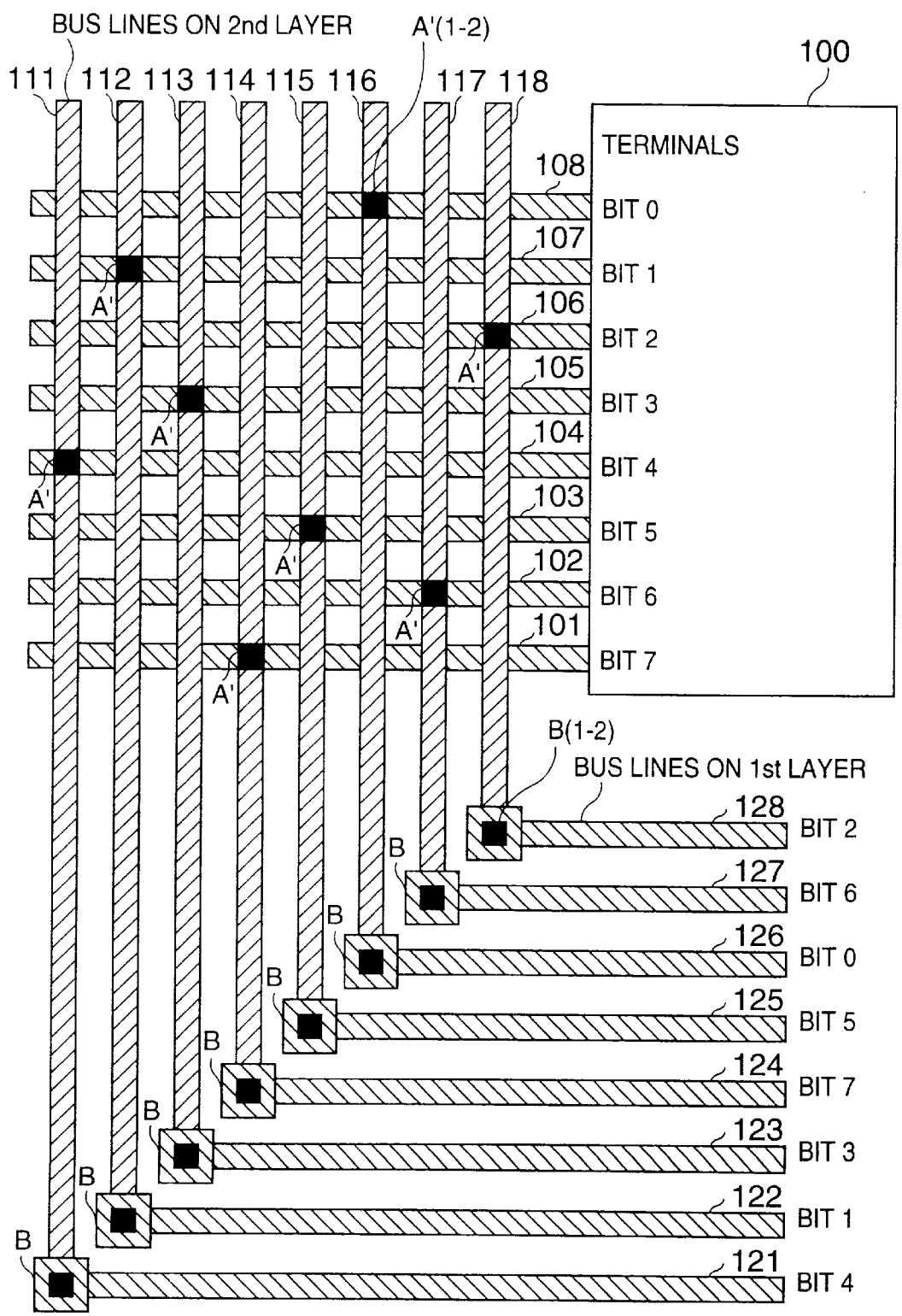
FIG. 78 illustrates a fifth example of bus lines according to the ninth embodiment of the present invention.

FIG. 78 illustrates a fifth example of a layout of bus lines according to the ninth embodiment of the present invention. A connection between a circuit block 100, such as a memory, and bus lines is similar to that as illustrated with reference to FIG. 73. In the layout, as shown in FIG. 78, bus lines 101, ..., 108 in rows passing from the circuit block 100 to bus lines 111, ..., 118 in columns are sized to a fixed length regardless of each position connected to each of the bus lines in columns. The bus lines 101, ..., 108 are connected to the bus lines 111, ..., 118 in columns on a second metallic interconnection layer via a border-less contact type through hole A' (1-2) connecting a first layer to the second layer.

A normal contact type through hole is provided with a metallic rectangular region wider than a wire around a contact hole or a through hole so as to ensure a margin to be fitted with. The borderless contact-type through hole enables dispensing with such a metallic rectangular wide region.

The removal of such a rectangular wide region around the through hole for connecting bus lines makes it difficult to find a location where through holes are formed. Furthermore, in this case, this detection of the location of the through holes becomes more difficult by defining each length of the bus lines extending from the terminal of the circuit block 100 to be equal to one another.

Figure 79:
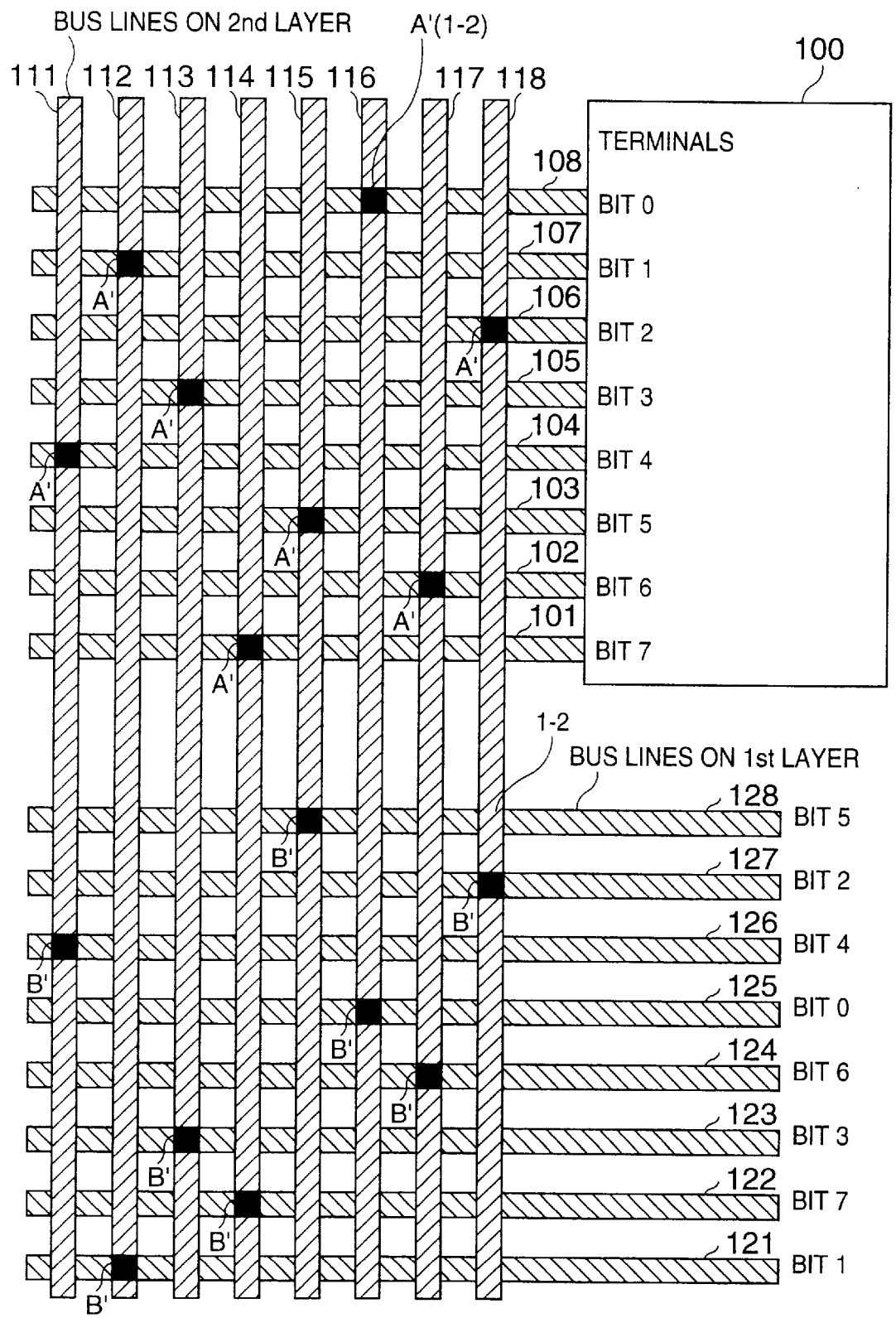
FIG. 79 illustrates a sixth example of bus lines according to the ninth embodiment of the present invention.

FIG. 79 illustrates a sixth example of a layout of bus lines according to the ninth embodiment of the present invention. In this case, additional borderless contact-type through holes B' are provided at each intersectional region of bus lines in columns and bus lines in rows. Furthermore, a bit order of the bus lines in columns is different from a further bit order of the bus lines in rows by changing some positions for the intersectional regions of the bus lines in columns and in rows.

In this case, the borderless contact-type through holes are employed as interconnections of the bus lines to uniform the layout of the bus lines and protect the bus lines from being analyzed. Of course, any interconnections may be applicable to this embodiment other than the borderless contact-type through holes.

Furthermore, in this case, the bus lines in columns on a second interconnection layer are connected to the bus lines in rows on a first interconnection layer via the border-less contact type through holes as illustrated in the following Table 2.

TABLE 2

| BIT | BUS LINES IN COLUMNS | BUS LINES IN ROWS |
|---|---|---|
| 4 | 111 | 126 |
| 1 | 112 | 121 |
| 3 | 113 | 123 |
| 7 | 114 | 122 |
| 5 | 115 | 128 |
| 0 | 116 | 125 |
| 6 | 117 | 124 |
| 2 | 118 | 127 |

As can be seen from the above Table 2, since the bus lines in rows are not sequentially arranged in an order of a bit number, the bus lines in columns and the bus lines in rows are arranged in different bit orders. Therefore, it is difficult to analyze data on the bus lines, because the data tapped at the bus lines on columns are observed to be different from the data tapped at the bus lines on rows by means of a conventional analysis technique.

The present invention is not limited to the specifically disclosed embodiments, and variations and modifications may be made without departing from the scope of the invention.

What is claimed is:

1. A microprocessor system including a microprocessor and a memory storing items accessible to the microprocessor, the microprocessor system comprising:

means for modifying an order of said items stored in the memory at random; and means for adapting a program counter of said microprocessor so as to allow said microprocessor to have a direct access to said items stored at random in the memory;

wherein the microprocessor system is operable to provide equivalent functionality in spite of modifying the order of said items stored in the memory.

2. A method for randomizing a microprocessor system including a microprocessor and a memory storing items accessible to the microprocessor, said microprocessor system performing a given functionality, the method comprising steps of:

(a) modifying an order of said items stored in the memory at random in response to randomizing information; and (b) modifying a program counter of said microprocessor so as to allow said microprocessor to have a direct access to said items stored at random in the memory;

wherein a randomized microprocessor system performing a functionality equivalent to said given functionality is generated.

3. The method as claimed in claim 2, the method further comprising the steps of:

for each said randomizing information, repeating said steps (a) and (b), whereby the microprocessor system is separately randomized repeatedly such that separate microprocessor systems realizing an equivalent functionality are generated.

4. An apparatus for modifying at random a microprocessor system including a microprocessor and a memory storing items accessible to the microprocessor, said microprocessor system realizing a given functionality, said apparatus comprising:

first randomization means for modifying an order of said items stored in the memory at random in response to randomizing information; and second randomization means for modifying said microprocessor at random so as to allow said microprocessor to have a direct access to said items stored at random in the memory;

wherein a randomized microprocessor system realizing a functionality equivalent to said given functionality is generated.

5. The apparatus as claimed in claim 4, in which said randomizing information consists of a first key used for modifying the order of said items at random in said first randomization means and a second key used for modifying said microprocessor at random in said second randomization means, and said first key and said second key are correspondingly selected such that the randomized microprocessor system is capable of realizing said functionality equivalent to said given functionality.

6. A microprocessor system including a microprocessor and a memory storing a program executable by the microprocessor, said microprocessor system realizing a given functionality, said microprocessor system comprising:

means for modifying addresses at random according to randomizing information, wherein the memory stores codes of said program at said randomized addresses, and wherein only said randomize d addresses are present within said microprocessor system.

7. A method for randomizing a microprocessor system including a microprocessor and a memory storing a program executable by the microprocessor, said microprocessor system realizing a given functionality, the method comprising steps of:

(a) storing each code of the program in the memory at an address modified at random according to randomizing information;

(b) generating said modified address at which the code of the program is stored in the memory using said randomizing information;

(c) reading said code of the program from the memory at said modified address and executing said code of the program by the microprocessor; and (d) repeating said steps, (b) and (c) so that said randomized microprocessor system can realize the given functionality in spite of the addresses being modified.

8. An apparatus for randomizing a microprocessor system including a microprocessor and a memory storing items accessible to the microprocessor, said microprocessor system realizing a given functionality, said apparatus comprising:

means for modifying each address of the memory at random according to randomizing information, at said modified each address each code of a program to be executed by the microprocessor being stored in the memory; and means for modifying a program counter of the microprocessor at random according to said randomizing information such that said modified microprocessor has a direct access to said code of the program stored in the memory at said modified address in an order that said modified microprocessor is capable of realizing said functionality.

9. The apparatus as claimed in claim 8, wherein:

said means for modifying each address of the memory at random comprises means randomly rearranging said code of the program stored in the memory; and said means for modifying the program counter of the microprocessor at random comprises:

a pseudo-random pattern generator for generating a pseudo-random sequence specifying each address at which said rearranged code of the program is directly accessible from the microprocessor in an order to be executed, and means for setting a pattern in said pseudo-random pattern generator, said pattern representing said pseudo-random sequence generated from said pseudo-random pattern generator.

10. The apparatus as claimed in claim 8, wherein:

said means for modifying each address of the memory at random comprises means randomly rearranging said code of the program stored in the memory; and said means for modifying the program counter of the microprocessor at random comprises:

a linear feedback shift register having at least one EXOR or EXNOR gate and for generating a pseudo-random sequence specifying each address at which said rearranged code of the program is directly accessible from the microprocessor in an order to be executed, and means for setting a location and/or a number of said at least one EXOR or EXNOR gate in the linear feedback shift register.

11. The apparatus as claimed in claim 8, in which the microprocessor to be modified at random is formed by an FPGA.

12. A microprocessor system including a microprocessor and a memory storing codes of a program executable by the microprocessor, said microprocessor system realizing a given functionality, said microprocessor comprising:

a pseudo-random pattern generator for generating a sequence of random values other than a sequentially increasing sequence; and program reading means for reading each code of the program from the memory at an address determined by the random value in said sequence;

wherein the microprocessor can realize the given functionality in spite of the codes of the program being stored in the memory at random.

13. The microprocessor system as claimed in claim 12, further comprising:

means for varying a pattern of said sequence generated by the pseudo-random pattern generator.

14. The microprocessor system as claimed in claim 12, in which the memory stores each code of the program executed by the microprocessor at each address determined based on said sequence generated by the pseudo-random pattern generator.

15. The microprocessor system as claimed in claim 12, in which the pseudo-random pattern generator is formed by a linear feedback shift register.

16. A microprocessor system including a microprocessor and a memory storing codes of a program executable by the microprocessor, said microprocessor system comprising:

a pseudo-random pattern generator for generating a sequence other than a sequentially increasing sequence;

program reading means for modifying at random each address of the memory based on said sequence generated by the pseudo-random pattern generator and for reading each code of the program from the memory at said modified address;

jump address memory means for storing address information corresponding to a jump address for a jump instruction, said address information being represented by said modified address; and means responsive to the code of the program read from the memory being the jump instruction, having an access to said jump address memory means, and retrieving said jump address information from said jump address memory means.

17. The microprocessor system as claimed in claim 16, further comprising:

means for supplying shift clocks to the pseudo-random pattern generator, and means for setting a value corresponding to said jump address information retrieved by said means for retrieving said jump address as shift times to said means for supplying shift clocks, wherein said means for supplying shift clocks includes a clock multiplier generating clocks, a number of the clocks corresponding to said shift times.

18. A method for randomizing a microprocessor system including a microprocessor and a memory storing a program executable by the microprocessor, said microprocessor system realizing a given functionality, the method comprising steps of:

(i) storing each code of the program in the memory at an address modified at random in accordance with a pseudo-random sequence;

(ii) generating each address at which the code of the program to be executed by the microprocessor is stored in the memory, in accordance with said pseudo-random sequence, and (iii) reading the code of the program from the memory at the generated address and executing the code by the microprocessor;

wherein said step (i) comprises the steps of:

determining whether the code of the program is a jump instruction or not; if the code of the program is not the jump instruction, applying said address to the code of the program in accordance with said pseudo-random sequence;

otherwise specifying address information of a location to be jumped to for the jump instruction; and converting said specified address information of the location to be jumped to into a corresponding address randomized in accordance with said pseudo-random sequence.

19. A microprocessor system, including a microprocessor and a memory storing items accessed by the microprocessor, said microprocessor system comprising:

means provided between the microprocessor and the memory for exchanging a bit order such that one bit order of a first item processed by the microprocessor is different from another bit order of a second item corresponding to said first item and stored in the memory, wherein said means comprises a first metallic interconnection connected to the microprocessor;

a second metallic interconnection connected to the memory;

at least one MOS transistor connected to each of the first metallic interconnection and the second metallic interconnection; and a control unit for controlling a gate of the MOS transistor, wherein the control unit adaptively provides a desired control signal to the gate of the MOS transistor such that said one bit order of the first item transmitted on the first metallic interconnection is different from said another bit order of the second item corresponding to the first item and transmitted on the second metallic interconnection.

20. A microprocessor system comprising:

a microprocessor; and a memory storing items accessed by the microprocessor and a plurality of interconnection layers being connected to the microprocessor and the memory, and forming bus lines in columns and bus lines in rows, said bus lines arranged on the separate interconnection layers being connected to one another via through holes, wherein said bus lines in columns and said bus lines in rows are aligned in a random bit order with respect to a bit order of digital signals to be processed, and wherein the bus lines in at least one of the columns and the bus lines in rows are distributed over several of the plurality of interconnection layers.

21. A microprocessor system comprising:

a microprocessor; and a memory storing items accessed by the microprocessor and a plurality of interconnection layers being connected to the microprocessor and the memory and forming bus lines in columns and bus lines in rows, said bus lines arranged on the separate interconnection layers being connected to one another via through holes, wherein the through holes are randomly arranged with respect to a bit order of digital signals to be processed, wherein the through hole is a borderless contact-type through hole, and the bus lines are extended beyond the through holes.

22. A microprocessor system comprising:

a microprocessor; and a memory storing items accessed by the microprocessor and a plurality of interconnection layers being connected to the microprocessor and the memory and forming bus lines in columns and bus lines in rows, said bus lines arranged on the separate interconnection layers being connected to one another via through holes, wherein the through holes are randomly arranged with respect to a bit order of digital signals to be processed, wherein the through holes connecting the bus lines in columns and the bus lines in rows are randomly arranged at intersections of the bus lines in columns and the bus lines in rows such that the bus lines in columns and the bus lines in rows are aligned in a different bit order.

* * * * *